US012377441B2

(12) United States Patent
Lin et al.

(10) Patent No.: US 12,377,441 B2
(45) Date of Patent: Aug. 5, 2025

(54) HYBRID ULTRASONIC TRANSDUCER SYSTEM

(71) Applicant: Taiwan Semiconductor Manufacturing Company, Ltd., Hsinchu (TW)

(72) Inventors: Ching-Hui Lin, Taichung (TW); Yi-Hsien Chang, Shetou Township (TW); Chun-Ren Cheng, Hsin-Chu (TW); Fu-Chun Huang, Zhubei (TW); Yi Heng Tsai, Hsinchu (TW); Shih-Fen Huang, Jhubei (TW); Chao-Hung Chu, Keelung (TW); Po-Chen Yeh, New Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 513 days.

(21) Appl. No.: 17/832,937

(22) Filed: Jun. 6, 2022

(65) Prior Publication Data

US 2023/0302494 A1 Sep. 28, 2023

Related U.S. Application Data

(60) Provisional application No. 63/323,196, filed on Mar. 24, 2022.

(51) Int. Cl.
*B06B 1/02* (2006.01)
*B06B 1/06* (2006.01)

(52) U.S. Cl.
CPC .......... *B06B 1/0292* (2013.01); *B06B 1/0622* (2013.01)

(58) Field of Classification Search
CPC ............................ B06B 1/0292; B06B 1/0622
See application file for complete search history.

(56) References Cited

U.S. PATENT DOCUMENTS

| | | | | |
|---|---|---|---|---|
| 10,944,041 | B1 | 3/2021 | Tsai et al. | |
| 2015/0357375 | A1 | 12/2015 | Tsai et al. | |
| 2018/0257927 | A1 * | 9/2018 | Rothberg | B81B 7/008 |
| 2021/0193904 | A1 | 6/2021 | Tsai et al. | |

FOREIGN PATENT DOCUMENTS

| | | | | |
|---|---|---|---|---|
| CN | 114486014 | A | * | 5/2022 |
| CN | 114620673 | A | * | 6/2022 |

* cited by examiner

*Primary Examiner* — Christine S. Kim
*Assistant Examiner* — Andrew Victor Prostor
(74) *Attorney, Agent, or Firm* — Eschweiler & Potashnik, LLC

(57) ABSTRACT

The present disclosure relates to an integrated chip structure. The integrated chip structure includes a dielectric stack disposed on a substrate. The integrated chip structure further includes one or more piezoelectric ultrasonic transducers (PMUTs) and one or more capacitive ultrasonic transducers (CMUTs). The one or more PMUTs include a piezoelectric stack disposed within the dielectric stack over one or more PMUT cavities. The one or more CMUTs include electrodes disposed within the dielectric stack and separated by one or more CMUT cavities. An isolation chamber is arranged within the dielectric stack laterally between the one or more PMUTs and the one or more CMUTs. The isolation chamber vertically extends past at least a part of both the one or more PMUTs and the one or more CMUTs.

20 Claims, 37 Drawing Sheets

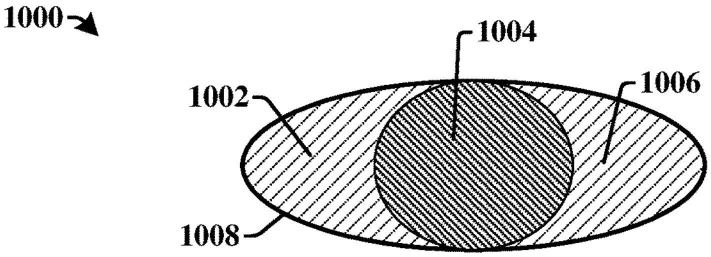
Fig. 10A
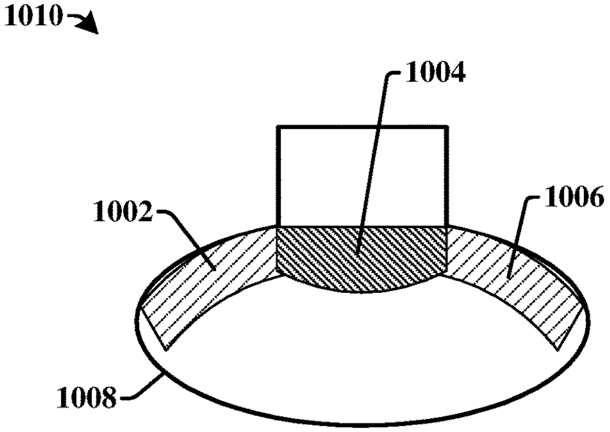
Fig. 10B
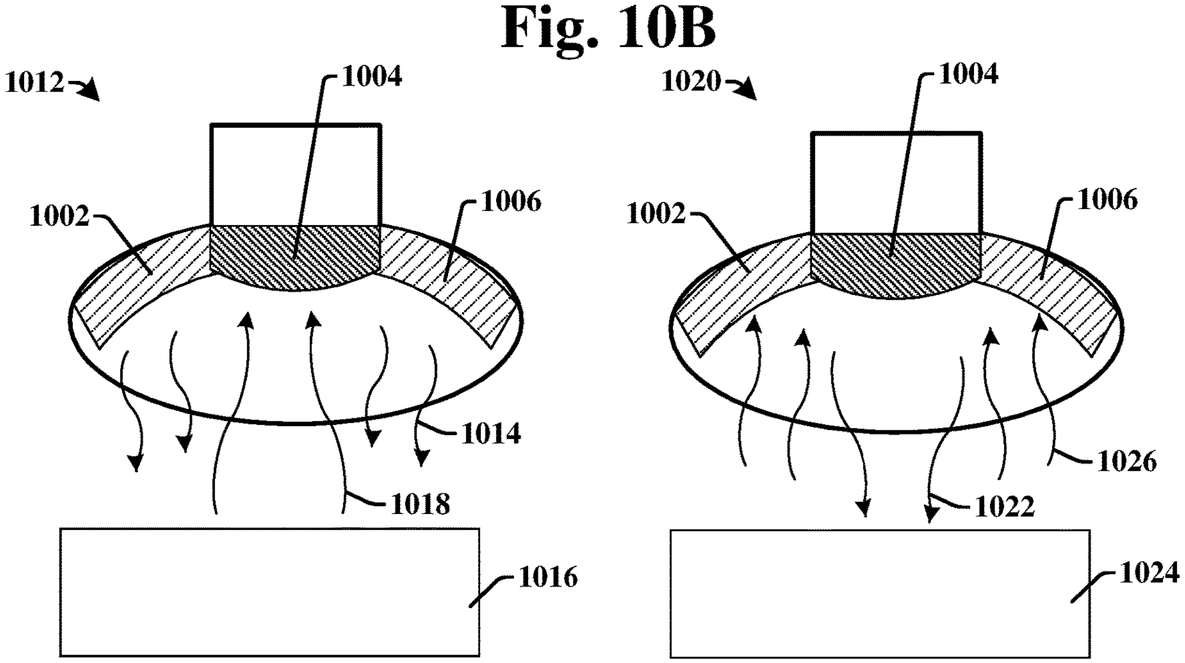
Fig. 10C
Fig. 10D

HYBRID ULTRASONIC TRANSDUCER SYSTEM

REFERENCE TO RELATED APPLICATION

This application claims the benefit of U.S. Provisional Application No. 63/323,196, filed on Mar. 24, 2022, the contents of which are hereby incorporated by reference in their entirety.

BACKGROUND

Micro-electro mechanical system (MEMS) devices are commonly included in modern-day electronics. MEMS devices are micro-sized devices that include a number of elements (e.g., stationary or movable elements) for achieving electro-mechanical functionality. Among the various applications of MEMS technologies (e.g., motion sensors, pressure sensors, inertial sensors, and printer nozzles), micromachined ultrasonic transducers (MUTs) have gained widespread attention due to their superior performance compared to conventional ultrasonic sensors.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 10A-10D illustrate diagrams showing an ultrasonic probe system comprising an ultrasonic transducer chip comprising CMUTs and PMUTs.

DETAILED DESCRIPTION

Figure 1:
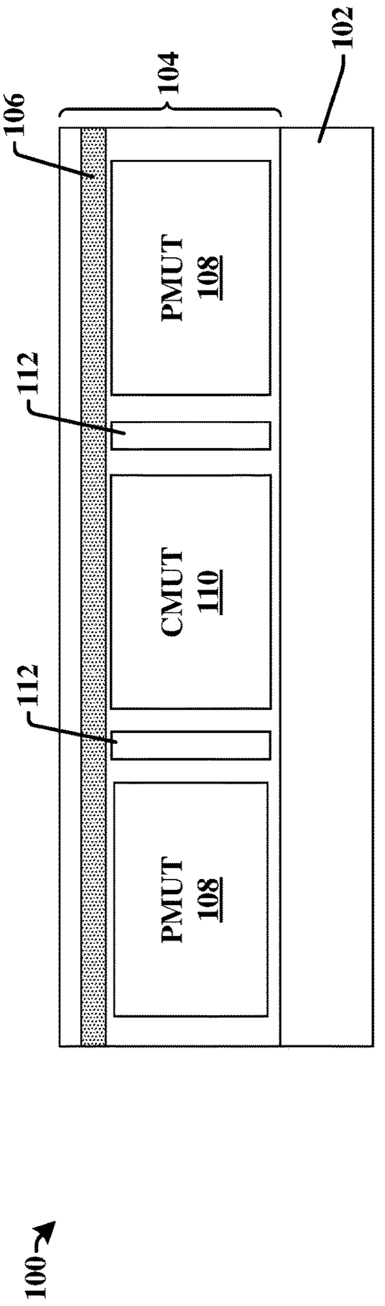
FIG. 1 illustrates a block diagram of a cross-sectional view of some embodiments of an integrated chip structure comprising a capacitive micromachined ultrasonic transducer (CMUT) and a piezoelectric micromachined ultrasonic transducer (PMUT).

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Micromachined ultrasonic transducers (MUTs) are micro-electro mechanical system (MEMS) devices that are able to convert electrical energy to mechanical energy and vice versa. MUTs are often used to transmit and receive acoustic signals in the ultrasonic range (e.g., at frequencies of greater than approximately 20 kHz). There are two different types of MUTs that are typically used in integrated chips, capacitive ultrasonic transducers (CMUTs) and piezoelectric ultrasonic transducers (PMUTs). CMUTs operate by generating a capacitive force in response to a received acoustic signal and/or by generating an acoustic signal using a capacitive force that is based upon applied electrical signals. PMUTs operate by generating a piezoelectric force in response to a received acoustic signal and/or by generating an acoustic signal using a piezoelectric force that is based upon applied electrical signals.

CMUTs and PMUTs have different characteristics and/or limitations. For example, CMUTs typically provide for a relatively low ultrasonic intensity compared to PMUTs, while PMUTS operate with a low bandwidth in comparison to CMUTs. Therefore, the applications and product performance of integrated chip structures comprising MEMS devices having CMUTs or having PMUTs is limited. By integrating both CMUTs and PMUTs into a same integrated chip structure, such limitations may be overcome thereby improving performance of the integrated chip structure.

However, it has been appreciated that PMUTs and CMUTs, which share a same integrated chip structure, may interfere with one another resulting in noise and/or performance degradation. For example, an integrated chip structure that has both PMUTs and CMUTs may be operated to use PMUTs to generate ultrasonic signals and CMUTs to receive ultrasonic signals. However, operating the PMUTs to generate an ultrasonic signal may result in a force (e.g., vibrations, a spurious acoustic signal, etc.) being received by adjacent CMUTs. The force may generate noise within the system, thereby degrading performance of the system.

The present disclosure relates to an integrated chip structure having PMUTs and CMUTs that are separated from one another by one or more isolation chambers. In some embodiments, the integrated chip structure comprises a dielectric stack comprising a plurality of dielectric layers disposed on a substrate. A PMUT and a CMUT are disposed within the dielectric stack. The dielectric stack comprises interior surfaces that form one or more isolation chambers between the PMUT and the CMUT. The one or more isolation chambers are configured to improve isolation between the PMUT and CMUT, thereby decreasing noise between the PMUT and CMUT and improving performance of the integrated chip structure.

FIG. 1 illustrates a block diagram of a cross-sectional view of some embodiments of an integrated chip structure 100 comprising a piezoelectric micromachined ultrasonic transducer (PMUT) and a capacitive micromachined ultrasonic transducer (CMUT).

The integrated chip structure 100 comprises a dielectric stack 104 disposed over a substrate 102. The dielectric stack 104 comprises a plurality of dielectric layers stacked onto one another. A flexible membrane 106 is arranged on and/or within the dielectric stack 104. In some embodiments, the flexible membrane 106 continuously extends between outermost edges of the dielectric stack 104. In other embodiments (not shown), the flexible membrane 106 may have a different width than the dielectric stack 104.

The integrated chip structure 100 further comprises one or more PMUT regions 108 and one or more CMUT regions 110. The one or more PMUT regions 108 respectively comprise one or more PMUTs disposed within the dielectric stack 104. The one or more CMUT regions 110 respectively comprise one or more CMUTs disposed within the dielectric stack 104. In some embodiments, the one or more PMUT regions 108 and the one or more CMUT regions 110 are arranged vertically between the substrate 102 and the flexible membrane 106.

One or more isolation chambers 112 are arranged within the dielectric stack 104. The one or more isolation chambers 112 are disposed laterally between the one or more PMUTs within the one or more PMUT regions 108 and the one or more CMUTs within the one or more CMUT regions 110. In some embodiments, the one or more isolation chambers 112 may also be disposed between the one or more PMUTs within the one or more PMUT regions 108 and/or the between the one or more CMUTs within the one or more CMUT regions 110. The one or more isolation chambers 112 are respectively formed by one or more interior surfaces of the dielectric stack 104. The one or more isolation chambers 112 vertically extend past at least a part of both the one or more PMUTs and the one or more CMUTs.

The one or more isolation chambers 112 are configured to dampen cross-talk between the one or more PMUTs within the one or more PMUT regions 108 and/or the one or more CMUTs within the one or more CMUT regions 110. By dampening cross-talk between the one or more PMUTs and/or the one or more CMUTs, noise within the integrated chip structure 100 can be decreased and performance of the integrated chip structure 100 can be improved.

Figure 2:
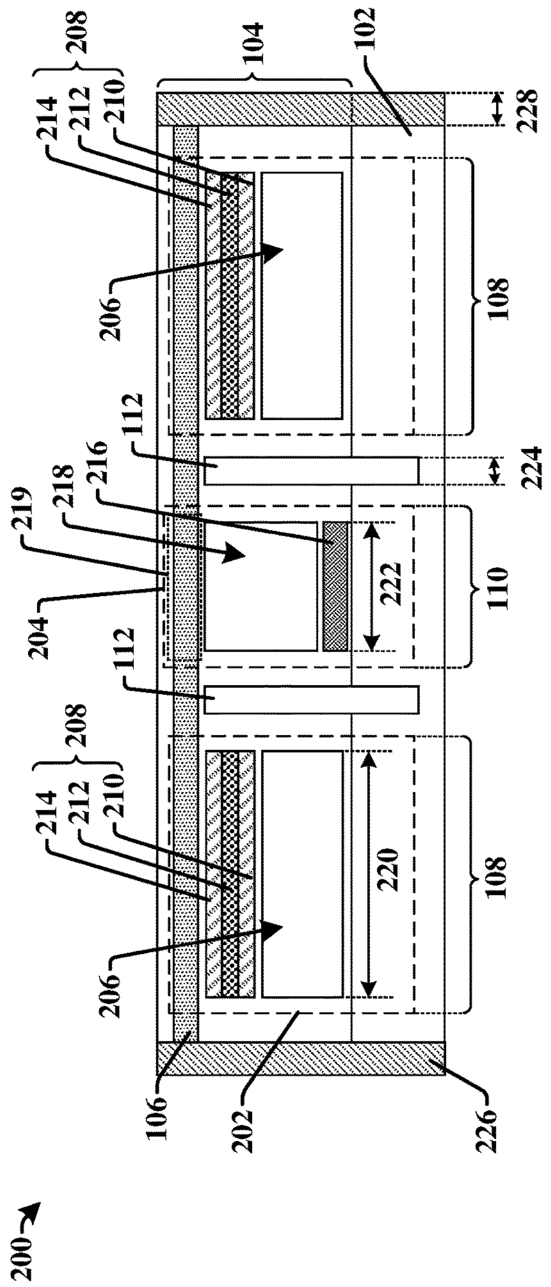
FIG. 2 illustrates a cross-sectional view of some additional embodiments of an integrated chip structure comprising a CMUT and a PMUT.

FIG. 2 illustrates a cross-sectional view of some additional embodiments of an integrated chip structure 200 comprising both a PMUT and a CMUT.

The integrated chip structure 200 comprises a dielectric stack 104 disposed over a substrate 102. The dielectric stack 104 comprises a plurality of dielectric layers stacked onto one another. A flexible membrane 106 is arranged on and/or within the dielectric stack 104. In some embodiments, the dielectric stack 104 may comprise one or more dielectric layers over and under the flexible membrane 106. One or more PMUT regions 108 comprising one or more PMUTs 202 and one or more CMUT region 110*s* comprising one or more CMUTs 204 are disposed within the dielectric stack 104 below the flexible membrane 106.

The one or more PMUTs 202 respectively comprise a piezoelectric stack 208 disposed over a PMUT cavity 206. The piezoelectric stack 208 may comprise a piezoelectric material 212 arranged between a lower electrode 210 and an upper electrode 214. In some embodiments, the flexible membrane 106 is disposed over the piezoelectric stack 208. In a transmitting mode, one or more bias voltage(s) are applied to one or more of the lower electrode 210 and the upper electrode 214. The one or more bias voltage(s) cause an electric field to form across the piezoelectric material 212. The electric field causes the piezoelectric material 212 to bend, resulting in deflection of the flexible membrane 106. In a receiving mode, a force of an incident signal (e.g., an incident acoustic wave) causes the piezoelectric material 212 to bend. The bending generates charges that form a potential difference between the lower electrode 210 and the upper electrode 214. The potential difference can be used to determine a degree of the bending and characteristics of the incident signal.

The one or more CMUTs 204 respectively comprise a bottom electrode 216 having a fixed relation to the substrate 102 and a top electrode 219 having a fixed relation to the flexible membrane 106. The bottom electrode 216 is separated from the top electrode 219 by a CMUT cavity 218. In some embodiments, the top electrode 219 may comprise or be a part of the flexible membrane 106. In a receiving mode, an incident signal (e.g., an incident acoustic wave) causes the flexible membrane 106 to move and change a capacitance between the bottom electrode 216 and the top electrode 219. The change in capacitance can be detected and used to determine a degree of the bending and characteristics of the incident signal. In a transmitting mode, one or more bias voltage(s) are applied to one or more of the bottom electrode 216 and the top electrode 219. The one or more bias voltage(s) cause an electric field to form, which moves the flexible membrane 106 to generate an ultrasonic signal.

In some embodiments, the one or more PMUTs 202 may respectively have a first size 220 (e.g., a first width and/or a first length), while the one or more CMUTs 204 may respectively have a second size 222 (e.g., a second width and/or a second length). In some embodiments, the first size 220 is larger than the second size 222. For example, the first size 220 may be in a first range of between approximately 20 microns (μm) and approximately 200 μm, while the second size 222 may be in a second range of between approximately 10 μm and approximately 100 μm. The relatively small size of the one or more PMUTs 202 and the one or more CMUTs 204 provide the integrated chip structure 200 with a good performance due to a low RC delay (e.g., due to the small size of the one or more PMUTs 202 and the one or more CMUTs 204, interconnections within the integrated chip structure 200 may have a relatively short length and therefore a relatively low resistance).

In some embodiments, the flexible membrane 106 may be shared by the one or more PMUTs 202 and/or the one or more CMUTs 204. In such embodiments, the flexible membrane 106 may continuously extend over the one or more PMUTs 202 and the one or more CMUTs 204. Sharing the flexible membrane 106 may allow for the one or more CMUTs 204 and/or the one or more PMUTs 202 to function as a unit.

One or more isolation chambers 112 are arranged laterally between the one or more PMUT regions 108 and the one or more CMUT regions 110, laterally between the one or more PMUTs 202 within the one or more PMUT regions 108, and/or laterally between the one or more CMUTs 204 within the one or more CMUT regions 110. The one or more isolation chambers 112 are respectively formed by one or more interior surfaces of the dielectric stack 104. In some embodiments, the one or more isolation chambers 112 may respectively have a first width 224. In some embodiments, the first width 224 may be in a range of between approximately 5 μm and approximately 50 μm. The one or more isolation chambers 112 are configured to reduce cross-talk between the one or more PMUTs 202 and the one or more CMUTs 204, so as to provide the integrated chip structure 200 with less noise that results in a good signal to noise ratio.

In some embodiments, the one or more isolation chambers 112 may be held at a vacuum having a relatively low pressure. In some additional embodiments, the one or more isolation chambers 112 may be filled with one or more gases. In yet additional embodiments, the one or more isolation chambers 112 may be filled with an acoustic wave absorption material such as polyimide, a low-k dielectric material, a porous polymer material (e.g., porous methylsilsesquioxane), or the like.

A seal ring region 226 is arranged along outermost edges of the substrate 102 and/or the dielectric stack 104. The seal ring region 226 is configured to prevent the propagation of cracks into the one or more PMUT regions 108 and/or the one or more CMUT regions 110. In some embodiments, the seal ring region 226 may comprise a plurality of stacked interconnects. The plurality of stacked interconnects are laterally separated from interconnects within the one or more PMUT regions 108 and/or the one or more CMUT regions 110. In some embodiments, the seal ring region 226 may further comprise one or more passivation layers, or other similar structures that are configured to prevent the propagation of cracks. In some embodiments, the seal ring region 226 has a second width 228. In some embodiments, the second width 228 may be in a range of between approximately 5 μm and approximately 50 μm, between approximately 10 μm and approximately 75 μm, or other similar values.

Figure 3:
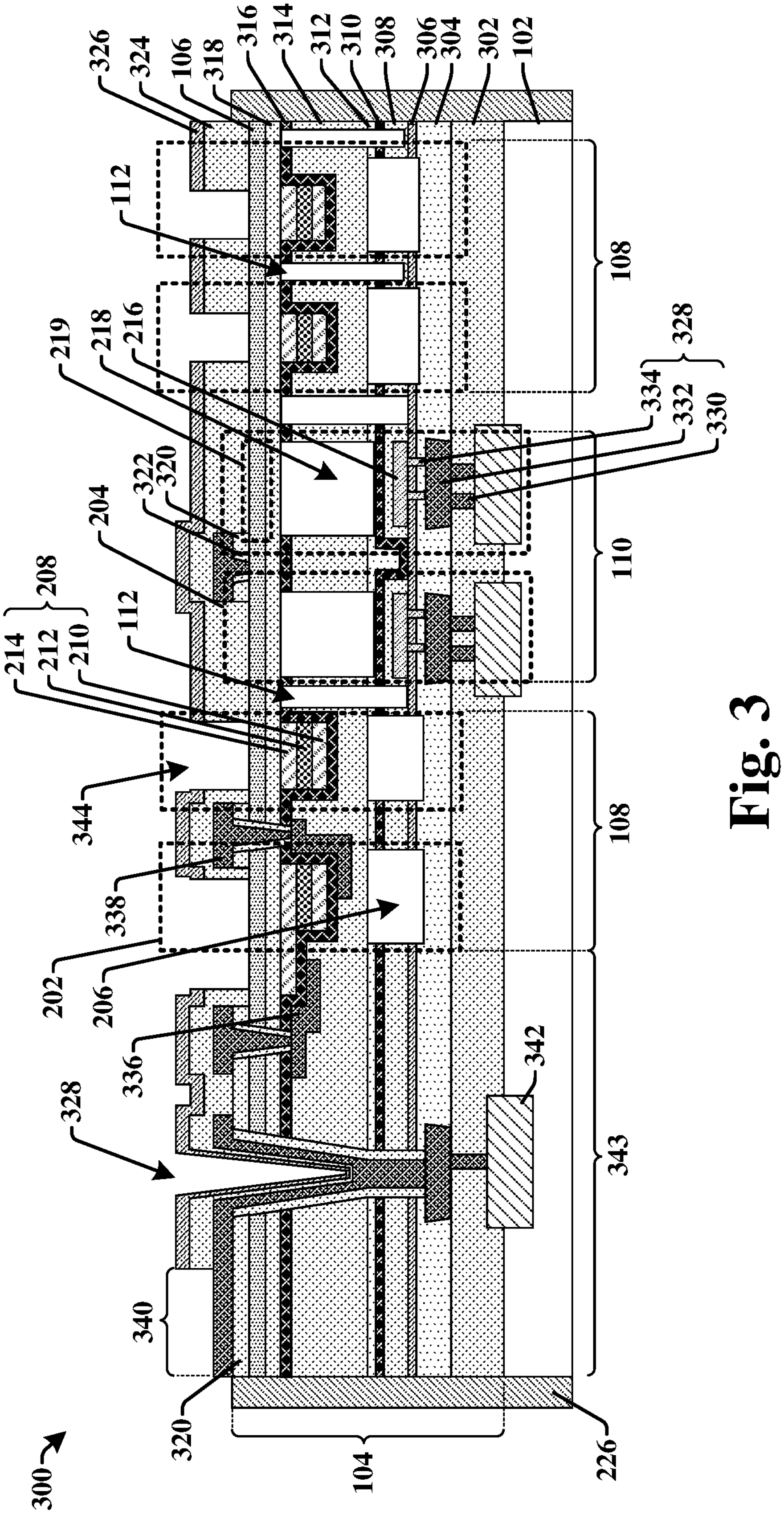
FIG. 3 illustrates a cross-sectional view of some additional embodiments of an integrated chip structure comprising a CMUT and a PMUT.

FIG. 3 illustrates a cross-sectional view of some additional embodiments of integrated chip structure 300 comprising a CMUT and a PMUT.

The integrated chip structure 300 comprises a dielectric stack 104 disposed over a substrate 102. The dielectric stack 104 comprises a plurality of dielectric layers stacked onto one another. In some embodiments, the dielectric stack 104 may comprise a first dielectric layer 302 arranged over the substrate 102, a second dielectric layer 304 over the first dielectric layer 302, a first passivation layer 306 over the second dielectric layer 304, a third dielectric layer 308 over the first passivation layer 306, a first high-k dielectric layer 310 over the third dielectric layer 308, a fourth dielectric layer 312 over the first high-k dielectric layer 310, a fifth dielectric layer 314 over the fourth dielectric layer 312, a second high-k dielectric layer 316 over the fifth dielectric layer 314, a sixth dielectric layer 318 over the second high-k dielectric layer 316, a seventh dielectric layer 320 over the sixth dielectric layer 318, an eighth dielectric layer 322 over the sixth dielectric layer 318, a ninth dielectric layer 324 over the sixth dielectric layer 318, and a second passivation layer 326 over the ninth dielectric layer 324.

In some embodiments, the first dielectric layer 302, the second dielectric layer 304, the third dielectric layer 308, the fourth dielectric layer 312, the fifth dielectric layer 314, the sixth dielectric layer 318, the seventh dielectric layer 320, the eighth dielectric layer 322, and the ninth dielectric layer 324 may comprise or be silicon oxide, silicon nitride, silicon oxynitride, silicon carbide, un-doped silicate glass (USG), fluorinated silicate glass (FSG), borophosphosilicate glass (BPSG), tetraethosiloxane (TEOS), spin-on glass (SOG), high-density plasma (HDP) oxide, plasma-enhanced TEOS (PETEOS), or the like. In some embodiments, the first passivation layer 306 and the second passivation layer 326 may comprise an oxide (e.g., silicon oxide), a nitride (e.g., silicon nitride, silicon oxynitride, etc.), a carbide (e.g., silicon carbide), or the like. In some embodiments, the first high-k dielectric layer 310 and the second high-k dielectric layer 316 may comprise or be hafnium dioxide, zirconium dioxide, aluminum oxide ($Al_2O_3$), zirconium silicate, hafnium silicate, or the like.

A flexible membrane 106 is arranged within the dielectric stack 104. In some embodiments, the flexible membrane 106 may be arranged between the sixth dielectric layer 318 and the ninth dielectric layer 324. In some embodiments, the flexible membrane 106 may comprise a semiconductor material (e.g., such as silicon, doped silicon, doped polysilicon, etc.), a conductive material (e.g., a metal), or the like.

One or more PMUTs 202 are disposed within one or more PMUT regions 108. The one or more PMUTs 202 respectively comprise a piezoelectric stack 208 disposed over one or more PMUT cavities 206. The piezoelectric stack 208 comprises a lower electrode 210 separated from an upper electrode 214 by a piezoelectric material 212. The one or more PMUT cavities 206 are arranged between sidewalls of the dielectric stack 104. In some embodiments, the one or more PMUT cavities 206 are arranged between sidewalls of the second dielectric layer 304, the first passivation layer 306, the third dielectric layer 308, the first high-k dielectric layer 310, and the fourth dielectric layer 312. In some embodiments, the lower electrode 210 and/or the upper electrode 214 may comprise aluminum, copper, titanium, titanium nitride, tantalum, tantalum nitride, or the like. In some embodiments, the piezoelectric material 212 may comprise aluminum nitride (AlN), lead zirconate titanate (PZT), zinc oxide (ZnO), or the like. In some embodiments, one or more PMUT openings 344 extend through the ninth dielectric layer 324 and the second passivation layer 326. The one or more PMUT openings 344 are disposed over the flexible membrane 106 and over the piezoelectric stacks 208. The one or more PMUT openings 344 may expose an upper surface of the flexible membrane 106.

One or more CMUTs 204 are disposed within one or more CMUT regions 110. The one or more CMUTs 204 respectively comprise a bottom electrode 216 separated from a top electrode 219 (e.g., a part of the flexible membrane 106) by one or more CMUT cavities 218. In some embodiments, the one or more PMUT cavities 206 are closer to the substrate 102 than the one or more CMUT cavities 218. In such embodiments, the one or more CMUT cavities 218 respectively have a bottom that is over a bottom of the one or more PMUT cavities 206 and a top that is over a top of the one or more PMUT cavities 206. In some embodiments, the one or more CMUT cavities 218 may have a height that is different (e.g., greater) than a height of the one or more PMUT cavities 206. In some embodiments, the one or more CMUT cavities 218 are arranged between sidewalls of the fourth dielectric layer 312, the fifth dielectric layer 314, and the second high-k dielectric layer 316.

One or more isolation chambers 112 are arranged laterally between the one or more PMUT regions 108 and the one or more CMUT regions 110, laterally between the one or more PMUTs 202 within the one or more PMUT regions 108, and/or laterally between the one or more CMUTs 204 within the one or more CMUT regions 110. In some embodiments, the one or more isolation chambers 112 vertically extend past a top of the one or more PMUT cavities 206 and past a bottom of the one or more CMUT cavities 218. In some embodiments, the one or more isolation chambers 112 respectively have a height that is greater than or equal to a height of the one or more PMUT cavities 206 and/or a height of the one or more CMUT cavities 218.

In some embodiments, a first plurality of interconnects 328 are arranged within the dielectric stack 104 at or below a top of the one or more PMUT cavities 206. In some embodiments, the first plurality of interconnects 328 comprise interconnects that are below the bottom electrode 216. In some embodiments, the first plurality of interconnects 328 may comprise conductive contacts 330 disposed within the first dielectric layer 302, interconnect wires 332 disposed within the second dielectric layer 304, and interconnect vias 334 extending through the first passivation layer 306 to contact the bottom electrode 216. A second plurality of interconnects 336 are disposed within the dielectric stack 104 at or above a bottom of the one or more CMUT cavities 218. The second plurality of interconnects comprise interconnects that are coupled to the lower electrode 210 and the upper electrode 214 of the piezoelectric stack 208. In some embodiments, the second plurality of interconnects 336 may comprise a plurality of conductive lines disposed within the sixth dielectric layer 318. The plurality of conductive lines extend through the second high-k dielectric layer 316 to contact the lower electrode 210 and the upper electrode 214. A plurality of conductive layers 338 extend through the flexible membrane 106 and the sixth dielectric layer 318 to contact the second plurality of interconnects 336. In some embodiments, the first plurality of interconnects 328, the second plurality of interconnects 336, and the plurality of conductive layers 338 may comprise one or more of aluminum, copper, tungsten, ruthenium, tantalum, titanium, gold, silver, or the like.

In some embodiments, a part of the plurality of conductive layers 338 may laterally extend outward from below the dielectric stack 104 (e.g., from below the ninth dielectric layer 324) to form a bond pad region 340 arranged along an edge of the integrated chip structure 300. The bond pad region 340 exposes a bond pad that is electrically coupled to one or more of the first plurality of interconnects 328 and/or one or more of the second plurality of interconnects 336 by way of the plurality of conductive layers 338.

In some embodiments, the first plurality of interconnects 328, the second plurality of interconnects 336, and/or the plurality of conductive layers 338 may couple the one or more CMUTs 204 and the one or more PMUTs 202 to devices 342 on and/or within the substrate 102. In various embodiments, the devices 342 may comprise a transistor device (e.g., a planar FET, a FinFET, a gate all around structure, a nanowire structure, etc.), a CMOS BCD, a high voltage device, a HPC device for real time image processing and output, a memory device (e.g., an RRAM device, a MRAM device, an FRAM device, a SRAM device, or the like), a FUSE element, integrated passive devices, or the like. In some embodiments, the devices 342 may comprise one or more devices that are arranged within a device region 343 that is laterally outside of the one or more PMUT regions 108 and the one or more CMUT regions 110. In some embodiments, the bond pad region 340 is arranged over the device region 343.

In some embodiments, the devices 342 may be part of an ASIC. In some such embodiments, the devices 342 may be configured to operate as a digital signal processor, a driver circuit, a decoder circuit, or the like. Having the one or more PMUTs 202 and the one or more CMUTs 204 within a same integrated chip structure as an ASIC provides for a relatively small size of overall device integration (e.g., in comparison to devices integrated through wire-bonding) and a high capability of interconnection between the one or more PMUTs 202 and the one or more CMUTs 204. The relatively small size and high capability of interconnection can decrease resistance and/or RC delay between the one or more PMUTs 202, the one or more CMUTs 204, and the ASIC, thereby improving performance of the integrated chip structure.

Figure 4:
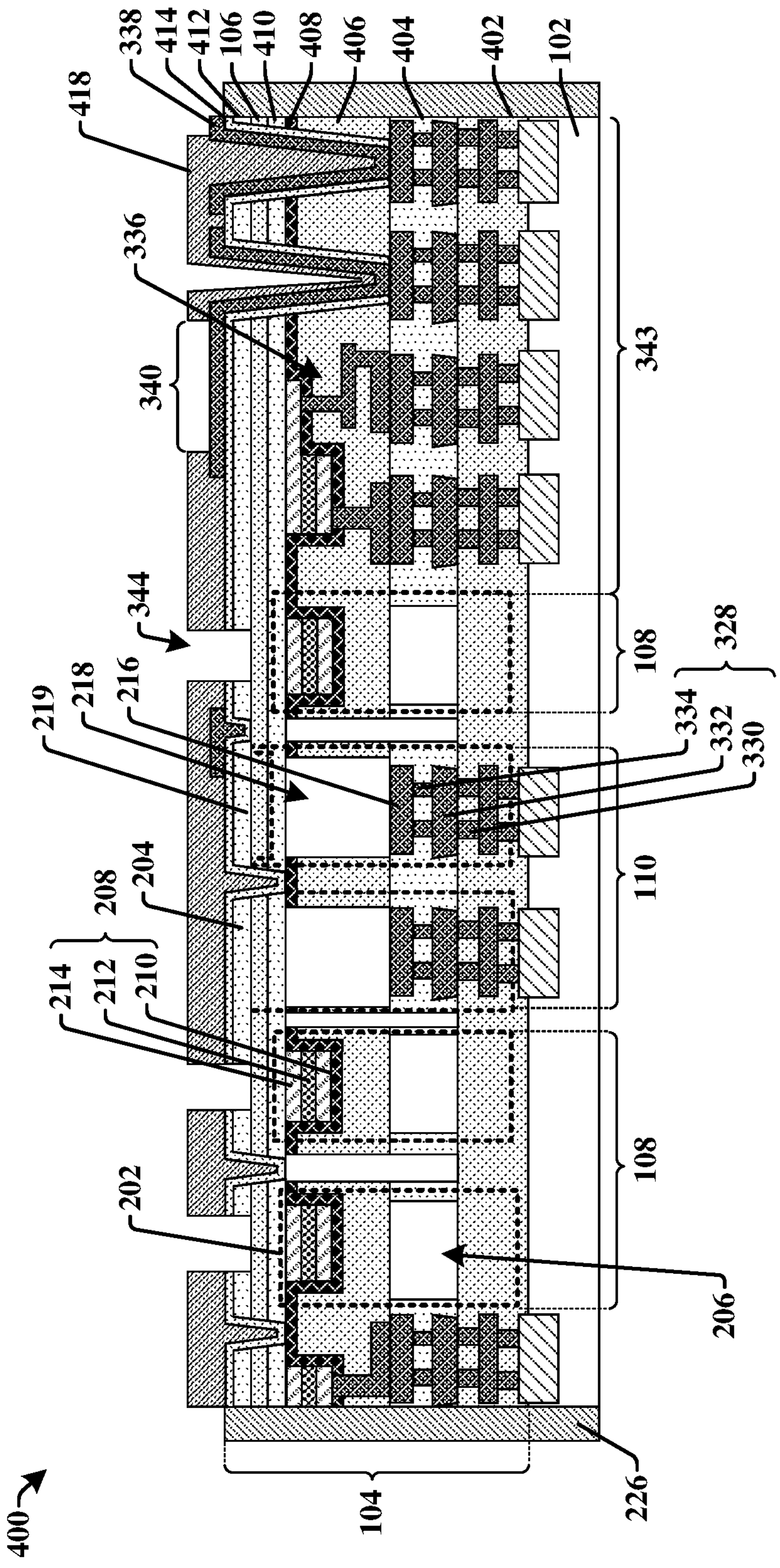
FIG. 4 illustrates a cross-sectional view of some additional embodiments of an integrated chip structure comprising a CMUT and a PMUT.

FIG. 4 illustrates a cross-sectional view of some additional embodiments of integrated chip structure 400 comprising a CMUT and a PMUT.

The integrated chip structure 400 comprises a dielectric stack 104 disposed over a substrate 102. The dielectric stack 104 comprises a plurality of dielectric layers stacked onto one another. In some embodiments, the dielectric stack 104 may comprise a first dielectric layer 402 arranged over the substrate 102, a second dielectric layer 404 over the first dielectric layer 402, a third dielectric layer 406 over the second dielectric layer 404, a high-k dielectric layer 408 over the third dielectric layer 406, a fourth dielectric layer 410 over the high-k dielectric layer 408, a fifth dielectric layer 412 over the fourth dielectric layer 410, a sixth dielectric layer 414 over the fifth dielectric layer 412, and a passivation layer 418 over the sixth dielectric layer 414.

In some embodiments, first dielectric layer 402, the second dielectric layer 404, the third dielectric layer 406, the fourth dielectric layer 410, the fifth dielectric layer 412, and the sixth dielectric layer 414 may comprise or be silicon oxide, silicon nitride, silicon oxynitride, silicon carbide, USG, FSG, BPSG, TEOS, SOG, HDP oxide, PETEOS, or the like. In some embodiments, the passivation layer 418 may comprise an oxide (e.g., silicon oxide), a nitride (e.g., silicon nitride, silicon oxynitride, etc.), a carbide (e.g., silicon carbide), or the like. In some embodiments, the high-k dielectric layer 408 may comprise or be hafnium dioxide, zirconium dioxide, aluminum oxide ($Al_2O_3$), zirconium silicate, hafnium silicate, or the like. A flexible membrane 106 is arranged on and/or within the dielectric stack 104. In some embodiments, the flexible membrane 106 may be arranged between the fourth dielectric layer 410 and the fifth dielectric layer 412.

One or more PMUTs 202 are disposed within one or more PMUT regions 108. The one or more PMUTs 202 respectively comprise a piezoelectric stack 208 disposed over one or more PMUT cavities 206. The piezoelectric stack 208 comprises a lower electrode 210 separated from an upper electrode 214 by a piezoelectric material 212. The one or more PMUT cavities 206 are arranged between sidewalls of the dielectric stack 104. In some embodiments, the one or more PMUT cavities 206 are arranged between sidewalls of the second dielectric layer 404.

One or more CMUTs 204 are disposed within one or more CMUT regions 110. The one or more CMUTs 204 respectively comprise a bottom electrode 216 separated from a top electrode 219 (e.g., within a part of the flexible membrane 106) by one or more CMUT cavities 218. In some embodiments, the one or more PMUT cavities 206 are vertically below the one or more CMUT cavities 218. In some embodiments, the one or more CMUT cavities 218 are arranged between sidewalls of the third dielectric layer 406. In some embodiments, a horizontally extending line extends along a first horizontally extending surface of the dielectric stack 104 that defines a top of the one or more PMUT cavities 206 and along a second horizontally extending surface of the dielectric stack 104 that defines a bottom of the one or more CMUT cavities 218.

One or more isolation chambers 112 are arranged laterally between the one or more PMUT regions 108 and the one or more CMUT regions 110, laterally between the one or more PMUTs 202 within the one or more PMUT regions 108, and/or laterally between the one or more CMUTs 204 within the one or more CMUT regions 110. In some embodiments, the one or more isolation chambers 112 vertically extend past a top of the one or more PMUT cavities 206 and a bottom of the one or more CMUT cavities 218.

In some embodiments, a first plurality of interconnects 328 are arranged within the dielectric stack 104 at or below a top of the one or more PMUT cavities 206. In some embodiments, the first plurality of interconnects 328 may be disposed below the bottom electrode 216. In some embodiments, the first plurality of interconnects 328 may comprise conductive contacts 330, interconnect wires 332, and interconnect vias 334 extending through the first dielectric layer 402 and the second dielectric layer 404. A second plurality of interconnects 336 are disposed within the dielectric stack 104 at or above a bottom of the one or more CMUT cavities 218. In some embodiments, the second plurality of interconnects 336 may comprise conductive contacts, interconnect wires, and interconnect vias extending through third dielectric layer 406 and the high-k dielectric layer 408 to contact the lower electrode 210 and the upper electrode 214. In some embodiments, the first plurality of interconnects 328 vertically contact the second plurality of interconnects 336 along a horizontally extending interface.

In some embodiments, a plurality of conductive layers 338 extend through the dielectric stack 104 to contact the first plurality of interconnects 328. In some embodiments, a plurality of conductive layers 338 extend through third dielectric layer 406, the high-k dielectric layer 408, the fourth dielectric layer 410, the flexible membrane 106, the fifth dielectric layer 412, and the sixth dielectric layer 414. The passivation layer 418 overlies the plurality of conductive layers 338.

In some embodiments, the first plurality of interconnects 328, the second plurality of interconnects 336, and/or the plurality of conductive layers 338 may couple the one or more PMUTs 202 and the one or more CMUTs 204 to devices 342 on and/or within the substrate 102. In various embodiments, the devices 342 may comprise a transistor device (e.g., a planar FET, a FinFET, a gate all around structure, etc.), a CMOS BCD, a high voltage device, a HPC device for real time image processing and output, a memory device (e.g., an RRAM device, a MRAM device, an FRAM device, a SRAM device, or the like), a FUSE element, or the like.

Figure 5A:
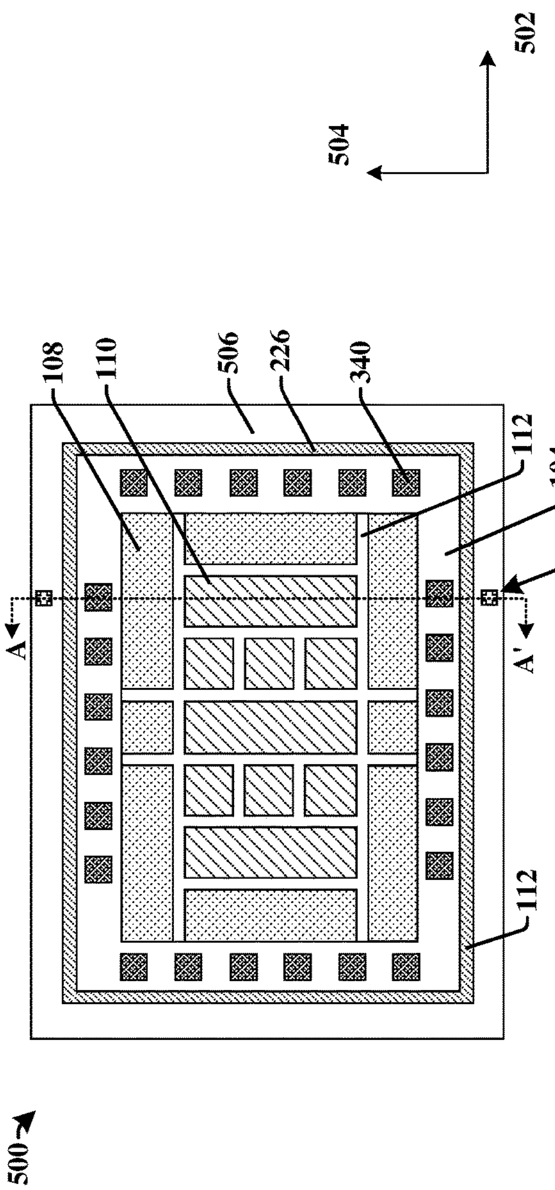
FIGS. 5A-5B illustrate some additional embodiments of an integrated chip structure comprising a CMUT and a PMUT.

FIG. 5A illustrates a top-view of some embodiments of an integrated chip structure 500 having a CMUT and a PMUT.

As shown in the top-view of FIG. 5A, the integrated chip structure 500 comprises one or more PMUT regions 108 and one or more CMUT regions 110. In some embodiments, the one or more PMUT regions 108 may be arranged around an outer perimeter of the one or more CMUT regions 110. In such embodiments, the one or more PMUT regions 108 laterally surround the one or more CMUT regions 110 along a first direction 502 and along a second direction 504 that is perpendicular to the first direction 502. In such an embodiment, the one or more CMUT regions 110 are arranged in a central region of the integrated chip structure 500, while the one or more PMUT regions 108 are arranged in a peripheral region of the integrated chip structure 500. In some embodiments, the first direction 502 and the second direction 504 are parallel to an upper surface of a substrate underlying a dielectric stack 104.

One or more isolation chambers 112 are disposed between the one or more PMUT regions 108 and the one or more CMUT regions 110. In some embodiments, the one or more isolation chambers 112 respectively and continuously extend along the first direction 502 and along the second direction 504. In some embodiments, the one or more isolation chambers 112 comprise a single isolation chamber that continuously extends around a plurality of the one or more PMUT regions 108 and laterally between adjacent ones of the one or more CMUT regions 110.

A plurality of bond pad regions 340 are arranged around the plurality of PMUT regions 108. The plurality of bond pad regions 340 comprise discrete bond pad regions that are separated from one another along the first direction 502 and along the second direction 504. In some embodiments, the plurality of bond pad regions 340 may respectively have a size (e.g., a height and/or a width) that is in a range of between approximately 10 μm and approximately 250 μm, between approximately 20 μm and approximately 200 μm, or other similar values. In some embodiments, the plurality of bond pad regions 340 may be spaced apart from one another by a distance that is in a range of between approximately 10 μm and approximately 250 μm, between approximately 20 μm and approximately 200 μm, or other similar values.

A seal ring region 226 extends around the plurality of bond pad regions 340 in a closed and unbroken loop. In some embodiments, the integrated chip structure 500 is part of a larger semiconductor body (e.g., a semiconductor wafer) comprising multiple integrated chip die. In such embodiments, the seal ring region 226 may separate the plurality of bond pad regions 340 from a scribe line region 506. The scribe line region 506 is configured to be removed during dicing (e.g., singulation) of the semiconductor body (e.g., a semiconductor wafer). In some embodiments, the scribe line region 506 may have a width that is in a range of between approximately 60 μm and approximately 100 μm, between approximately 40 μm and approximately 80 μm, or other similar values.

In some embodiments, one or more alignment marks 508 may be disposed within the scribe line region 506. The one or more alignment marks 508 are configured to provide for alignment of multiple stacked substrates onto one another during fabrication of the integrated chip structure 500. In some embodiments, the one or more alignment marks 508 may comprise metal alignment marks. In some embodiments, the scribe line region 506 may have a low metal pattern density, which enables the scribe line region 506 to be removed using a stealth laser dicing technique. In some embodiments, the scribe line region 506 may metal pattern density that is less than or equal to approximately 10%, that is less than or equal to approximately 5%, that is approximately 0%, or other similar values.

Figure 5B:
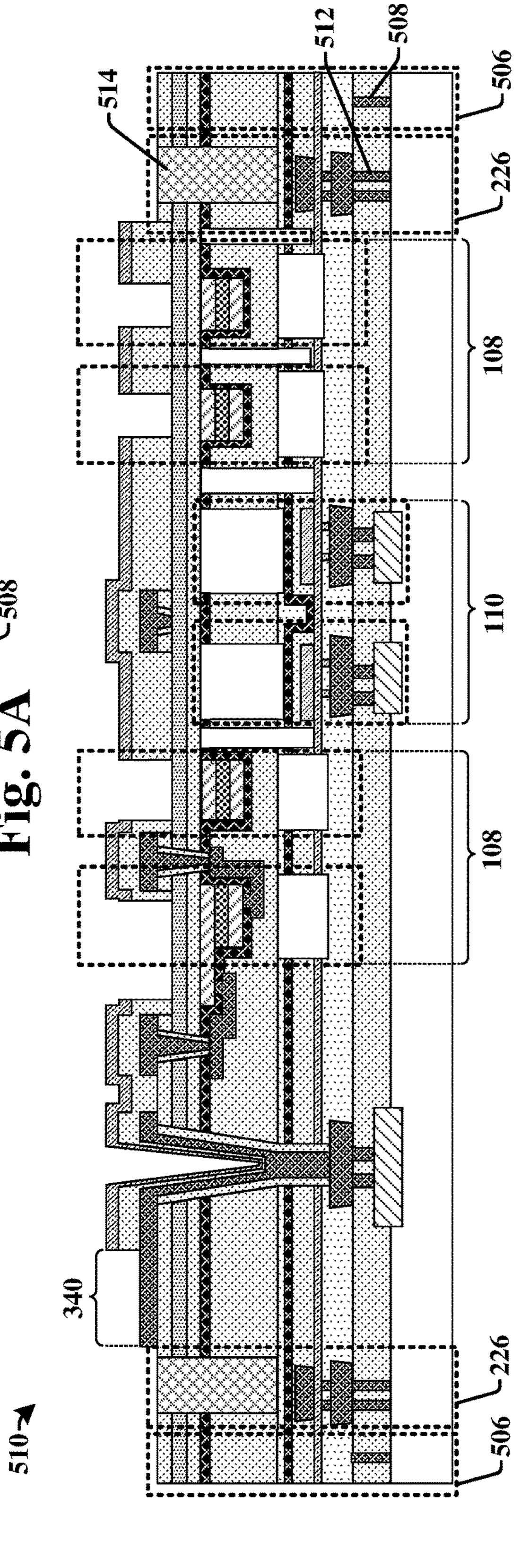

FIG. 5B illustrates a cross-section view 510 of some embodiments of the integrated chip structure of FIG. 5A taken along cross-sectional line A-A'.

As shown in cross-sectional view 510, the seal ring region 226 is arranged along opposing sides of the one or more PMUT regions 108 and the one or more CMUT regions 110. In some embodiments, the seal ring region 226 comprises a plurality of seal ring interconnects 512 arranged within the dielectric stack 104. The plurality of seal ring interconnects 512 are stacked onto one another. In some embodiments, the plurality of seal ring interconnects 512 are laterally separated from interconnects outside of the seal ring region 226. In some additional embodiments, the seal ring region 226 comprises a passivation structure 514 that is disposed over the one or more seal ring interconnects 512 and that vertically extends through multiple ones of the stacked dielectric layers of the dielectric stack 104. In some embodiments, the passivation structure 514 may comprise an oxide (e.g., silicon oxide), a nitride (e.g., silicon nitride), a carbide (e.g., silicon carbide), or the like.

Figure 6A:
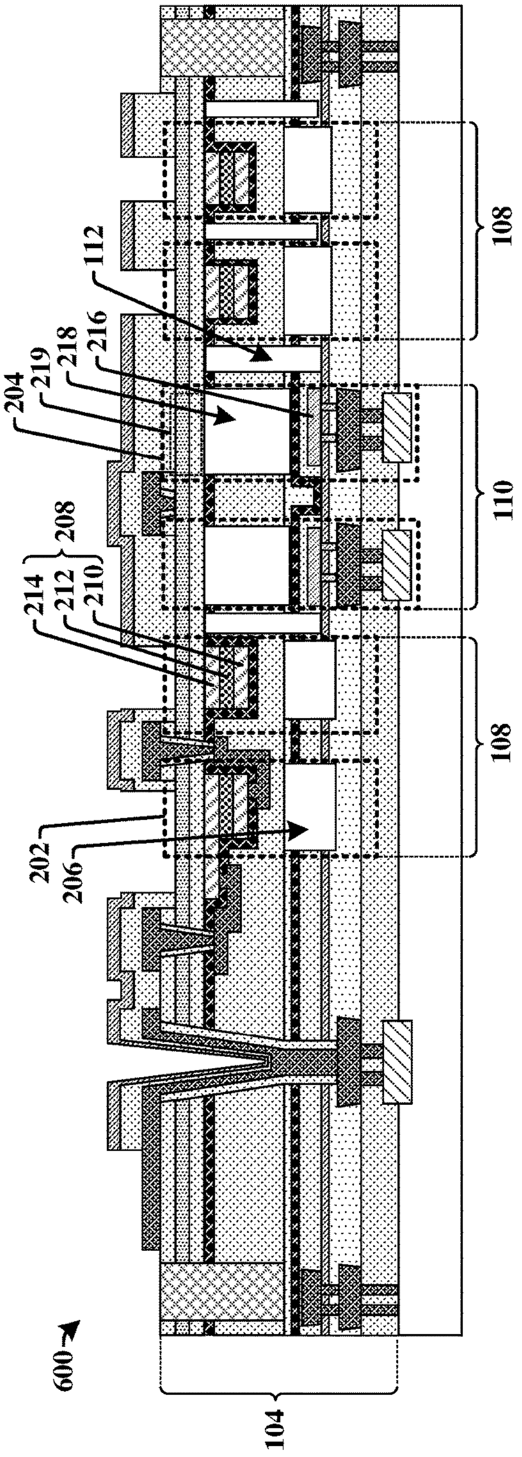
FIGS. 6A-6F illustrate some additional embodiments of an integrated chip structure comprising a CMUT and a PMUT.

FIG. 6A illustrates a cross-sectional view of some additional embodiments of an integrated chip structure 600 having a CMUT and a PMUT.

The integrated chip structure 600 comprises one or more PMUT regions 108 and one or more CMUT regions 110 disposed within a dielectric stack 104 over a substrate 102. The one or more PMUT regions 108 comprise one or more PMUTs 202 respectively including a piezoelectric stack 208 disposed over a PMUT cavity 206. The one or more CMUT regions 110 comprise one or more CMUTs 204 respectively including a bottom electrode 216 separated from a top electrode by a CMUT cavity 218. In some embodiments, the PMUT cavity 206 has a width that increases as a distance from the substrate 102 increases. In some embodiments, the CMUT cavity 218 has a width that increases as a distance from the substrate 102 decreases.

One or more isolation chambers 112 are disposed within a dielectric stack 104 over a substrate 102. The one or more isolation chambers 112 are arranged laterally between the one or more PMUT regions 108 and the one or more CMUT regions 110, between the one or more PMUTs 202 within the one or more PMUT regions 108, and/or between the one or more CMUTs 204 within the one or more CMUT regions 110.

Figure 6B:
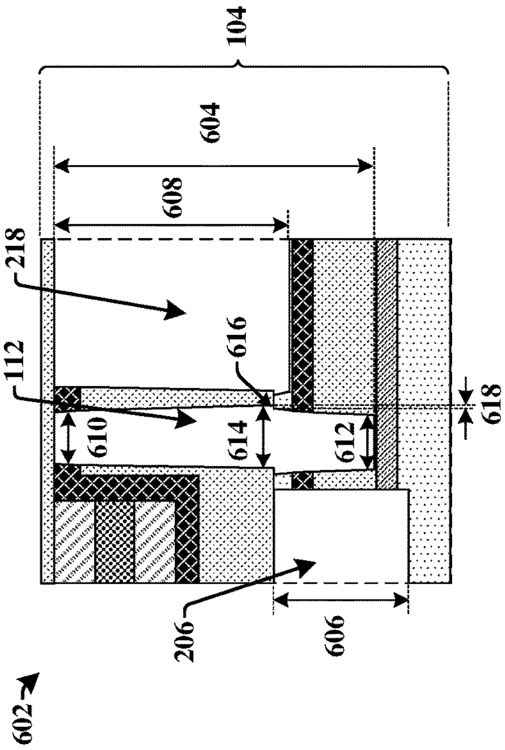

FIG. 6B illustrates a cross-sectional view 602 showing some additional embodiments of a part of the integrated chip structure of FIG. 6A.

As shown in cross-sectional view 602, in some embodiments the isolation chamber 112 may have a first height 604, the one or more PMUT cavities 206 may have a second height 606, and the one or more CMUT cavities 218 may have a third height 608. The first height 604 may be larger than the second height 606 and the third height 608. In some embodiments, the isolation chamber 112 may have a width that varies over a height of the isolation chamber 112. In some embodiments, the isolation chamber 112 has a tapered sidewalls that increase a width of the isolation chamber 112 as distances from a top and a bottom of the isolation chamber 112 increase, so that the isolation chamber 112 has a maximum width at a location that is vertically between the top and the bottom of the isolation chamber 112. For example, in some embodiments the isolation chamber 112 has a first width 610 along the top of the isolation chamber 112, a second width 612 along the bottom of the isolation chamber 112, and a third width 614 between the top and the bottom of the isolation chamber 112 (e.g., at a vertical middle of the isolation chamber 112). The third width 614 is larger than the first width 610 and/or the second width 612.

In some embodiments, the isolation chamber 112 may be defined by a horizontal surface 616 of the dielectric stack 104 that is arranged vertically between an overlying sidewall of the dielectric stack 104 and an underlying sidewall of the dielectric stack 104. In some embodiments, the horizontal surface 616 of the dielectric stack 104 may have a fourth width 618. The fourth width 618 is in a range of between approximately 1 μm and approximately 20 μm, between approximately 5 μm and approximately 10 μm, or other similar values.

Figure 6C:
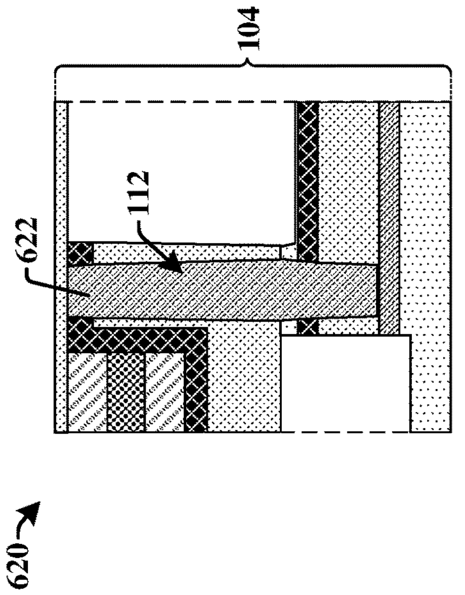

FIG. 6C illustrates a cross-sectional view 620 showing some additional embodiments of a part of the integrated chip structure of FIG. 6A.

As shown in cross-sectional view 620, the isolation chamber 112 is completely filled with an acoustic wave absorption material 622 (e.g., polyimide, SiLK, Porous MSQ, a porous polymer material, or the like). The acoustic wave absorption material 622 contacts sidewalls, an upper surface, and a lower surface of the dielectric stack 104 that form the isolation chamber 112. In some embodiments, the acoustic wave absorption material 622 laterally contacts two or more of a plurality of dielectric layers within the dielectric stack 104.

Figure 6D:
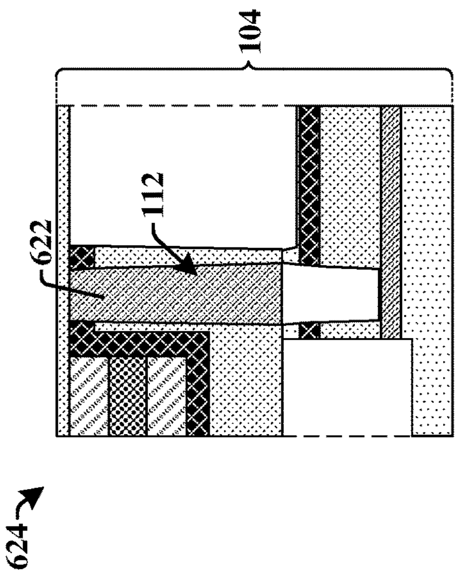

FIG. 6D illustrates a cross-sectional view 624 showing some additional embodiments of a part of the integrated chip structure of FIG. 6A.

As shown in cross-sectional view 624, an upper portion of the isolation chamber 112 is filled with an acoustic wave absorption material 622 (e.g., polyimide, SiLK, Porous MSQ, or the like), while a lower portion of the isolation chamber 112 is filled with a gas or vacuum. In some embodiments, a bottom of the acoustic wave absorption material 622 is substantially co-planar with a lower surface of one of the plurality of dielectric layers within the dielectric stack 104.

Figure 6E:
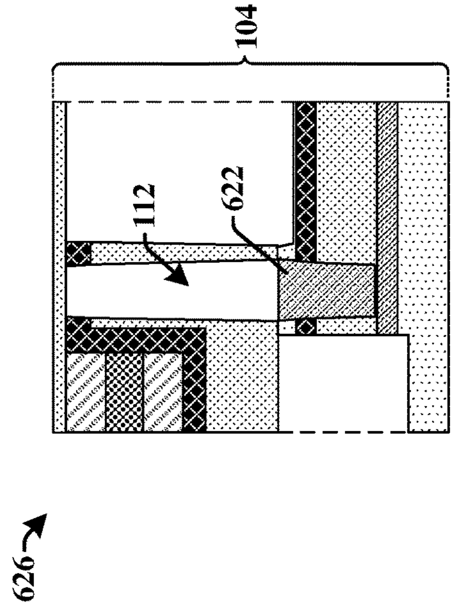

FIG. 6E illustrates a cross-sectional view 626 showing some additional embodiments of a part of the integrated chip structure of FIG. 6A.

As shown in cross-sectional view 626, an upper portion of the isolation chamber 112 is filled with a gas or vacuum, while a lower portion of the isolation chamber 112 is filled is filled with an acoustic wave absorption material 622 (e.g., polyimide, SiLK, Porous MSQ, or the like). In some embodiments, a top of the acoustic wave absorption material 622 is substantially co-planar with an upper surface of one of the plurality of dielectric layers within the dielectric stack 104.

Figure 6F:
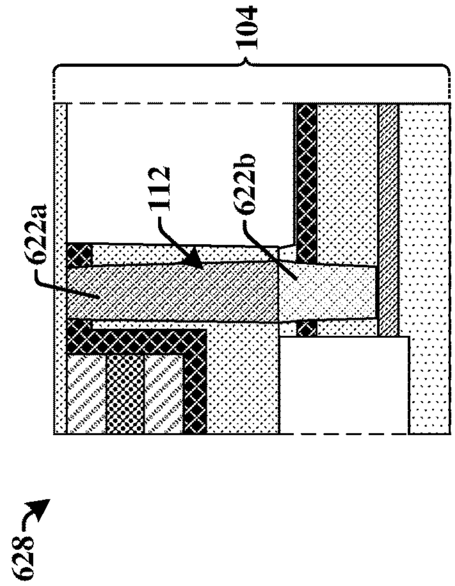

FIG. 6F illustrates a cross-sectional view 628 showing some additional embodiments of a part of the integrated chip structure of FIG. 6A.

As shown in cross-sectional view 628, an upper portion of the isolation chamber 112 is filled with a first acoustic wave absorption material 622*a* (e.g., polyimide), while a lower portion of the isolation chamber 112 is filled with a second acoustic wave absorption material 622*b* (e.g., SiLK). In some embodiments, the bottom of the first acoustic wave absorption material 622*a* is substantially co-planar with a lower surface of a first one of the plurality of dielectric layers within the dielectric stack 104 and a top of the second acoustic wave absorption material 622*b* is substantially co-planar with a lower surface of a second one of the plurality of dielectric layers within the dielectric stack 104.

In various embodiments, the disclosed integrated chip structure may be implemented with various devices. For example, FIG. 7 illustrates a cross-sectional view of some embodiments of an integrated chip structure 700 comprising CMUTs and PMUTs integrated with memory devices.

The integrated chip structure 700 comprises a plurality of memory devices 702 disposed within a dielectric stack 104 disposed over a substrate 102. The plurality of memory devices 702 respectively comprise a data storage structure 706 disposed between a lower electrode 704 and an upper electrode 708. In some embodiments, the plurality of memory devices 702 may comprise RRAM (resistive random access memory) devices, MRAM (magnetoresistive random access memory) devices, FRAM (ferroelectric random access memory) devices, CBRAM (conductive bridge random access memory) devices, or the like. In some embodiments, the plurality of memory devices 702 may be arranged within a third interconnect layer to an eighth interconnect layer. The plurality of memory devices 702 may be coupled to one or more PMUTs 202 within one or more PMUT regions 108 and to one or more CMUTs 204 within one or more CMUT regions 110, so as to enable high speed reading and writing of data.

Figure 7:
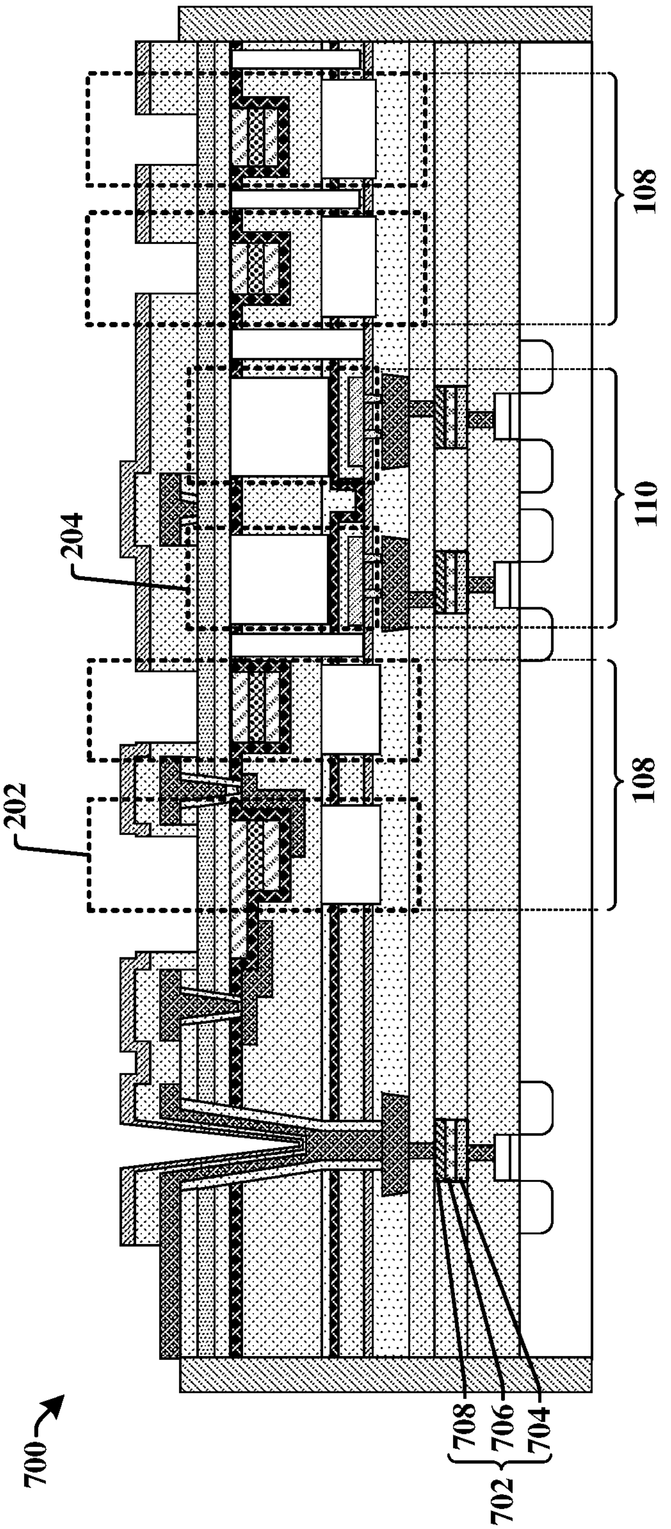
FIG. 7 illustrates a cross-sectional view of some additional embodiments of an integrated chip structure comprising a CMUT and a PMUT.

Although FIG. 7 illustrates the disclosed integrated chip structure as being implemented with a plurality of memory devices, it will be appreciated that the disclosed integrated chip structure is not limited to integration with such devices. Rather, it will be appreciated that the disclosed integrated chip structure may be implemented with a wide range of devices. For example, in some embodiments disclosed integrated chip structure may be implemented with a bipolar-CMOS-DMOS (BCD) device and/or a high voltage device for operation of the PMUTs and the CMUTs. In other embodiments, the disclosed integrated chip structure may be implemented with high performance computing (HPC) device for real time image processing and output. In yet other embodiments, the disclosed integrated chip structure may comprise PMUTs and CMUTs integrated with a FUSE element (e.g., a laser trimmed fuse, an eFUSE, etc.) so as to enable a power-on self-test (POST) functionality and kill disqualified pixels.

Figure 8:
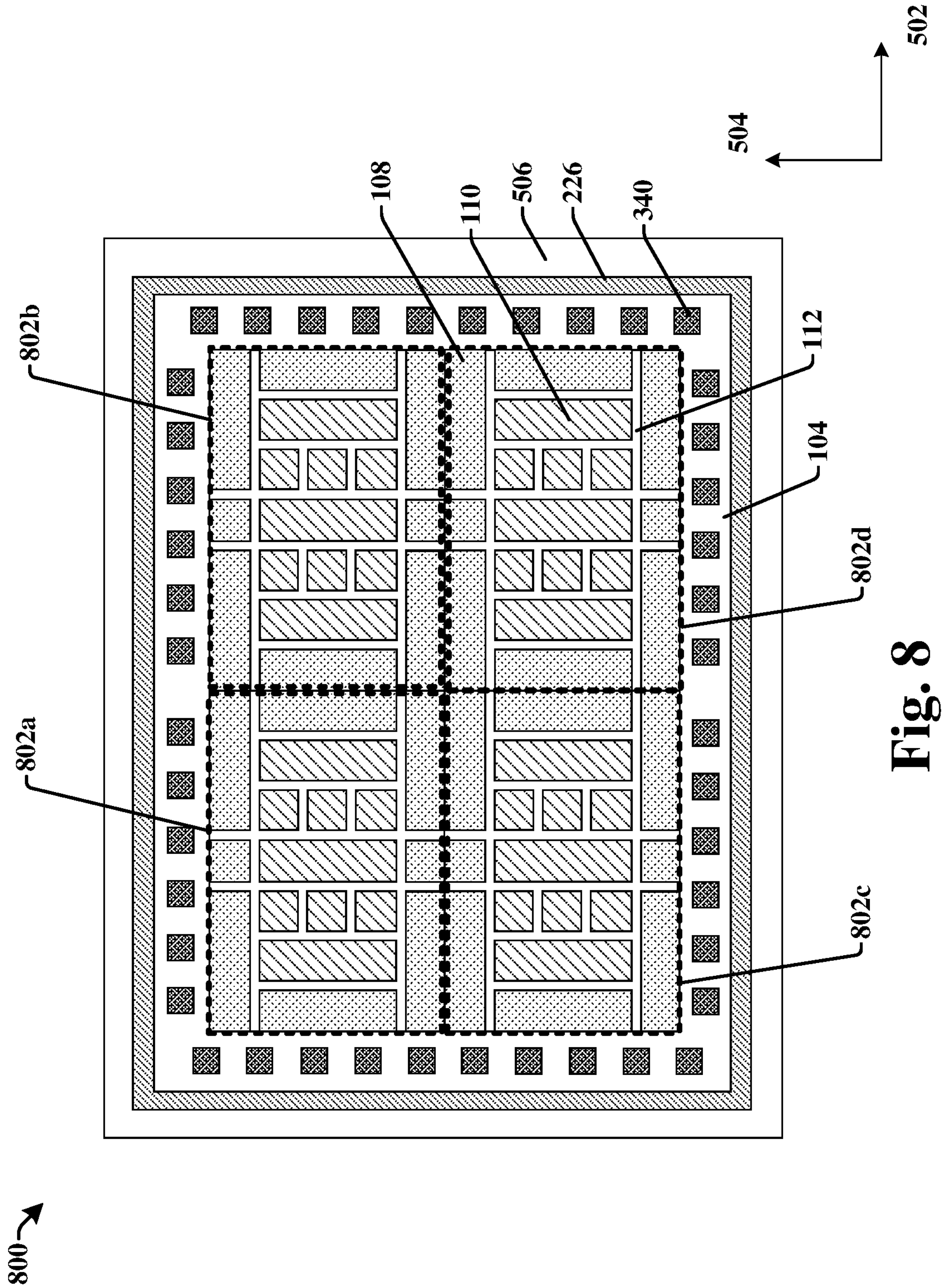
FIG. 8 illustrates a top-view of some embodiments of an integrated chip structure comprising a micromachined ultrasonic transducer array having a plurality of pixels respectively comprising CMUTs and PMUTs.

FIG. 8 illustrates a top-view of some embodiments of an integrated chip structure 800 comprising a micromachined ultrasonic transducer (MUT) array having a plurality of pixels respectively comprising CMUTs and PMUTs.

The integrated chip structure 800 comprises a plurality of pixels 802*a*-802*d* arranged in rows (e.g., extending in a first direction 502) and columns (e.g., extending in a second direction 504) within a MUT array. The plurality of pixels 802*a*-802*d* respectively comprise one or more PMUT regions 108 and one or more CMUT regions 110. The one or more PMUT regions 108 within a respective pixel of the plurality of pixels 802*a*-802*d* comprise one or more PMUTs. The one or more CMUT regions 110 within a respective pixel of the plurality of pixels 802*a*-802*d* comprise one or more CMUTs. In some embodiments, the size of the MUT array may be between approximately 10 pixels by approximately 10 pixels and approximately 1000 pixels by 1000 pixels. In other embodiments, the size of the MUT array may be larger than 1000 pixels by 1000 pixels.

The plurality of pixels 802*a*-802*d* are surrounded by a plurality of bond pad regions 340. The plurality of bond pad regions 340 may be aligned along the first direction 502 and along the second direction 504. A seal ring region 226 continuously extends around the plurality of bond pad regions 340. In some embodiments, a scribe line region 506 may also extend around the seal ring region 226.

Figure 9A:
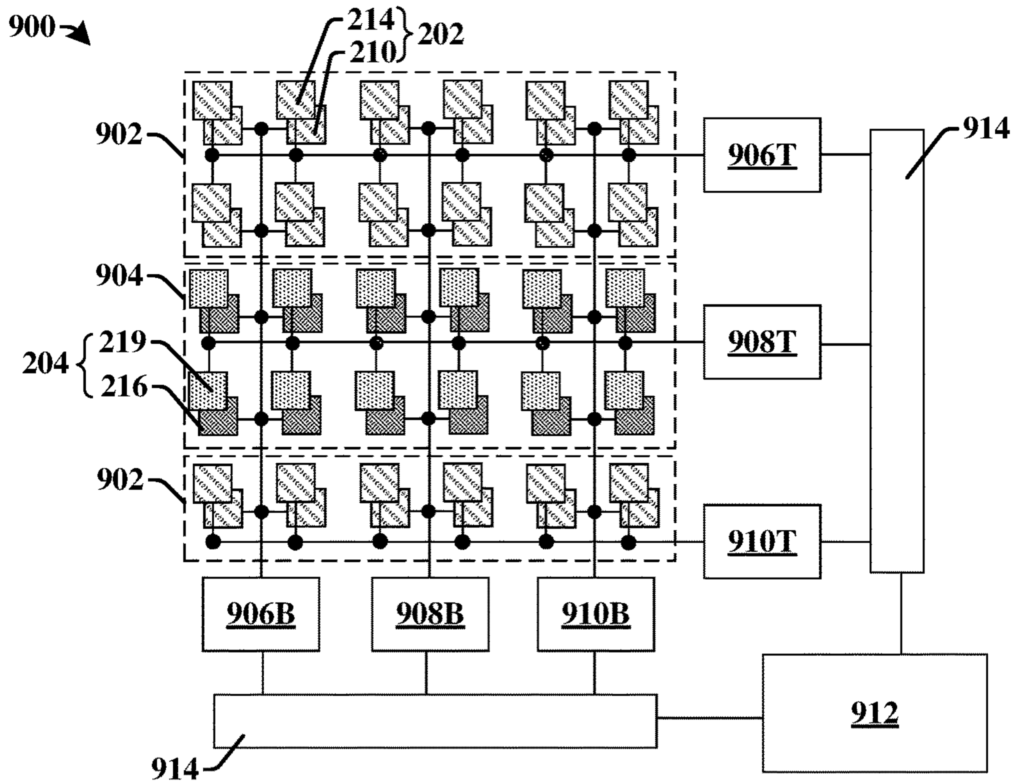
FIGS. 9A-9C illustrate block diagrams showing operation of a micromachined ultrasonic transducer (MUT) array comprising CMUTs and PMUTs.
Figure 9B:
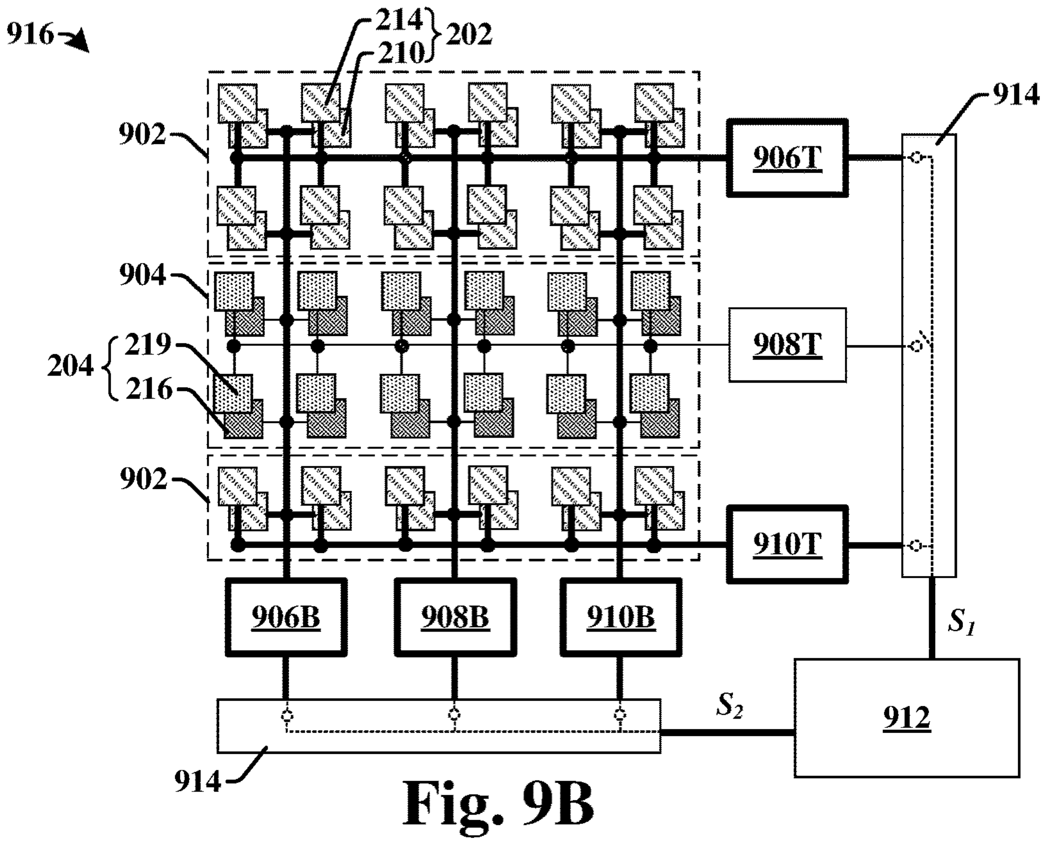
Figure 9C:
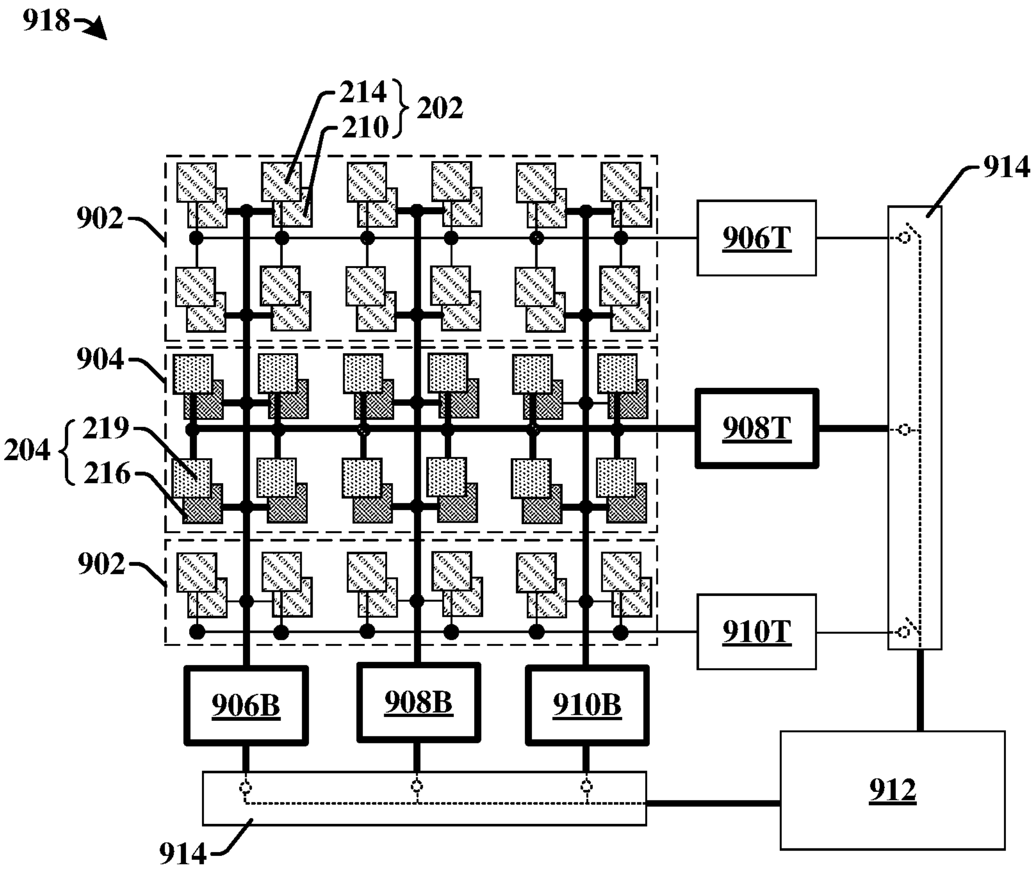

FIGS. 9A-9C illustrate schematic block diagrams showing operation of an ultrasonic transducer array having transducer cells comprising CMUTs and PMUTs.

FIG. 9A is a schematic block diagram of a MUT array 900. The MUT array 900 comprises PMUTs 202 and CMUTs 204 arranged in rows and/or columns. Rows of the MUT array 900 comprise one or more PMUT regions 902 or one or more CMUT regions 904. The one or more PMUT regions 902 comprise one or more PMUTs 202 respectively having a lower electrode 210 and an upper electrode 214. The one or more CMUT regions 904 comprise one or more CMUTs 204 respectively having a bottom electrode 216 and a top electrode 219.

The MUT array 900 further includes a wiring structure electrically coupling the one or more PMUTs 202 and the one or more CMUTs 204 to a control circuitry 912. Within the one or more PMUT regions 902, the one or more PMUTs 202 respectively have an upper electrode 214 that is operably coupled to top electrode pads 906T and 910T and a lower electrode 210 that is operably coupled to bottom electrode pads 906B-910B by the wiring structure. Within the one or more CMUT regions 904, the one or more CMUTs 204 respectively have a top electrode 219 that is operably coupled to top electrode pad 908T and a bottom electrode 216 that is operably coupled to bottom electrode pads 906B-910B by the wiring structure. In some embodiments, the control circuitry 912 may be operably coupled to the one or more PMUTs 202 and the one or more CMUTs 204 by way of one or more access devices 914 (e.g., a transistor device, a bipolar selector, a unipolar selector, or the like).

During operation, the control circuitry 912 is configured to selectively provide signals to the one or more PMUTs 202 and/or to the one or more CMUTs 204. By selectively providing signals to the one or more PMUTs 202 and/or the one or more CMUTs 204, the MUT array 900 may be configured to utilize selective devices that can provide for good performance as a transducer operating as a sensor and/or as an actuator. Furthermore, utilizing selective devices allows for the MUT array 900 to have a wide frequency bandwidth and a high resolution.

In some embodiments, the control circuitry 912 is configured to operate the one or more PMUTs 202 and/or the one or more CMUTs 204 at separate times to avoid cross-talk between the one or more PMUTs 202 and/or the one or more CMUTs 204 and to thereby further improve performance of the MUT array 900.

For example, FIGS. 9B-9C illustrate a non-limiting example of the operation of the disclosed MUT array 900 of FIG. 9A. FIG. 9B is a schematic top-view 916 of the MUT array 900 of FIG. 9A during an actuating operation.

As shown in schematic top-view 916, at a first time the control circuitry 912 may be configured to perform an actuating operation by providing a first signal $S_1$ to top electrode pads 906T and 910T, which are coupled to the upper electrode 214 of the one or more PMUTs 202 within the one or more PMUT regions 902 by the wiring structure. The control circuitry 912 is concurrently configured to apply a second signal $S_2$ to bottom electrode pads 906B-910B, which are coupled to the lower electrode 210 of the one or more PMUTs 202 within the one or more PMUT regions 902 by the wiring structure. The first signal $S_1$ and the second signal $S_2$ cause the one or more PMUTs 202 within the one or more PMUT regions 902 to generate a first ultrasonic signal that is output from the MUT array. Because the first signal $S_1$ is not applied to top electrode pad 908T, the one or more CMUTs 204 within the one or more CMUT regions 904 do not operate to contribute to the signal.

FIG. 9C is a schematic top-view 918 of the MUT array 900 of FIG. 9A during a sensing operation.

As shown in schematic top-view 918, at a second time the control circuitry 912 may be configured to perform a sensing operation by receiving a signal from the one or more CMUTs 204 within the one or more CMUT regions 904. To perform the sensing operation, the one or more bottom electrode pads 906B-910B are coupled to a bottom electrode 216 of the one or more CMUTs 204 in the one or more CMUT regions 904 by way of the wiring structure. Top electrode pad 908T is coupled to a top electrode 219 of the one or more CMUTs 204 in the one or more CMUT regions 904 by way of the wiring structure. By connecting the bottom electrode 216 and the top electrode 219 of the one or more CMUTs 204 to the control circuitry 912, a signal can be received by the one or more CMUTs 204. To avoid interference between the one or more PMUTs 202 and the one or more CMUTs 204 during the sensing operation, the one or more PMUTs 202 are disconnected from the control circuitry 912.

FIGS. 10A-10D illustrate diagrams showing an ultrasonic probe system comprising an ultrasonic transducer chip comprising CMUTs and PMUTs.

FIG. 10A illustrates a top-view 1000 of an ultrasonic probe system. As shown in top-view 1000, the ultrasonic probe system comprises a plurality of modules 1002-1006 disposed within a probe housing 1008 that surrounds the plurality of modules 1002-1006. The plurality of modules 1002-1006 respectively comprise both CMUTs and PMUTs. In some embodiments, the plurality of modules 1002-1006 may comprise a first module 1002 having both CMUTs and PMUTs, a second module 1004 having both CMUTs and PMUTs, and a third module 1006 having both CMUTs and PMUTs. In some embodiments, the first module 1002, the second module 1004, and the third module 1006 may comprise different numbers and/or ratios of CMUTs and/or PMUTs. For example, the first module 1002 may have a greater ratio of CMUTs to PMUTs than the second module 1004.

In some embodiments, the first module 1002 and the third module 1006 may be disposed within the ultrasonic probe system along opposing sides of the second module 1004. In some embodiments, two or more of the plurality of modules 1002-1006 may have different shapes. In some embodiments, two or more of the plurality of modules 1002-1006 may have substantially similar shapes.

FIG. 10B illustrates a cross-sectional view 1010 of the ultrasonic probe system of FIG. 10A. In some embodiments, the plurality of modules 1002-1006 may comprise several chips that are arranged along a curved line.

It will be appreciated that in various embodiments, different modules of the plurality of modules 1002-1006 may be used to generate and/or receive ultrasonic waves. Using different modules of the plurality of modules 1002-1006 to generate and/or receive ultrasonic waves can achieve different performances during different modes of operation. For example, FIGS. 10C and 10D illustrates cross-sectional views showing operation of the ultrasonic probe system of FIG. 10B in two different modes of operation. It will be appreciated that the disclosed ultrasonic probe system is not limited to such modes of operation, but that the modes of operation shown in FIGS. 10C and 10D are non-limiting examples.

As shown in cross-sectional view 1012 of FIG. 10C, during a first mode of operation a transmitted ultrasonic wave 1014 may be generated by one or more PMUTs within the first module 1002 and the third module 1006. The transmitted ultrasonic wave 1014 may reflect off of a target object 1016 (e.g., a person) as a reflected ultrasonic wave 1018. The reflected ultrasonic wave 1018 may be received by one or more CMUTs within the second module 1004. In some embodiments, the first mode of operation may provide for good performance for deep tissue imaging in a precise location.

As shown in cross-sectional view 1020 of FIG. 10D, during a second mode of operation a transmitted ultrasonic wave 1022 may be generated by one or more PMUTs within the second module 1004. The transmitted ultrasonic wave 1022 may reflect off of a target object 1024 (e.g., a person) as a reflected ultrasonic wave 1026. The reflected ultrasonic wave 1026 may be received by one or more CMUTs within the first module 1002 and the third module 1006. In some embodiments, the second mode of operation may provide for good performance for superficial tissue imaging with high resolution.

FIGS. 11-32 illustrate cross-sectional views 1100-3200 of some embodiments of a method of forming an integrated chip structure having a CMUT and a PMUT. Although FIGS. 11-32 are described in relation to a method, it will be appreciated that the structures disclosed in FIGS. 11-32 are not limited to such a method, but instead may stand alone as structures independent of the method. Furthermore, it will be appreciated that the structures illustrated in FIGS. 1-9 may be formed within alternative embodiments of the method shown in FIGS. 11-32.

Figure 11:
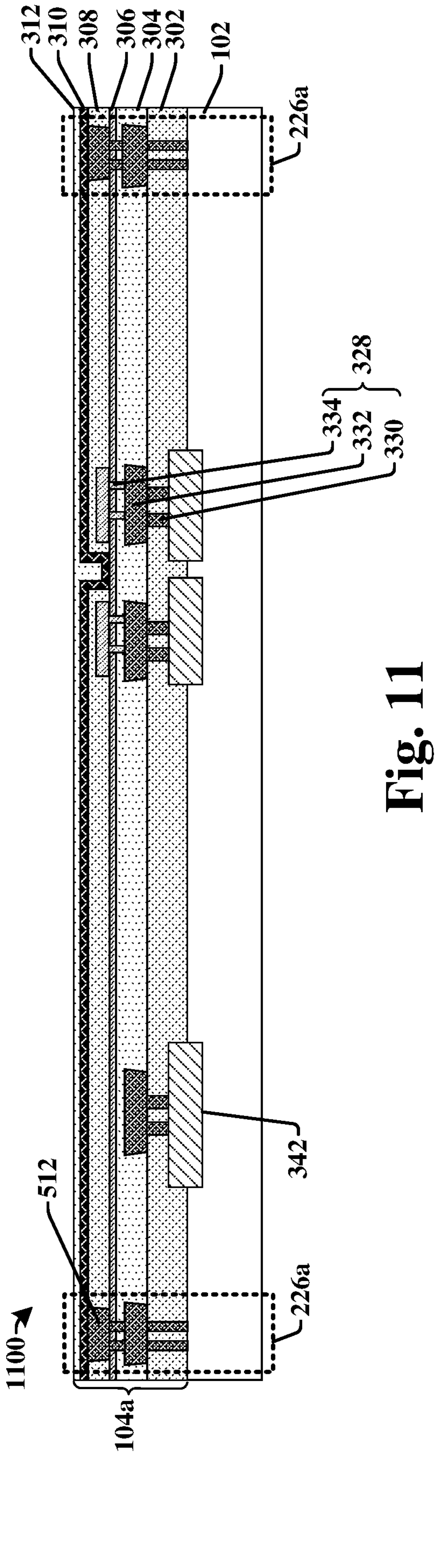
FIGS. 11-32 illustrate some embodiments of a method of forming an integrated chip structure comprising a CMUT and a PMUT.

As shown in cross-sectional view 1100 of FIG. 11, a substrate 102 is provided. In various embodiments, the substrate 102 may be any type of semiconductor body (e.g., silicon, SiGe, SOI, etc.), such as a semiconductor wafer and/or one or more die on a wafer, as well as any other type of semiconductor and/or epitaxial layers, associated therewith. In some embodiments, one or more devices 342 are formed on and/or within the substrate 102.

A first dielectric stack 104*a* is formed over the substrate 102. The first dielectric stack 104*a* may be formed by depositing a first plurality of dielectric layers over the substrate 102. The first plurality of dielectric layers may comprise a first dielectric layer 302 formed over the substrate 102, a second dielectric layer 304 formed over the first dielectric layer 302, a first passivation layer 306 formed over the second dielectric layer 304, a third dielectric layer 308 formed over the first passivation layer 306, a first high-k dielectric layer 310 formed over the third dielectric layer 308, and a fourth dielectric layer 312 formed over the first high-k dielectric layer 310.

In some embodiments, the first dielectric stack 104*a* may be deposited by a plurality of deposition processes (e.g., a physical vapor deposition (PVD) process, a chemical vapor deposition (CVD) process, a plasma enhanced CVD (PE-CVD) process, or the like). In some embodiments, a first plurality of interconnects 328 may be formed within the first dielectric stack 104*a*. The first plurality of interconnects 328 may comprise one or more conductive contacts 330, interconnect wires 332, and/or interconnect vias 334. In some embodiments, the first plurality of interconnects 328 may be respectively formed using a damascene process (e.g., a single damascene process or a dual damascene process). The damascene process is performed by forming a dielectric layer over the substrate 102, etching the dielectric layer to form a via hole and/or a trench, and filling the via hole and/or the trench with a conductive material. In some embodiments, the conductive material (e.g., tungsten, copper, aluminum, or the like) may be formed using a deposition process and/or a plating process (e.g., electroplating, electro-less plating, etc.).

In some embodiments, a first seal ring structure 226*a* may be formed within the first dielectric stack 104*a*. The first seal ring structure 226*a* may be formed by forming a plurality of seal ring interconnects 512 within the first dielectric stack 104*a*. In some embodiments, the plurality of seal ring interconnects 512 may be respectively formed using a damascene process (e.g., a single damascene process or a dual damascene process).

Figure 12:
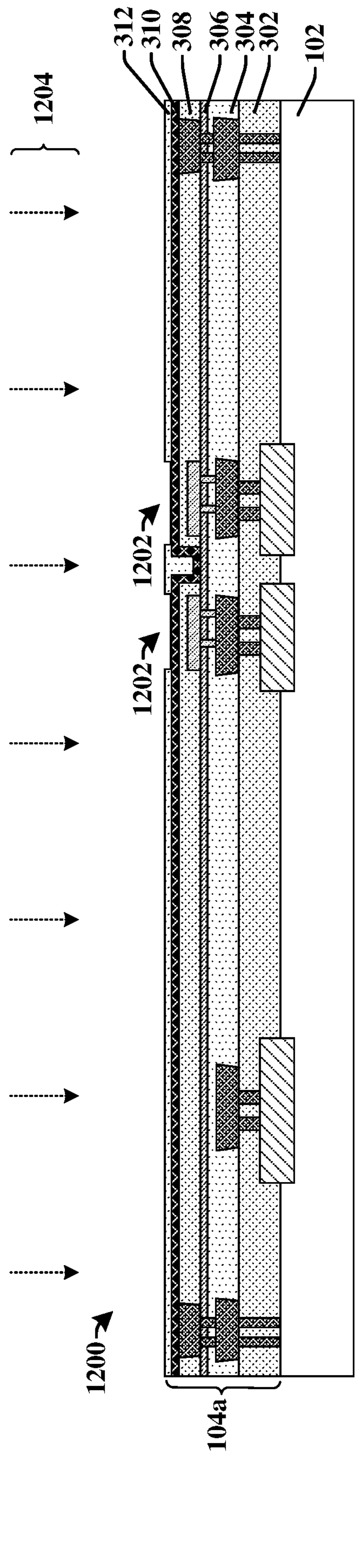

As shown in cross-sectional view 1200 of FIG. 12, a first plurality of intermediate CMUT cavities 1202 may be formed within the first dielectric stack 104*a*. The first plurality of intermediate CMUT cavities 1202 may be formed by selectively exposing the fourth dielectric layer 312 to a first etchant 1204 according to a first mask (not shown). In various embodiments, the first etchant 1204 may comprise a dry etchant (e.g., an ion beam etchant, a RIE etchant, or the like) or a wet etchant.

Figure 13:
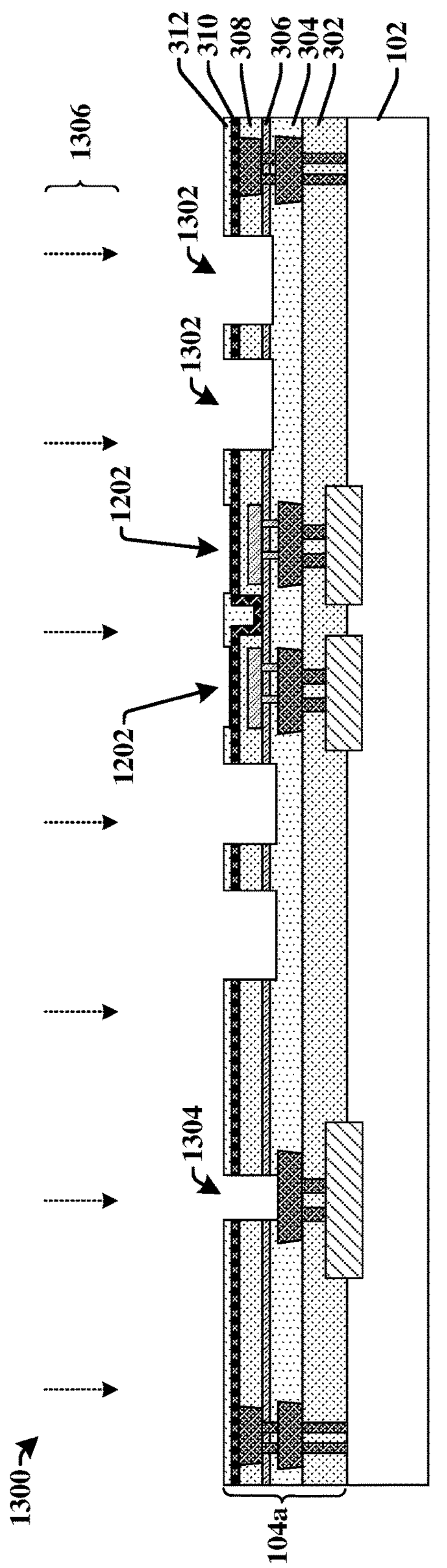

As shown in cross-sectional view 1300 of FIG. 13, a first plurality of intermediate PMUT cavities 1302 are formed within the first dielectric stack 104*a*. The first plurality of intermediate PMUT cavities 1302 may be formed by selectively exposing the second dielectric layer 304, the first passivation layer 306, the third dielectric layer 308, the first high-k dielectric layer 310, and the fourth dielectric layer 312 to a second etchant 1306 according to a second mask (not shown). In various embodiments, the second etchant 1306 may comprise a dry etchant (e.g., an ion beam etchant, a RIE etchant, or the like) or a wet etchant.

In some embodiments, one or more intermediate bond pad cavities 1304 are formed within the first dielectric stack 104*a*. The one or more intermediate bond pad cavities 1304 may be formed by selectively exposing the second dielectric layer 304, the first passivation layer 306, the third dielectric layer 308, the first high-k dielectric layer 310, and the fourth dielectric layer 312 to a third etchant (not shown) according to a third mask (not shown). In various embodiments, the third etchant may comprise a dry etchant (e.g., an ion beam etchant, a RIE etchant, or the like) or a wet etchant.

Figure 14:
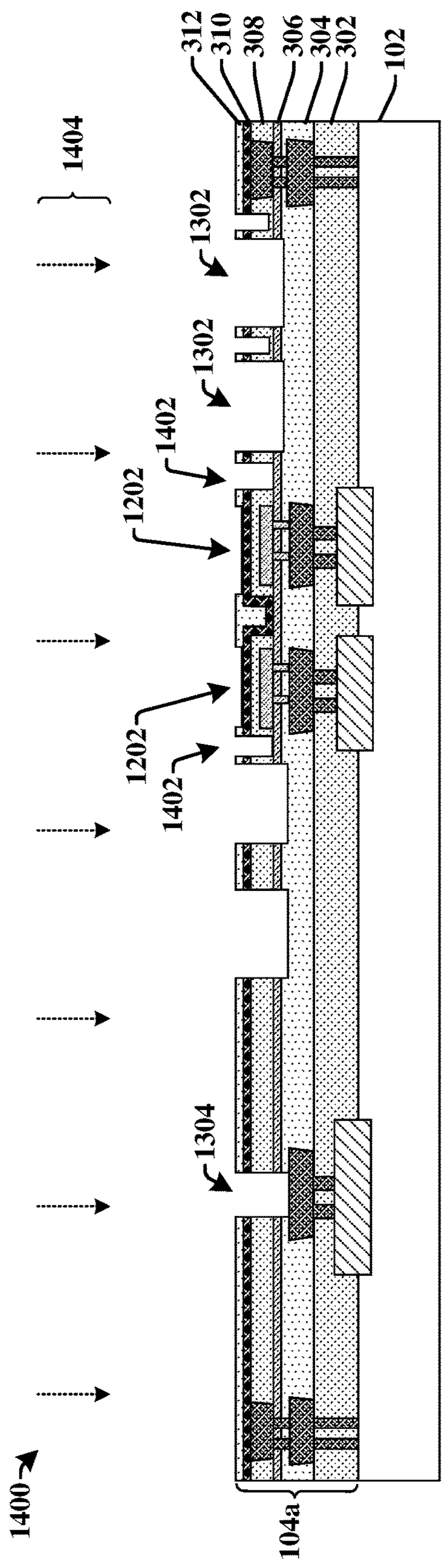

As shown in cross-sectional view 1400 of FIG. 14, a first plurality of isolation cavities 1402 are formed within the first dielectric stack 104*a*. The first plurality of isolation cavities 1402 may be formed by selectively exposing the third dielectric layer 308, the first high-k dielectric layer 310, and the fourth dielectric layer 312 to a fourth etchant 1404 according to a fourth mask (not shown). In various embodiments, the fourth etchant 1404 may comprise a dry etchant (e.g., an ion beam etchant, a RIE etchant, or the like) or a wet etchant.

Figure 15:
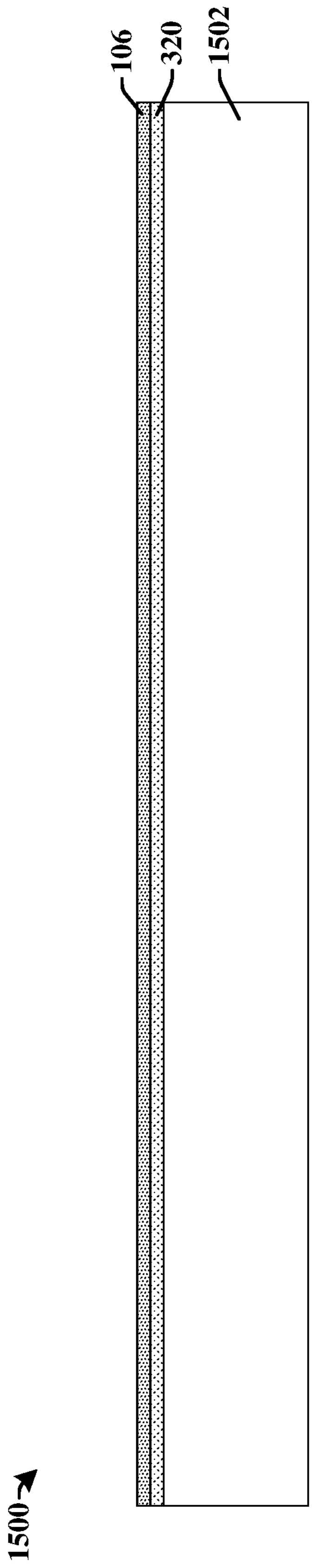

As shown in cross-sectional view 1500 of FIG. 15, a MEMS substrate 1502 is provided. In various embodiments, the MEMS substrate 1502 may be any type of semiconductor body (e.g., silicon, SiGe, SOI, etc.), such as a semiconductor wafer and/or one or more die on a wafer, as well as any other type of semiconductor and/or epitaxial layers, associated therewith.

A seventh dielectric layer 320 is formed over the MEMS substrate 1502 and a flexible membrane 106 is formed over the seventh dielectric layer 320. In some embodiments, the flexible membrane 106 may comprise a conductive material such as polysilicon doped with one or more impurities (e.g., N-type dopants or P-type dopants), a metal (e.g., copper, aluminum, tungsten, etc.), or the like.

Figure 16:
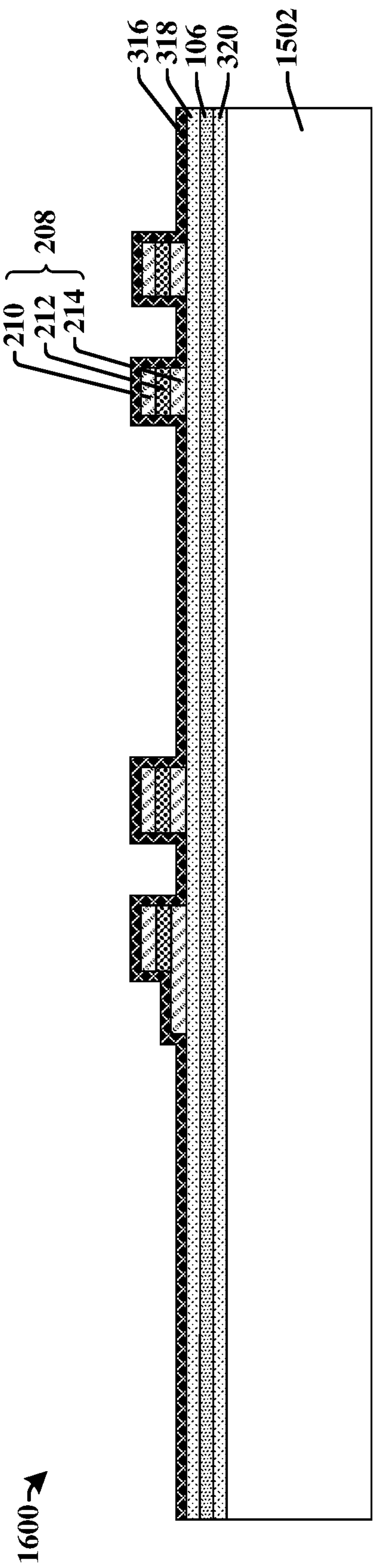

As shown in cross-sectional view 1600 of FIG. 16, a sixth dielectric layer 318 is formed on the flexible membrane 106. Piezoelectric stacks 208 are formed over the sixth dielectric layer 318. The piezoelectric stacks 208 respectively comprise a lower electrode 210 separated from an upper electrode 214 by a piezoelectric material 212. A second high-k dielectric layer 316 is formed over the sixth dielectric layer 318 and the piezoelectric stacks 208. The second high-k dielectric layer 316 may be conformally formed over the top surfaces and along sidewalls of the piezoelectric stacks 208.

Figure 17:
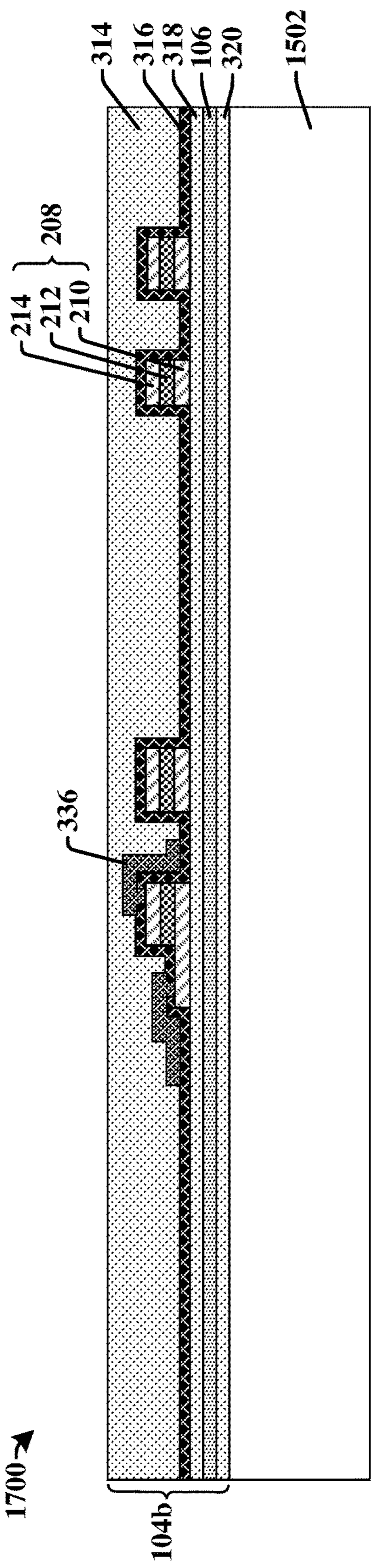

As shown in cross-sectional view 1700 of FIG. 17, a second plurality of interconnects 336 are formed over the second high-k dielectric layer 316. The second plurality of interconnects 336 are electrically coupled to the piezoelectric stacks 208. Subsequently, a fifth dielectric layer 314 is formed on the second high-k dielectric layer 316 and the second plurality of interconnects 336 to form a second dielectric stack 104*b*. In some embodiments, the second plurality of interconnects 336 may be respectively formed using a damascene process (e.g., a single damascene process or a dual damascene process). In other embodiments, the second plurality of interconnects 336 may be formed by a deposition and/or plating process followed by a patterning process.

Figure 18:
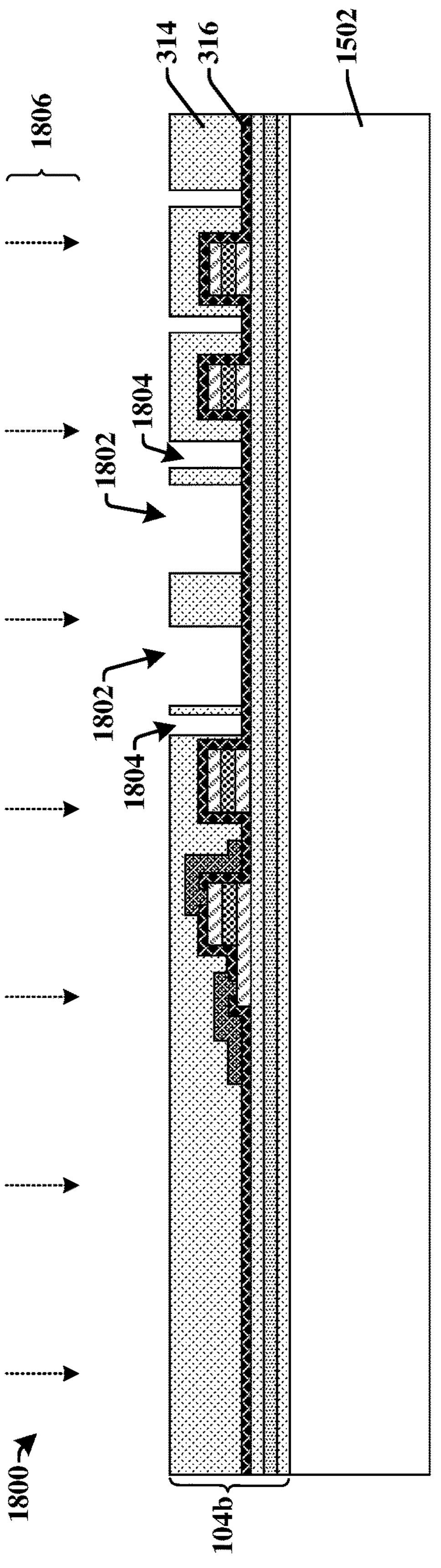

As shown in cross-sectional view 1800 of FIG. 18, a second plurality of intermediate CMUT cavities 1802 are formed within the second dielectric stack 104*b* on the MEMS substrate 1502. The second plurality of intermediate CMUT cavities 1802 are formed by selectively etching the second dielectric stack 104*b*. In some embodiments, the second plurality of intermediate CMUT cavities 1802 are formed by etching the fifth dielectric layer 314. In some embodiments, the second plurality of intermediate CMUT cavities 1802 have sidewalls tapering from the upper surface of the fifth dielectric layer 314 to an upper surface of the second high-k dielectric layer 316. In various embodiments, the second plurality of intermediate CMUT cavities 1802 may be formed by exposing the second dielectric stack 104*b* to a fifth etchant 1806 according to a fifth mask (not shown). In various embodiments, the fifth etchant 1806 may comprise a dry etchant (e.g., an ion beam etchant, a RIE etchant, or the like) or a wet etchant.

A second plurality of isolation cavities 1804 are also formed within the second dielectric stack 104*b*. The second plurality of isolation cavities 1804 are formed by selectively etching the second dielectric stack 104*b*. In some embodiments, the second plurality of isolation cavities 1804 have sidewalls tapering from the upper surface of the fifth dielectric layer 314 to an upper surface of the second high-k dielectric layer 316. In some embodiments, the second plurality of isolation cavities 1804 may be subsequently filled with one or more second acoustic wave absorption materials (e.g., polyimide, SiLK, Porous MSQ, or the like). In various embodiments, the second plurality of intermediate CMUT cavities 1802 may be formed by exposing the second dielectric stack 104*b* to a sixth etchant (not shown) according to a sixth mask (not shown). In various embodiments, the sixth etchant may comprise a dry etchant (e.g., an ion beam etchant, a RIE etchant, or the like) or a wet etchant. In some embodiments, the second plurality of isolation cavities 1804 may be formed concurrent with the second plurality of intermediate CMUT cavities 1802.

Figure 19:
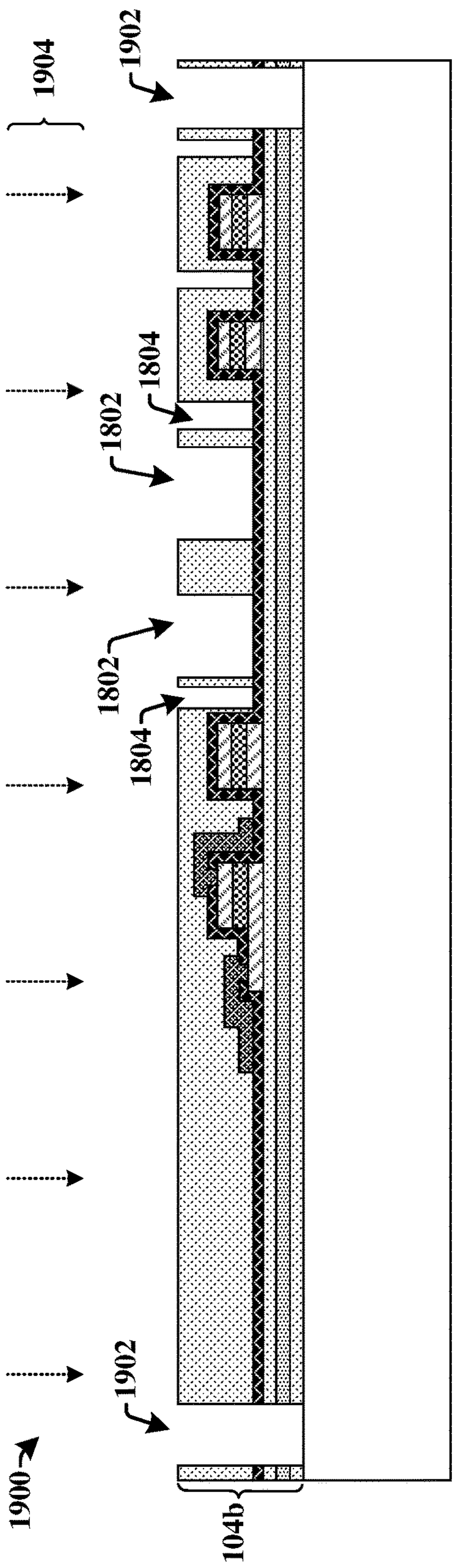

As shown in cross-sectional view 1900 of FIG. 19, the second dielectric stack 104*b* is selectively etched to form a seal ring trench 1902 extending through the second dielectric stack 104*b*. In some embodiments, the seal ring trench 1902 may vertically extend from a top of the second dielectric stack 104*b* to the MEMS substrate 1502. In various embodiments, the seal ring trench 1902 may be formed by exposing the second dielectric stack 104*b* to a seventh etchant 1904 according to a seventh mask (not shown). In various embodiments, the seventh etchant 1904 may comprise a dry etchant (e.g., an ion beam etchant, a RIE etchant, or the like) or a wet etchant.

Figure 20:
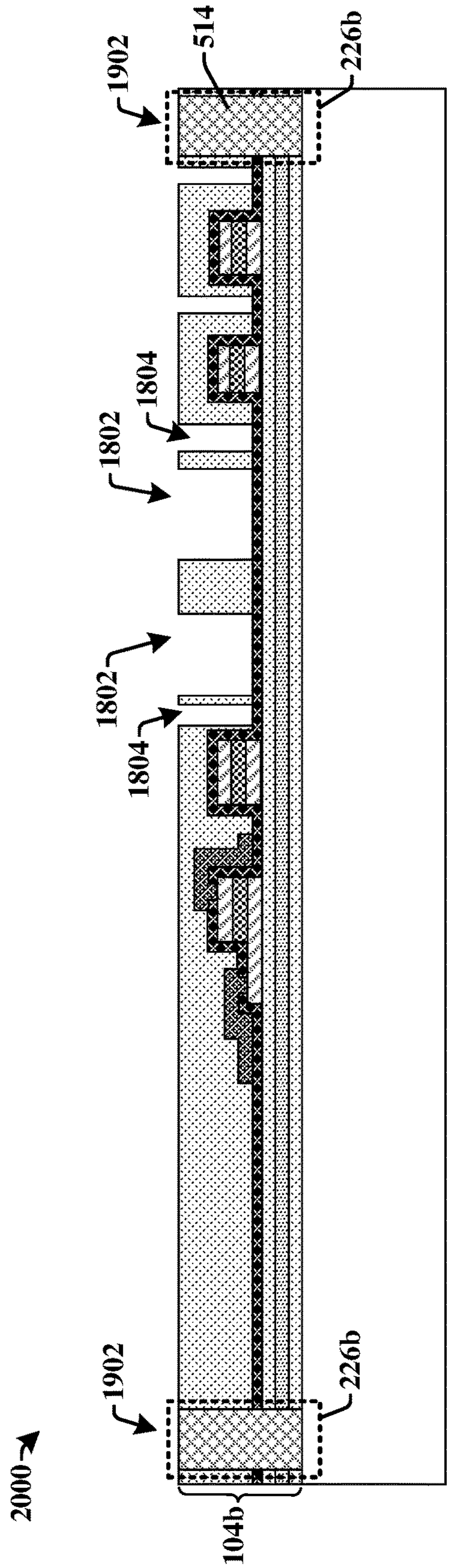

As shown in cross-sectional view 2000 of FIG. 20, a passivation structure 514 is formed within the seal ring trench 1902 to form a second seal ring structure 226*b*. In some embodiments, the passivation structure 514 may be formed to fill the seal ring trench 1902. The passivation structure 514 may comprise an oxide, a nitride, a carbide, or the like. In various embodiments, the passivation structure 514 may be formed by way of a deposition process (e.g., a PVD process, a CVD process, a PE-CVD process, or the like). In some embodiments, the passivation structure 514 may be formed prior to forming the second plurality of intermediate CMUT cavities 1802 and/or the second plurality of isolation cavities 1804.

Figure 21:
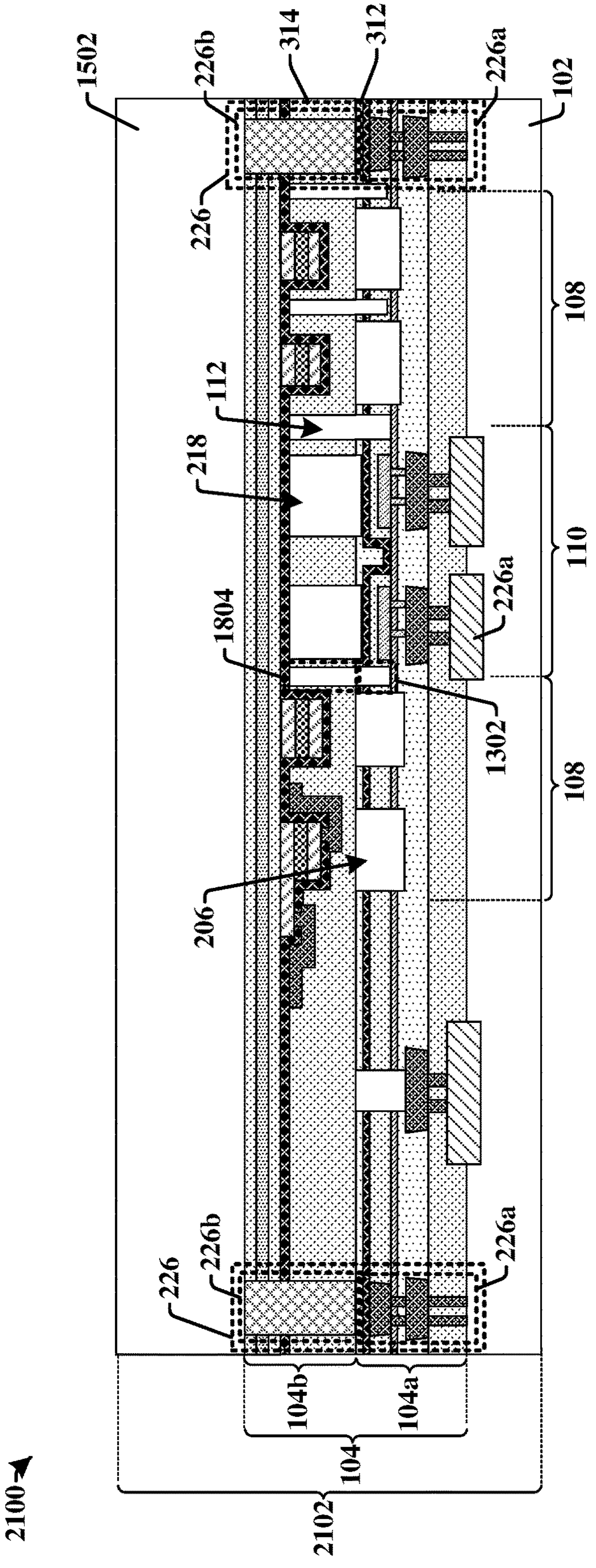

As shown in cross-sectional view 2100 of FIG. 21, the MEMS substrate 1502 is bonded to the substrate 102 to form a bonded substrate stack 2102. The bonding process forms a dielectric stack 104 arranged between the substrate 102 and the MEMS substrate 1502. In some embodiments, the bonding process may comprise a fusion bonding process that bonds together the first dielectric stack 104*a* to the second dielectric stack 104*b* (e.g., that bonds the fourth dielectric layer 312 within the first dielectric stack 104*a* to the fifth dielectric layer 314 within the second dielectric stack 104*b*).

In the bonded substrate stack 2102 resulting from the bonding process, the first plurality of isolation cavities 1402 are brought together with the second plurality of isolation cavities 1804 to form one or more isolation chambers 112 that are laterally disposed between one or more PMUT cavities 206 and one or more CMUT cavities 218. Furthermore, the first seal ring structure 226*a* and the second seal ring structure 226*b* are brought together to form a seal ring region 226.

It will be appreciated that forming the MEMS substrate 1502 separate from the substrate 102 allows for processes to be performed on the substrate 102 and the MEMS at different temperatures. For example, in some embodiments, the one or more piezoelectric stacks 208 may be formed on the MEMS substrate 1502 using processes that are in a first temperature range, while the substrate 102 may be exposed to processes that are in a second temperature range that is different than (e.g., less than) the first temperature range. In some embodiments, the first temperature range may be between approximately 400° C. and approximately 700° C. In some embodiments, the second temperature range may be approximately 400° C.

Furthermore, it has been appreciated that the high temperatures used in a thermocompression bonding process may damage some devices within the bonded substrate stack 2102. Fusion bonding is able to be performed at a lower temperature than thermocompression bonding, so as to allow for a wider range of devices to be implemented within the bonded substrate stack 2102. For example, the use of fusion bonding may allow for the integration of ASIC CMOS devices into the bonded substrate stack 2102.

Figure 22A:
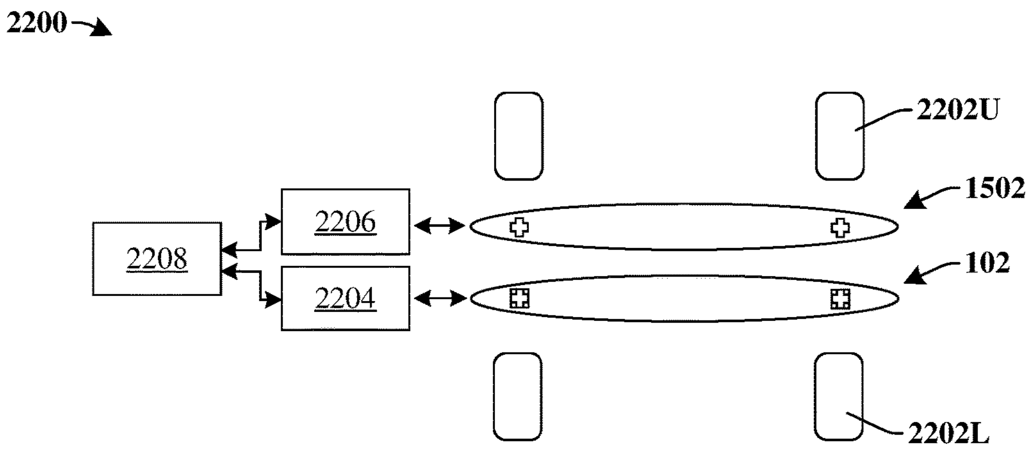
Figure 22B:
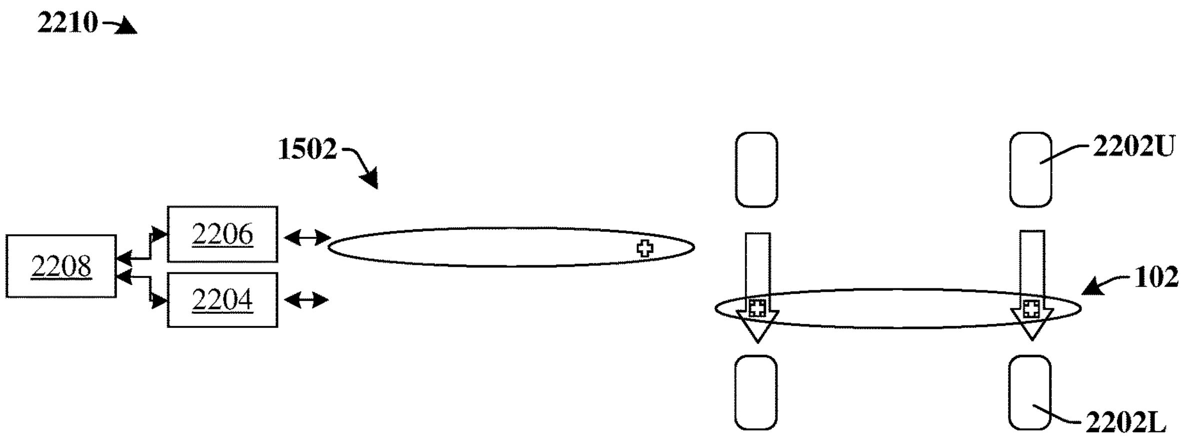

It will be appreciated that to properly form the one or more PMUT cavities 206, the one or more CMUT cavities 218, and the one or more isolation chambers 112, the MEMS substrate 1502 is aligned with the substrate 102 prior to the bonding process. FIGS. 22A-22B illustrate some exemplary embodiments of an alignment process that may be used to align the substrate 102 and the MEMS substrate 1502 prior to the bonding process (e.g., shown in FIG. 21).

As shown in cross-sectional view 2200 of FIG. 22A, the substrate 102 and the MEMS substrate 1502 are provided into an alignment tool having an upper objective lens system 2202U and a lower objective lens system 2202L. In some embodiments, the alignment tool may comprise one or more translation elements 2204-2206 (e.g., moveable platforms, robotic arms, or the like) coupled to a control unit 2208. The control unit 2208 is configured to operate the one or more translation elements 2204-2206 to move the substrate 102 and the MEMS substrate 1502 along a plurality of different directions.

As shown in cross-sectional view 2210 of FIG. 22B, one or more first alignment marks on the substrate 102 are located. In some embodiments, the one or more first alignment marks are located by utilizing a first translation element 2204 to move the substrate 102 until the upper objective lens system 2202U identifies the one or more first alignment marks. In some embodiments, the control unit 2208 saves one or more first locations of the substrate 102 based on the one or more first alignment marks.

Figure 22C:
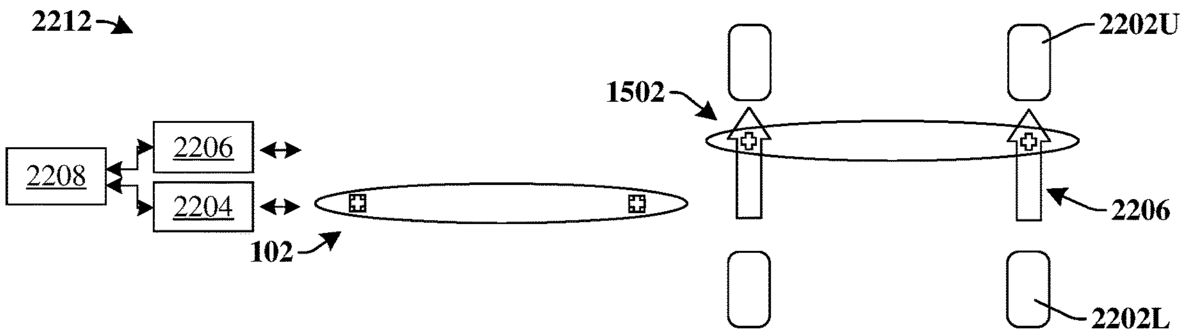

As shown in cross-sectional view 2212 of FIG. 22C, one or more second alignment marks on the MEMS substrate 1502 are located. In some embodiments, because the MEMS substrate 1502 is flipped prior to performing the bonding process, the one or more second alignment marks are located by utilizing a second translation element 2206 to move the substrate 102 until the lower objective lens system 2202L identifies the one or more second alignment marks. In some embodiments, the control unit 2208 saves one or more second locations of the MEMS substrate 1502 based on the one or more second alignment marks.

Figure 22D:
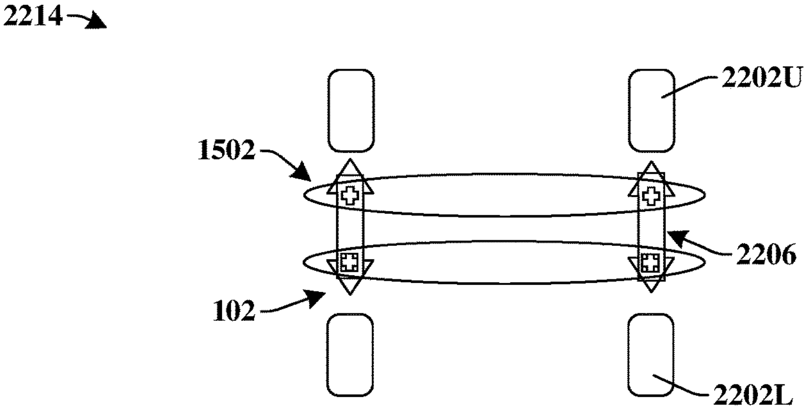

As shown in cross-sectional view 2214 of FIG. 22D, the substrate 102 and the MEMS substrate 1502 are aligned. In some embodiments, the substrate 102 and the MEMS substrate 1502 are aligned by operating the first translation element 2204 to move the substrate 102 to a first position that is based on the one or more first locations and by further operating the second translation element 2206 to move the MEMS substrate 1502 to a second position that is based on the one or more second locations. In some embodiments, moving the substrate 102 to the first position and the MEMS substrate 1502 to the second position causes the one or more first alignment marks to overlap the one or more second alignment marks.

Figure 22E:
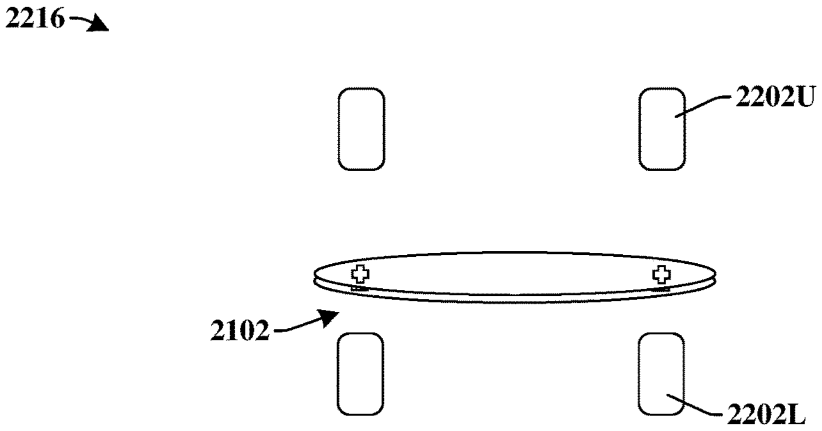

As shown in cross-sectional view 2216 of FIG. 22E, the substrate 102 is brought into contact with the MEMS substrate 1502. After bringing the substrate 102 into contact with the MEMS substrate 1502, the substrate 102 and the MEMS substrate 1502 may be bonded to one another to form the bonded substrate stack 2102. In some embodiments, after being brought into contact with one another the substrate 102 and the MEMS substrate 1502 may be clamped together and then moved to another processing tool that is configured to perform the bonding process.

Figure 23:
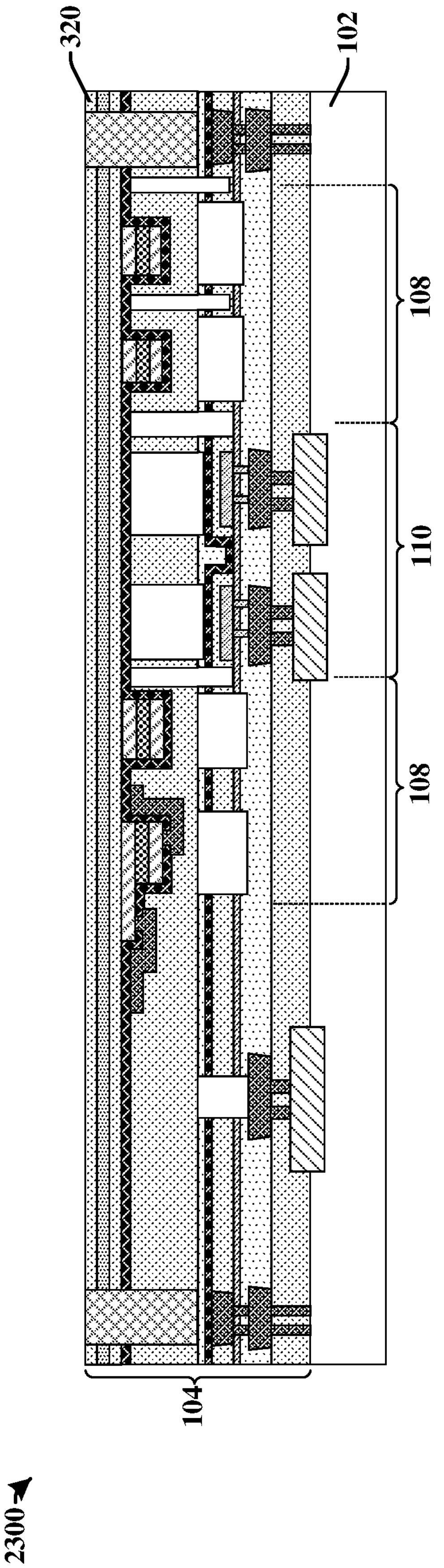

As shown in cross-sectional view 2300 of FIG. 23, the MEMS substrate (e.g., 1502 of FIG. 21) is thinned or removed. In various embodiments, the MEMS substrate may be thinned or removed by a wet etching process, a dry etching process, a mechanical grinding process, or the like. In some embodiments, removal of the MEMS substrate exposes the seventh dielectric layer 320.

Figure 24:
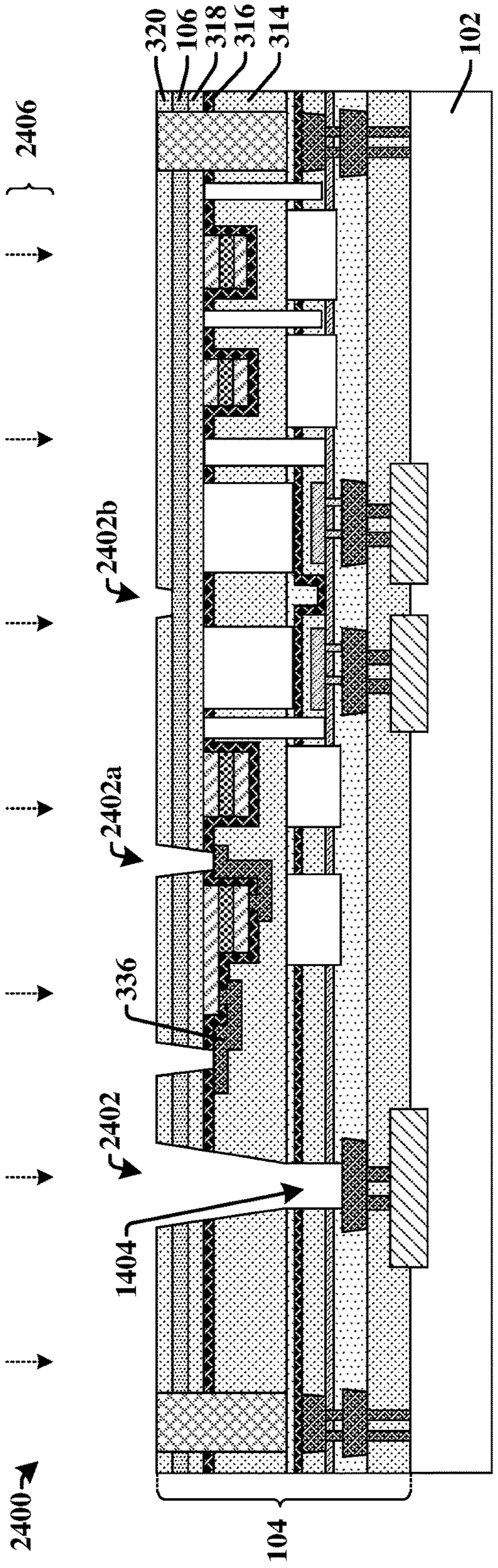

As shown in cross-sectional view 2400 of FIG. 24, a plurality of via openings 2402*a*-2402*b* are formed within the dielectric stack 104. In some embodiments, the plurality of via openings 2402*a*-2402*b* extend from a top of the seventh dielectric layer 320 to the second plurality of interconnects 336. In some embodiments, the plurality of via openings

2402*a*-2402*b* may be formed by selectively exposing the seventh dielectric layer 320, the flexible membrane 106, the sixth dielectric layer 318, and the second high-k dielectric layer 316 to an eighth etchant 2406 according to an eighth mask (not shown). In various embodiments, the eighth etchant may comprise a dry etchant (e.g., an ion beam etchant, a RIE etchant, or the like) or a wet etchant.

A bond opening 2404 may also be formed within the dielectric stack 104. In some embodiments, the bond opening 2404 extends from the top of the seventh dielectric layer 320 to the one or more intermediate bond pad cavities 1304. In some embodiments, the bond opening 2404 openings may be formed by selectively exposing the seventh dielectric layer 320, the flexible membrane 106, the sixth dielectric layer 318, and the second high-k dielectric layer 316 to a ninth etchant (not shown) according to a ninth mask (not shown). In various embodiments, the ninth etchant may comprise a dry etchant (e.g., an ion beam etchant, a RIE etchant, or the like) or a wet etchant. In some embodiments, the plurality of via openings 2402*a*-2402*b* and/or the bond opening 2404 may be formed at a temperature that is in a range of between approximately 10° C. and approximately 200° C.

Figure 25:
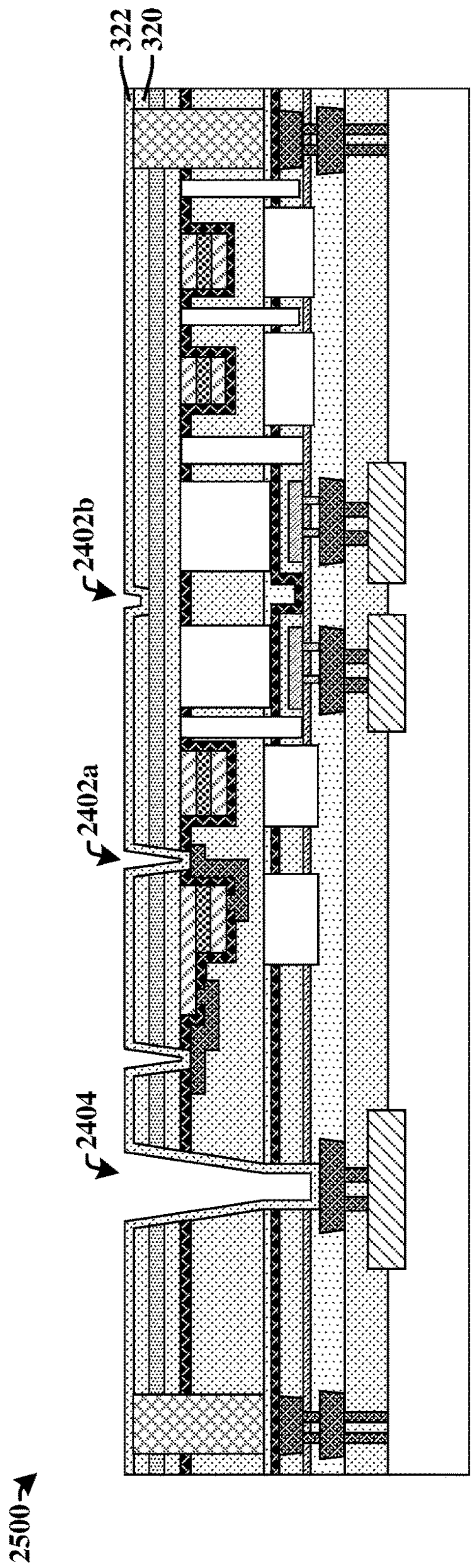

As shown in cross-sectional view 2500 of FIG. 25, an eighth dielectric layer 322 is formed over the seventh dielectric layer 320, within the plurality of via openings 2402*a*-2402*b*, and within the bond opening 2404. In various embodiments, the eighth dielectric layer 322 may comprise silicon dioxide ($SiO_2$), aluminum oxide ($Al_2O_3$), tantalum oxide ($Ta_2O_5$), hafnium oxide ($HfO_2$), silicon nitride ($Si_3N_4$), yttrium oxide ($Y_2O_3$), zirconium oxide ($ZrO_2$), titanium oxide ($TiO_2$), lanthanum oxide ($La_2O_3$) or the like. In various embodiments, the eighth dielectric layer 322 may be formed by a deposition process (e.g., CVD, ALD, PVD, PE-CVD, etc.). In some embodiments, the eighth dielectric layer 322 may be formed to a thickness that is in a range of between approximately 1 nm and approximately 100 nm.

Figure 26:
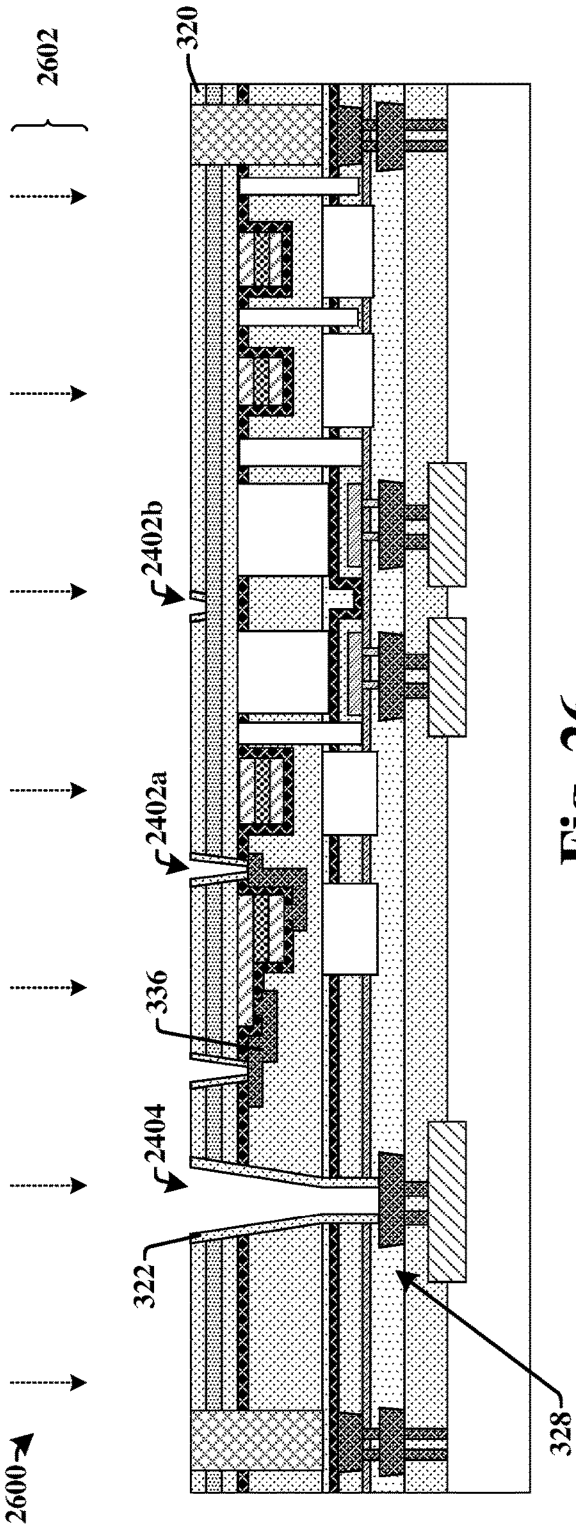

As shown in cross-sectional view 2600 of FIG. 26, the eighth dielectric layer 322 is selectively patterned to expose the first plurality of interconnects 328 and/or the second plurality of interconnects 336. After the patterning process, the eighth dielectric layer 322 may remain along sidewalls of the dielectric stack 104 and/or a top of the dielectric stack 104. In some embodiments, the patterning process exposes the eighth dielectric layer 322 to a tenth etchant 2602. In various embodiments, the tenth etchant may comprise a dry etchant (e.g., an ion beam etchant, a RIE etchant, or the like) or a wet etchant. In some embodiments, the eighth dielectric layer 322 may be patterned at a temperature that is in a range of between approximately 10° C. and approximately 200° C.

Figure 27:
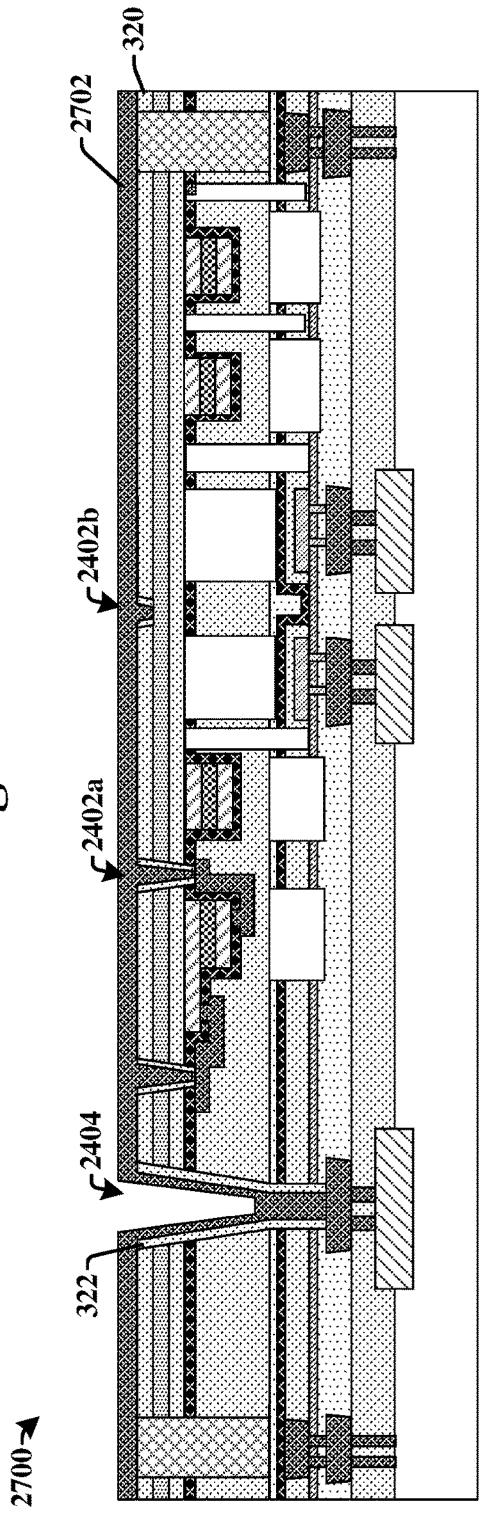

As shown in cross-sectional view 2700 of FIG. 27, a conductive material 2702 is formed over the eighth dielectric layer 322, within the plurality of via openings 2402*a*-2402*b*, and within the bond opening 2404. In some embodiments, the conductive material 2702 (e.g., tungsten, copper, aluminum, molybdenum, tin, iron, nickel, lithium, titanium, titanium nitride, aluminum, copper, or the like) may be formed using a deposition process and/or a plating process (e.g., electroplating, electro-less plating, etc.).

Figure 28:
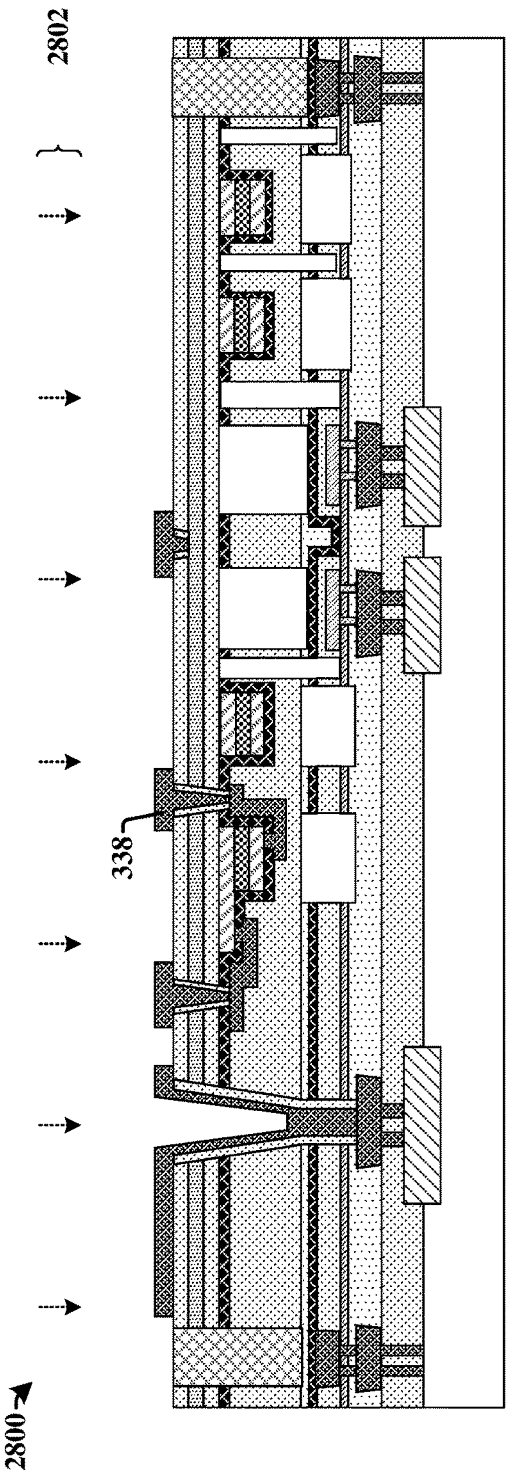

As shown in cross-sectional view 2800 of FIG. 28, the conductive material (e.g., 2702 of FIG. 27) is patterned to define a plurality of conductive layers 338. In some embodiments, the conductive material may be patterned by selectively exposing the conductive material to an eleventh etchant 2802 according to a tenth mask (not shown). In various embodiments, the eleventh etchant 2802 may comprise a dry etchant (e.g., an ion beam etchant, a RIE etchant, or the like) or a wet etchant. In some embodiments, the conductive material may be patterned at a temperature that is in a range of between approximately 10° C. and approximately 200° C.

Figure 29:
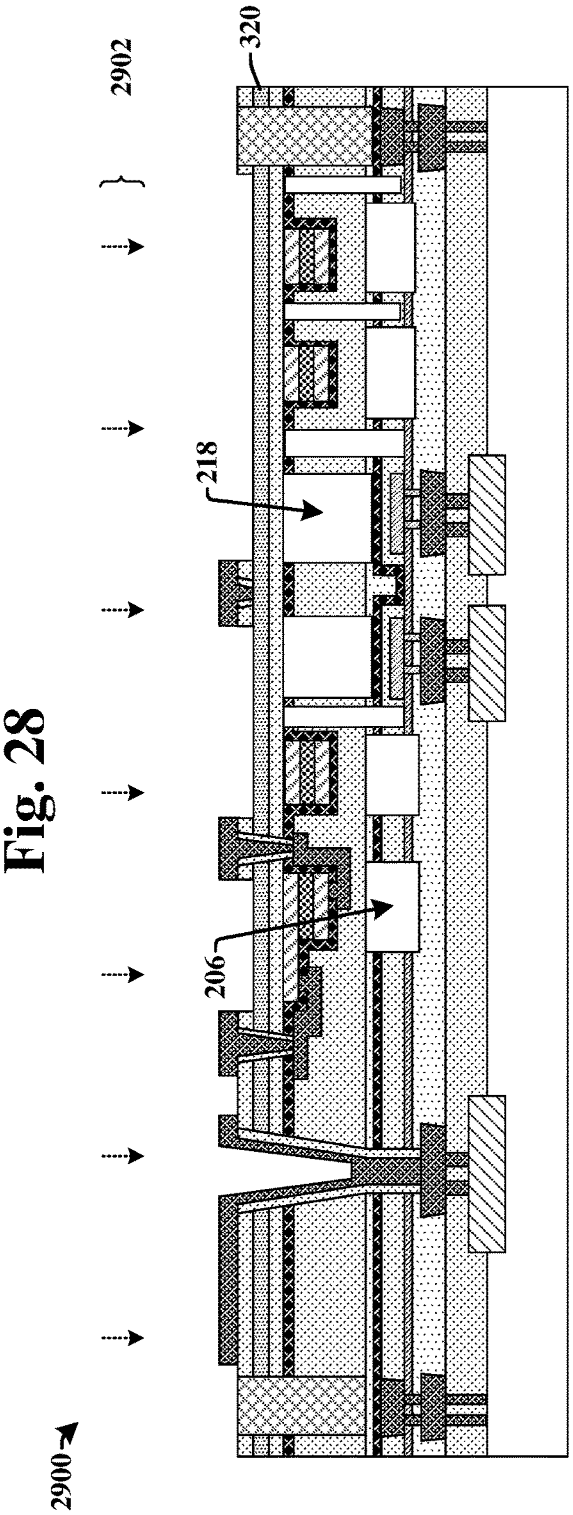

As shown in cross-sectional view 2900 of FIG. 29, the dielectric stack 104 is selectively patterned to expose the flexible membrane 106 over the one or more PMUT cavities 206 and the one or more CMUT cavities 218. In some embodiments, patterning the dielectric stack 104 may remove a part of the seventh dielectric layer 320. In some embodiments, the dielectric stack 104 may be patterned by selectively exposing the dielectric stack 104 to a twelfth etchant 2902 according to an eleventh mask (not shown). In various embodiments, the twelfth etchant 2902 may comprise a dry etchant (e.g., an ion beam etchant, a RIE etchant, or the like) or a wet etchant. In some embodiments, the dielectric stack 104 may be patterned at a temperature that is in a range of between approximately 10° C. and approximately 200° C.

Figure 30:
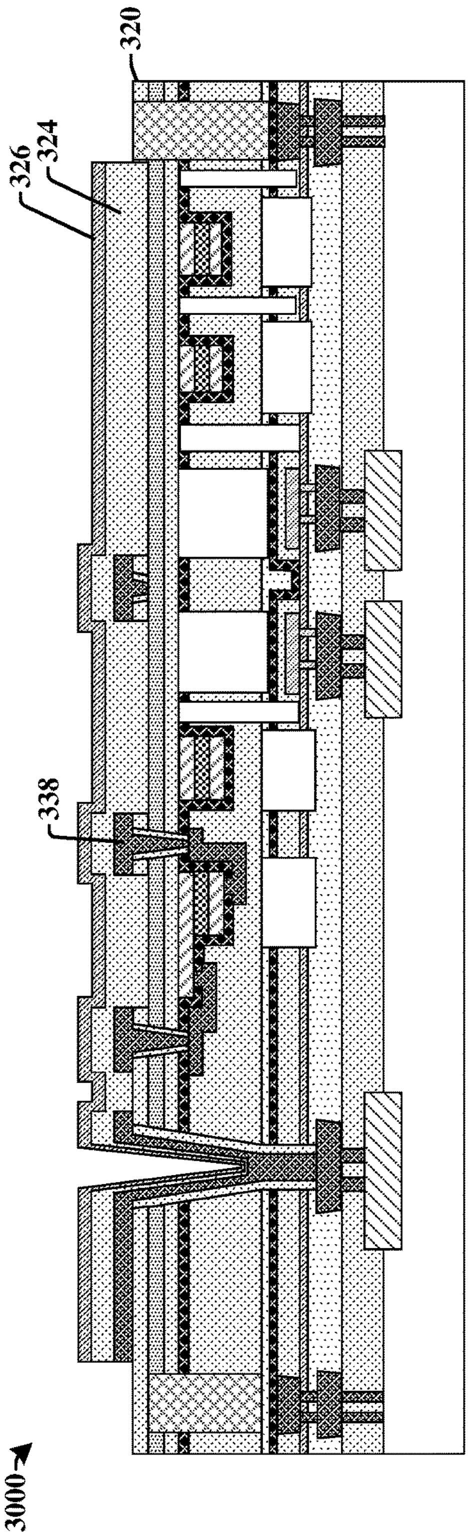

As shown in cross-sectional view 3000 of FIG. 30, a ninth dielectric layer 324 is formed over the flexible membrane 106 and the plurality of conductive layers 338. A second passivation layer 326 is subsequently formed over the ninth dielectric layer 324. In various embodiments, the ninth dielectric layer 324 and the second passivation layer 326 may be formed by deposition processes (e.g., CVD, ALD, PVD, PE-CVD, etc.). In some embodiments, the ninth dielectric layer 324 and/or the second passivation layer 326 may be formed to a thickness that is in a range of between approximately 1 nm and approximately 100 nm, between approximately 10 nm and approximately 75 nm, or other similar values.

Figure 31:
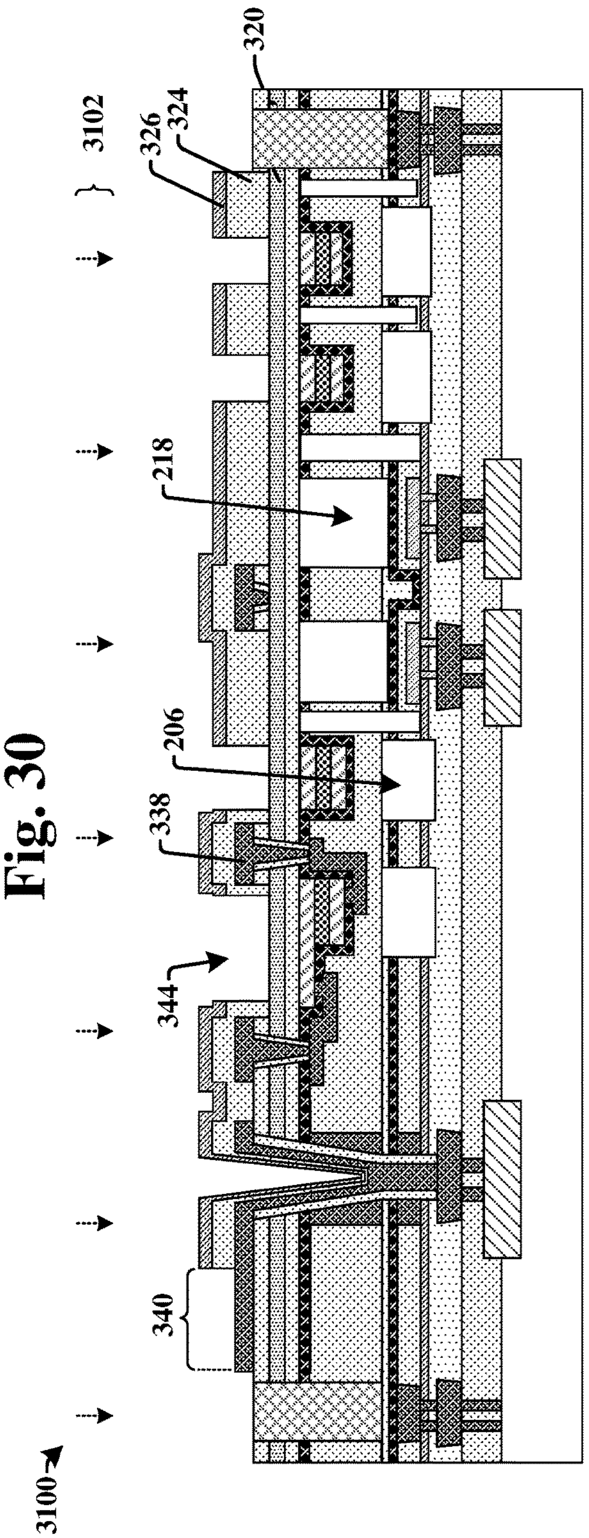

As shown in cross-sectional view 3100 of FIG. 31, the ninth dielectric layer 324 and the second passivation layer 326 are selectively patterned to form PMUT openings 344 that expose the flexible membrane 106 over the one or more PMUT cavities 206. In some embodiments, the ninth dielectric layer 324 and the second passivation layer 326 are selectively patterned to also form a bond pad region 340 overlying the plurality of conductive layers 338. In some embodiments, portions of the ninth dielectric layer 324 and the second passivation layer 326 are retained for protecting the sections of the flexible membrane 106 over the one or more CMUT cavities 218 from being damaged. In some embodiments, the ninth dielectric layer 324 and the second passivation layer 326 may be patterned by selectively exposing the ninth dielectric layer 324 and the second passivation layer 326 to a thirteenth etchant 3102 according to a twelfth mask (not shown). In various embodiments, the thirteenth etchant 3102 may comprise a dry etchant (e.g., an ion beam etchant, a RIE etchant, or the like) or a wet etchant.

Figure 32:
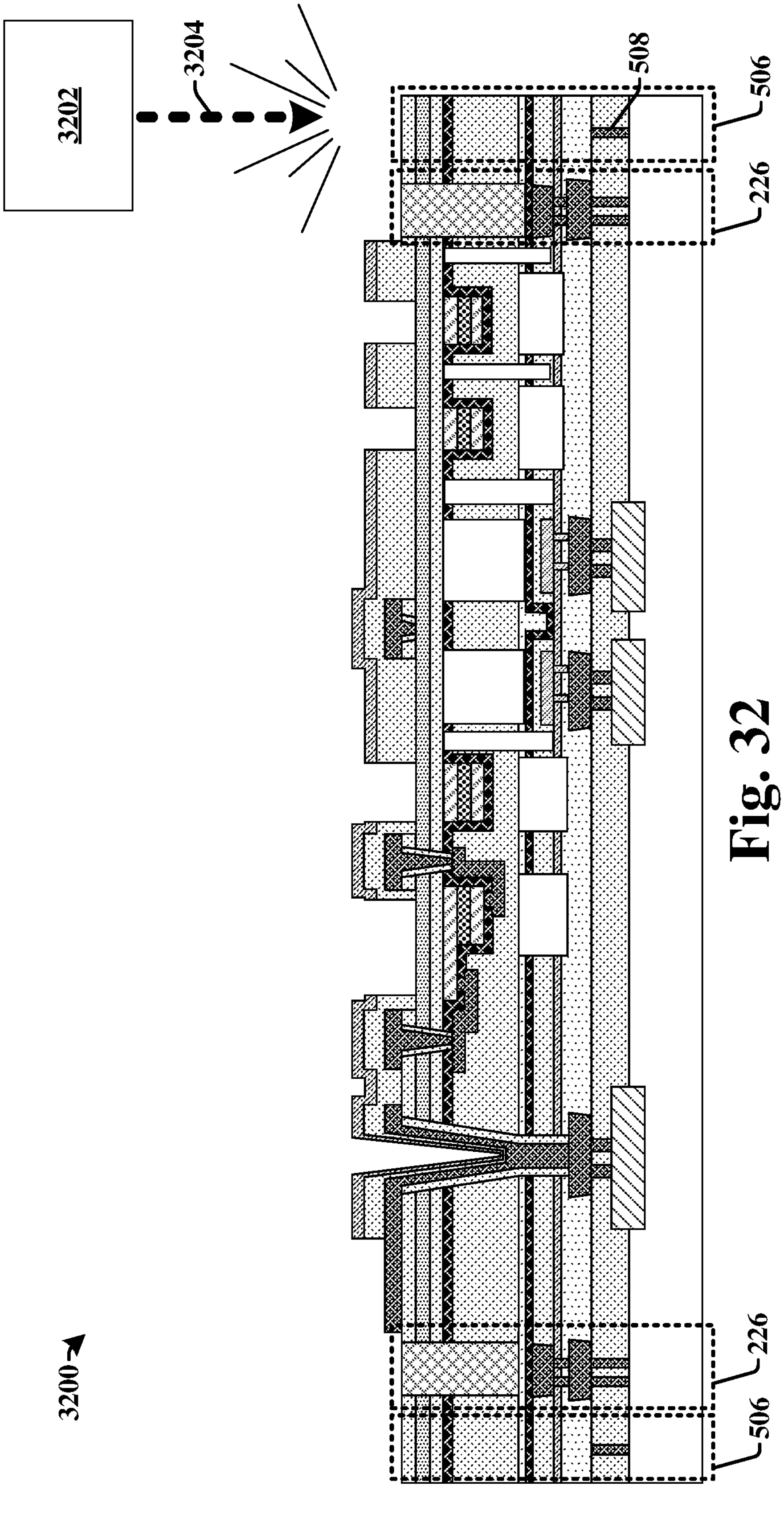

In some embodiments, shown in cross-sectional view 3200 of FIG. 32, the integrated chip structure may comprise a scribe line region 506. The scribe line region 506 separates an integrated chip die comprising the integrated chip structure from another integrated chip die on a same semiconductor body (e.g., semiconductor wafer). In such embodiments, the integrated chip structure may be diced (e.g., singulated) by removing the scribe line region 506. In some embodiments, the integrated chip structure may be diced using a laser stealth dicing process. The laser stealth dicing process utilizes a laser stealth dicing tool 3202 to generate a pulsed laser 3204 to form a modification layer and cracks inside the integrated chip structure. To ensure that the laser stealth dicing process is able to properly dice the integrated chip structure, the scribe line region 506 may be formed to have a relatively low metal pattern density. For example, the scribe line region 506 may have a metal pattern density of less than approximately 10%, less than approximately 5%, approximately 0%, or other similar values. In some embodiments, one or more alignment marks 508 may be present within the scribe line region 506.

Although FIGS. 11-31 are illustrated without a scribe line region 506, it will be appreciated that the scribe line region 506 shown in FIG. 32 may also be present in FIGS. 11-31. In some embodiments, the one or more alignment marks 508 may be formed within the scribe line region 506 in FIG. 11 (e.g., concurrent to forming the seal ring interconnects 512).

FIGS. 33-51 illustrate cross-sectional views 3300-5100 of some alternative embodiments of a method of forming an integrated chip structure comprising a CMUT and a PMUT. Although FIGS. 33-51 are described in relation to a method, it will be appreciated that the structures disclosed in FIGS. 33-51 are not limited to such a method, but instead may stand alone as structures independent of the method. Furthermore, it will be appreciated that the structures illustrated in FIGS. 1-9 may be formed within alternative embodiments of the method shown in FIGS. 33-51.

Figure 33:
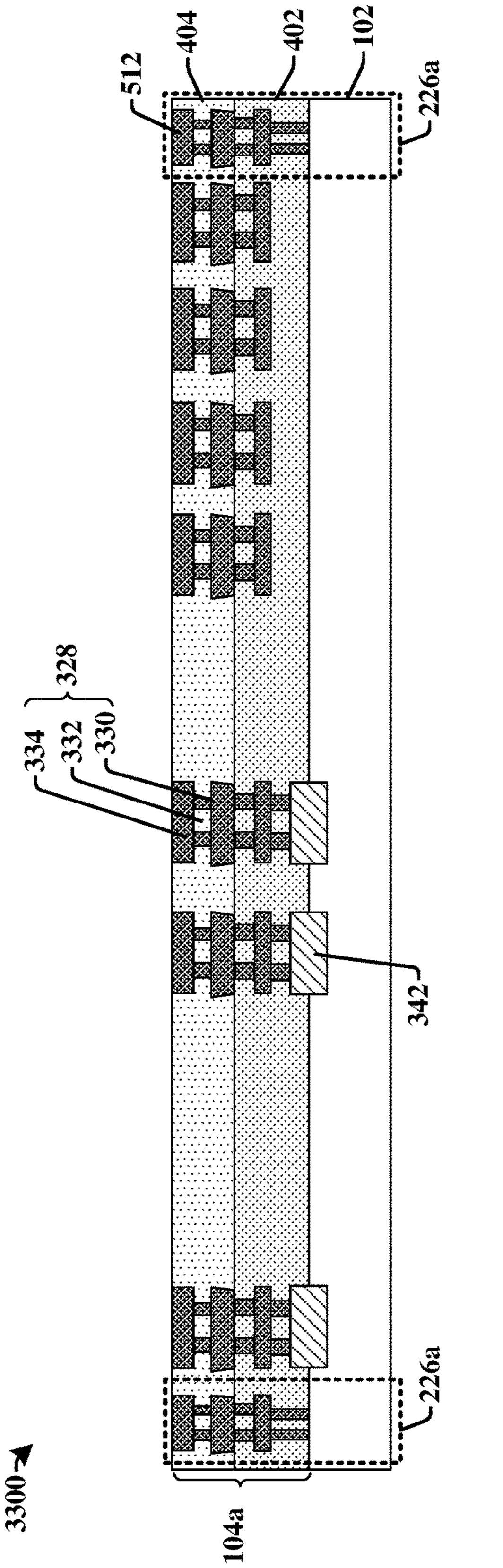
FIGS. 33-52 illustrate some alternative embodiments of a method of forming an integrated chip structure comprising a CMUT and a PMUT.

As shown in cross-sectional view 3300 of FIG. 33, a substrate 102 is provided. In various embodiments, the substrate 102 may be any type of semiconductor body (e.g., silicon, SiGe, SOI, etc.), such as a semiconductor wafer and/or one or more die on a wafer, as well as any other type of semiconductor and/or epitaxial layers, associated therewith. In some embodiments, one or more devices 342 are formed on and/or within the substrate 102.

A first dielectric stack **104*a* is formed over the substrate 102. The first dielectric stack 104*a* may be formed by depositing a first plurality of dielectric layers over the substrate 102. The first plurality of dielectric layers may comprise a first dielectric layer 402 formed over the substrate 102 and a second dielectric layer 404 formed over the first dielectric layer 402**.

In some embodiments, a first plurality of interconnects 328 may be formed within the first dielectric stack **104*a*. The first plurality of interconnects 328 may comprise one or more conductive contacts 330, interconnect wires 332, and/or interconnect vias 334. In some embodiments, the first plurality of interconnects 328** may be respectively formed using a damascene process (e.g., a single damascene process or a dual damascene process).

In some embodiments, a first seal ring structure **226*a* may be formed within the first dielectric stack 104*a*. The first seal ring structure 226*a* may be formed by forming a plurality of seal ring interconnects 512 within the first dielectric stack 104*a*. In some embodiments, the plurality of seal ring interconnects 512** may be respectively formed using a damascene process (e.g., a single damascene process or a dual damascene process).

Figure 34:
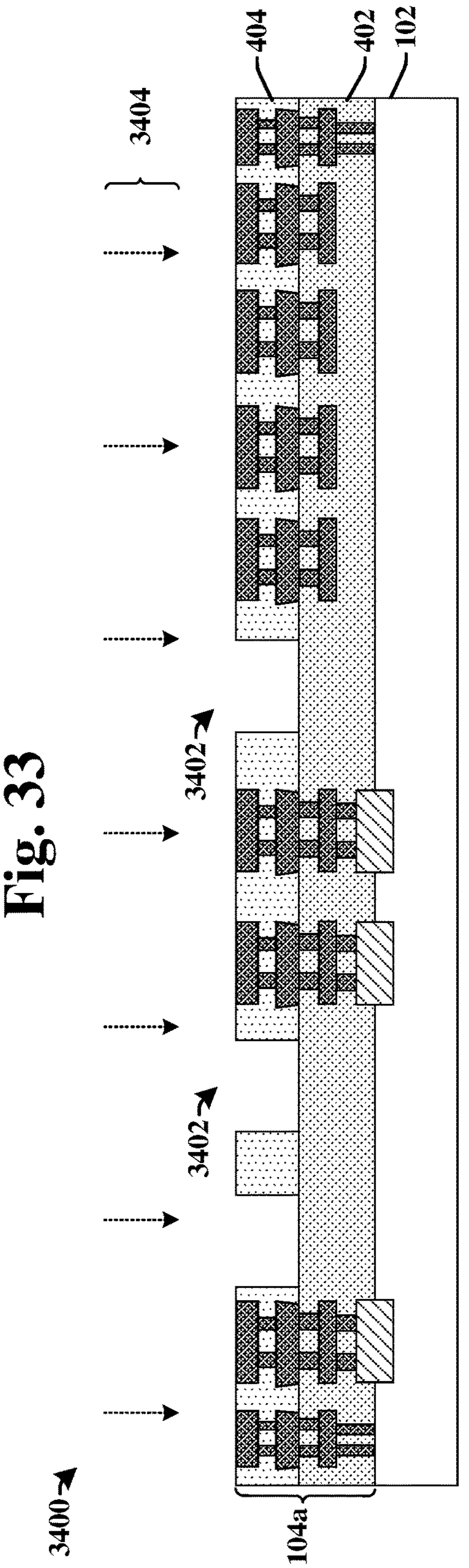

As shown in cross-sectional view 3400 of FIG. 34, a first plurality of intermediate PMUT cavities 3402 are formed within the first dielectric stack **104*a*. The first plurality of intermediate PMUT cavities 3402 may be formed by selectively exposing the second dielectric layer 404 to a first etchant 3404 according to a first mask (not shown). In various embodiments, the first etchant 3404** may comprise a dry etchant (e.g., an ion beam etchant, a RIE etchant, or the like) or a wet etchant.

Figure 35:
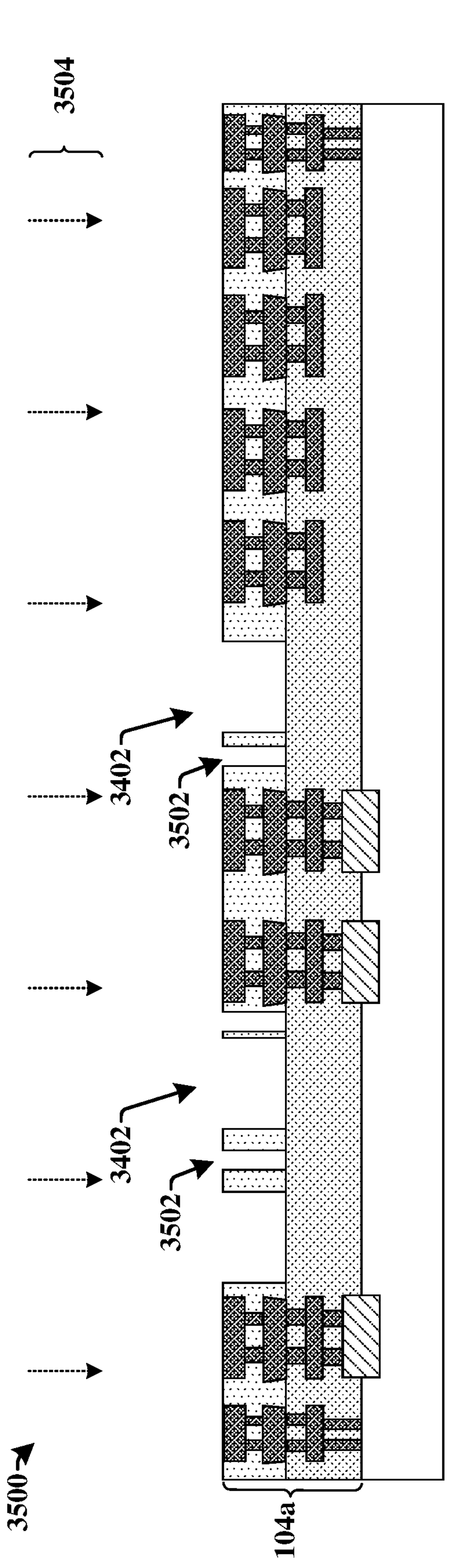

As shown in cross-sectional view 3500 of FIG. 35, a first plurality of isolation cavities 3502 are formed within the first dielectric stack **104*a*. The first plurality of isolation cavities 3502 may be formed by selectively exposing the second dielectric layer 404 to a second etchant 3504 according to a second mask (not shown). In various embodiments, the second etchant 3504 may comprise a dry etchant (e.g., an ion beam etchant, a RIE etchant, or the like) or a wet etchant. In some embodiments, the first plurality of intermediate PMUT cavities 3402 and the first plurality of isolation cavities 3502** may be concurrently formed.

Figure 36:
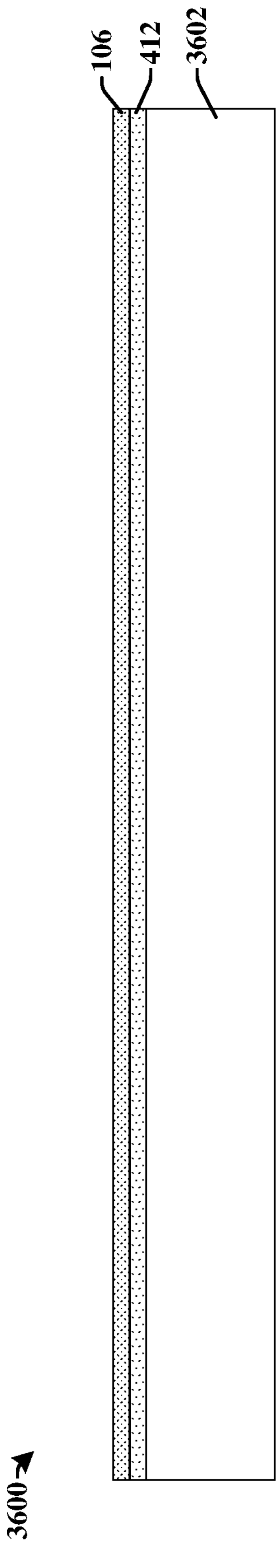

As shown in cross-sectional view 3600 of FIG. 36, a MEMS substrate 3602 is provided. In various embodiments, the MEMS substrate 3602 may be any type of semiconductor body (e.g., silicon, SiGe, SOI, etc.), such as a semiconductor wafer and/or one or more die on a wafer, as well as any other type of semiconductor and/or epitaxial layers, associated therewith.

A fifth dielectric layer 412 is formed over the MEMS substrate 3602 and a flexible membrane 106 is formed over the fifth dielectric layer 412. In some embodiments, the flexible membrane 106 may comprise a conductive material such as polysilicon doped with one or more impurities (e.g., N-type dopants or P-type dopants), a metal (e.g., copper, aluminum, or the like.

Figure 37:
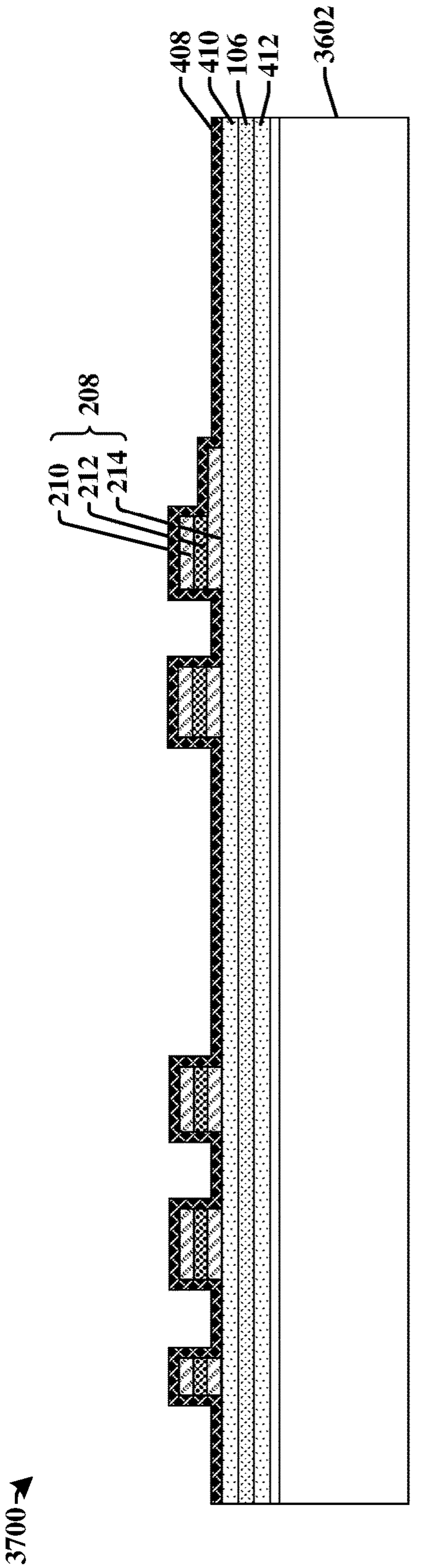

As shown in cross-sectional view 3700 of FIG. 37, a fourth dielectric layer 410 is formed on the flexible membrane 106. Piezoelectric stacks 208 are formed over the fourth dielectric layer 410. The piezoelectric stacks 208 respectively comprise a lower electrode 210 separated from an upper electrode 214 by a piezoelectric material 212. A high-k dielectric layer 408 is formed over the fourth dielectric layer 410 and the piezoelectric stacks 208. The high-k dielectric layer 408 may be conformally formed over the top surfaces and along sidewalls of the piezoelectric stacks 208.

Figure 38:
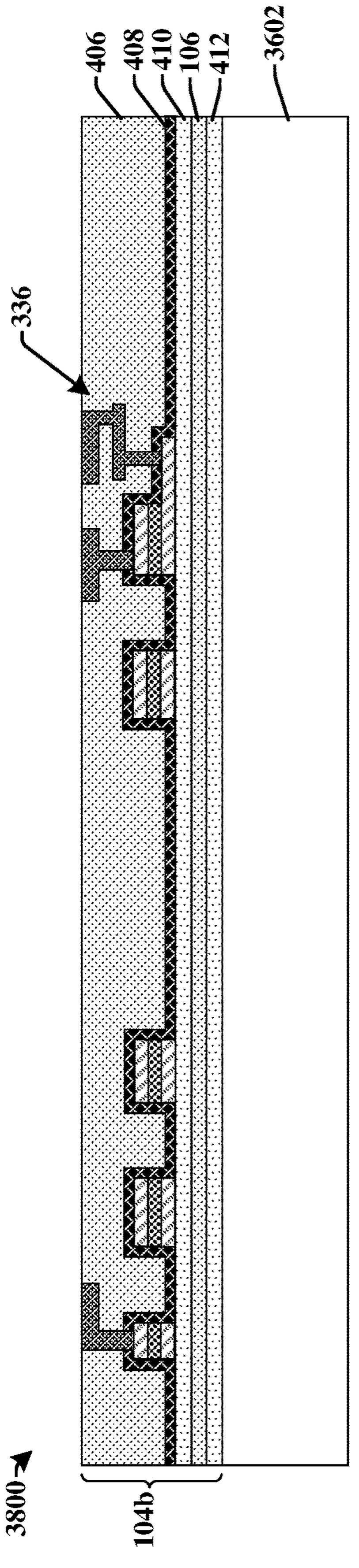

As shown in cross-sectional view 3800 of FIG. 38, a third dielectric layer 406 is formed on the high-k dielectric layer 408 to form a second dielectric stack **104*b*. A second plurality of interconnects 336 are formed within the third dielectric layer 406. The second plurality of interconnects 336 are electrically coupled to the piezoelectric stacks 208**.

Figure 39:
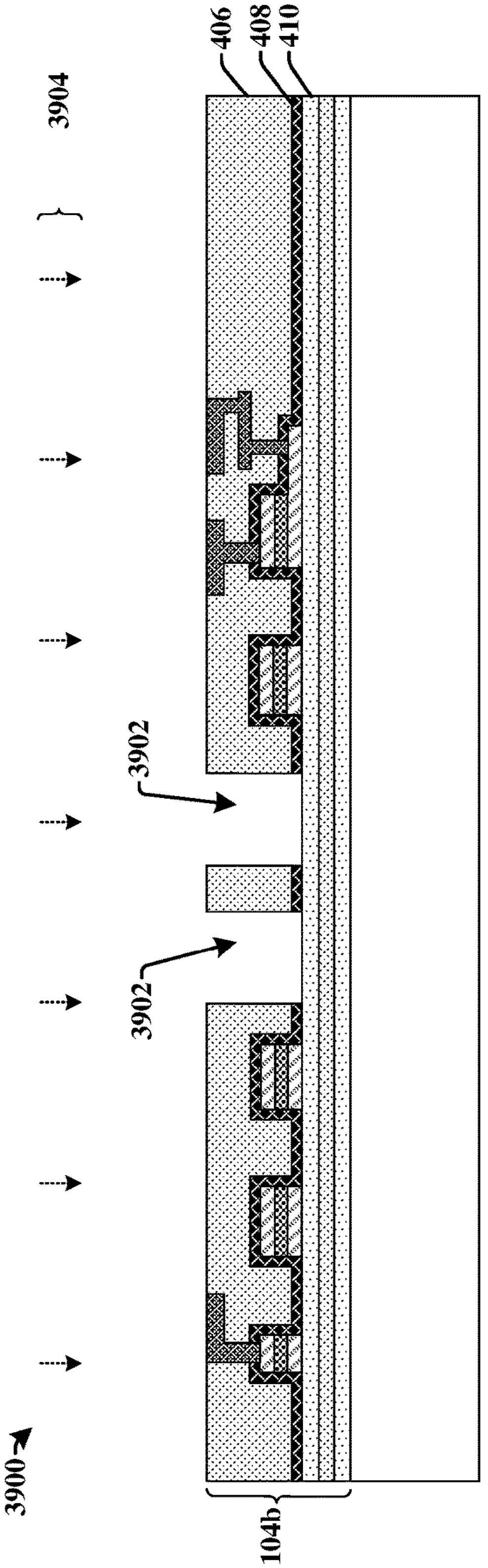

As shown in cross-sectional view 3900 of FIG. 39, a plurality of intermediate CMUT cavities 3902 are formed within the second dielectric stack **104*b*. The plurality of intermediate CMUT cavities 3902 are formed by selectively etching the second dielectric stack 104*b*. In some embodiments, the plurality of intermediate CMUT cavities 3902 are formed by etching the third dielectric layer 406 and the high-k dielectric layer 408. In some embodiments, the plurality of intermediate CMUT cavities 3902 have sidewalls tapering from the upper surface of the third dielectric layer 406 to the upper surface of the fourth dielectric layer 410. In some embodiments, the plurality of intermediate CMUT cavities 3902 may be formed by selectively exposing the second dielectric stack 104*b* to a third etchant 3904 according to a third mask (not shown). In various embodiments, the third etchant 3904** may comprise a dry etchant (e.g., an ion beam etchant, a RIE etchant, or the like) or a wet etchant.

Figure 40:
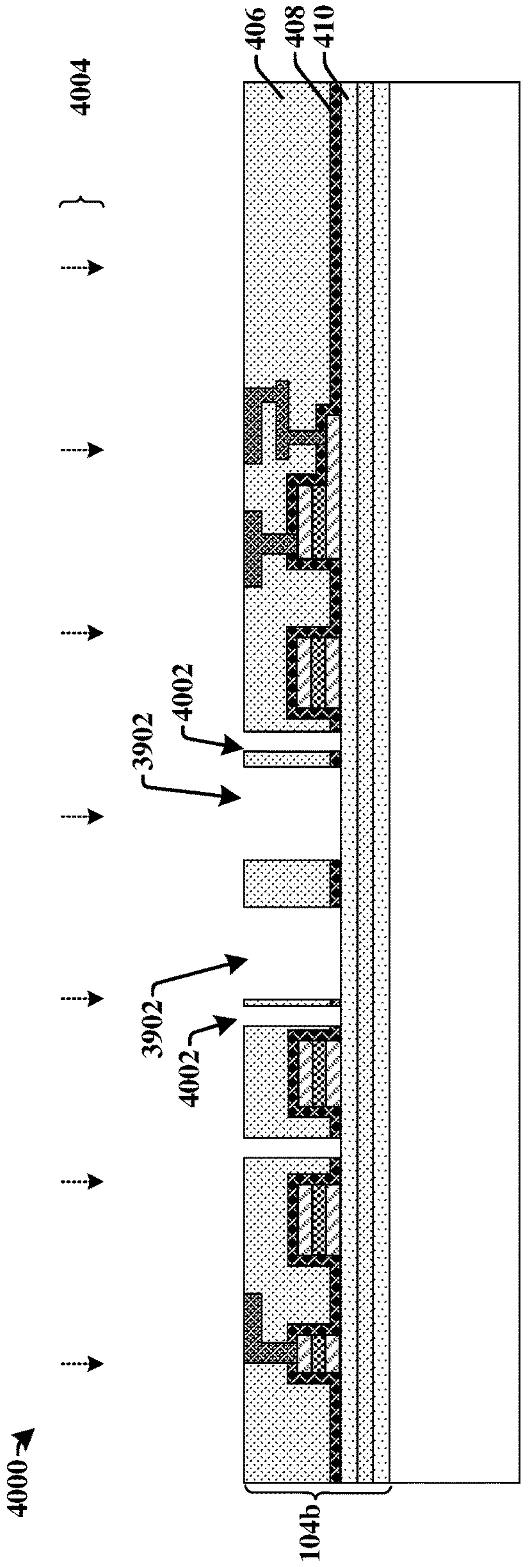

As shown in cross-sectional view 4000 of FIG. 40, a second plurality of isolation cavities 4002 are also formed within the second dielectric stack **104*b*. The second plurality of isolation cavities 4002 are formed by selectively etching the second dielectric stack 104*b*. In some embodiments, the second plurality of isolation cavities 1804 are formed by etching the third dielectric layer 406 and the high-k dielectric layer 408. In some embodiments, the second plurality of isolation cavities 4002 have sidewalls tapering from the upper surface of the third dielectric layer 406 to the upper surface of the fourth dielectric layer 410. In some embodiments, the second plurality of isolation cavities 4002** may be subsequently filled with one or more second acoustic wave absorption materials (e.g., polyimide, SiLK, Porous MSQ, or the like).

In some embodiments, the second plurality of isolation cavities 4002 may be formed by selectively exposing the second dielectric stack 104*b* to a fourth etchant 4004 according to a fourth mask (not shown). In various embodiments, the fourth etchant 4004 may comprise a dry etchant (e.g., an ion beam etchant, a RIE etchant, or the like) or a wet etchant. In some embodiments, the plurality of intermediate CMUT cavities 3902 and the second plurality of isolation cavities 4002 may be concurrently formed.

Figure 41:
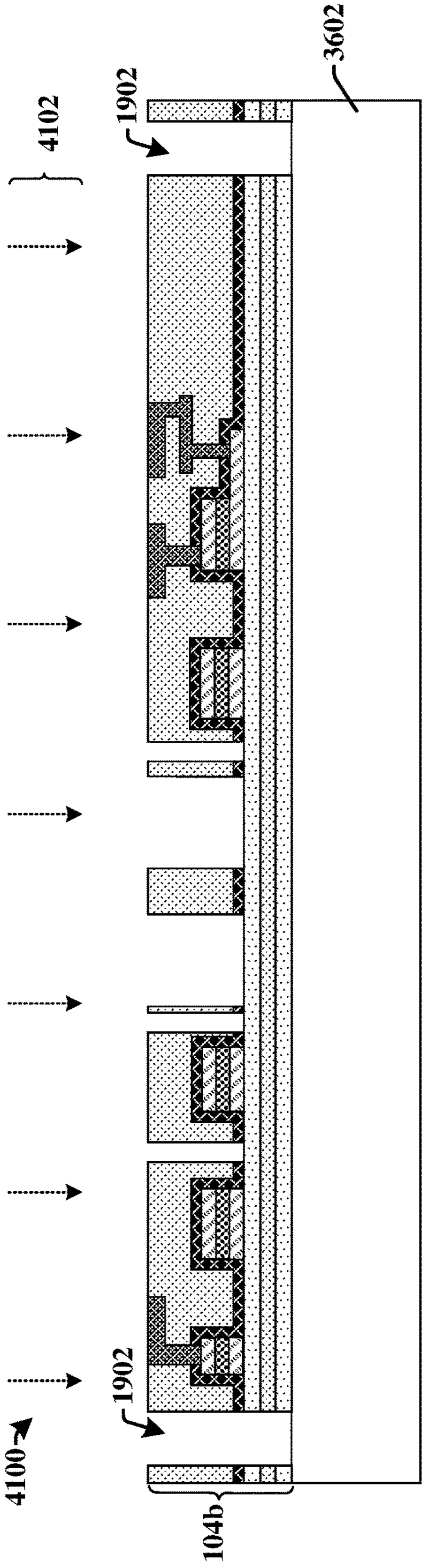

As shown in cross-sectional view 4100 of FIG. 41, the second dielectric stack 104*b* is selectively etched to form a seal ring trench 1902 extending through the second dielectric stack 104*b*. In some embodiments, the seal ring trench 1902 may vertically extend from a top of the second dielectric stack 104*b* to the MEMS substrate 3602. In some embodiments, the seal ring trench 1902 may be formed by selectively exposing the second dielectric stack 104*b* to a fifth etchant 4102 according to a fifth mask (not shown). In various embodiments, the fifth etchant 4102 may comprise a dry etchant (e.g., an ion beam etchant, a RIE etchant, or the like) or a wet etchant.

Figure 42:
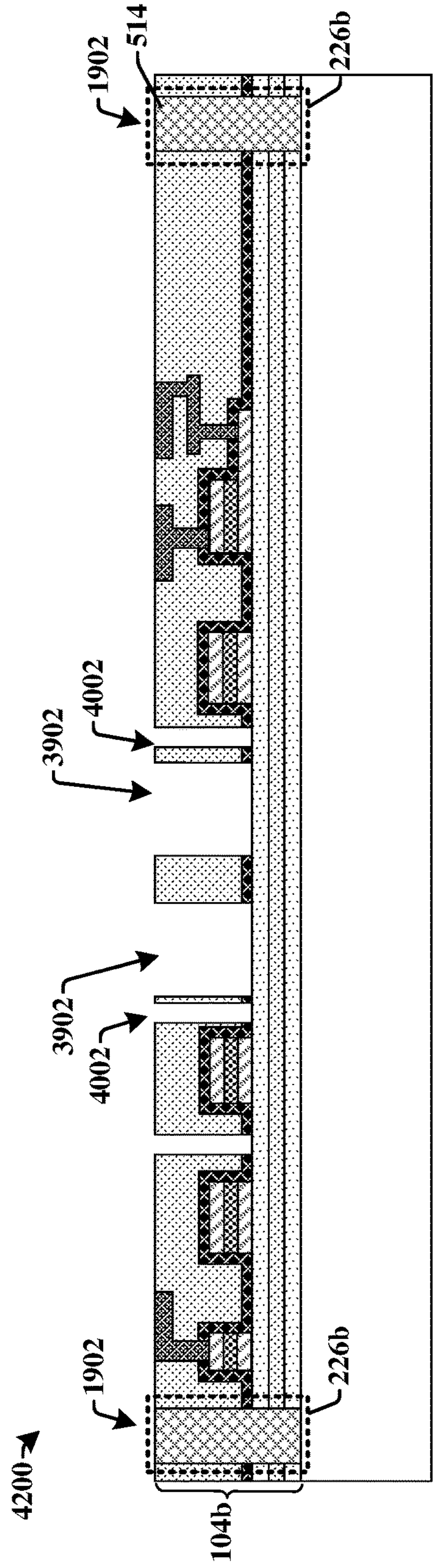

As shown in cross-sectional view 4200 of FIG. 42, a passivation structure 514 is formed within the seal ring trench 1902 to form a second seal ring structure 226*b*. In some embodiments, the passivation structure 514 may be formed to fill the seal ring trench 1902. The passivation structure 514 may comprise an oxide, a nitride, a carbide, or the like. In various embodiments, the passivation structure 514 may be formed by way of a deposition process (e.g., a PVD process, a CVD process, a PE-CVD process, or the like). In some embodiments, the passivation structure 514 may be formed prior to forming the plurality of intermediate CMUT cavities 3902 and/or the second plurality of isolation cavities 4002.

Figure 43:
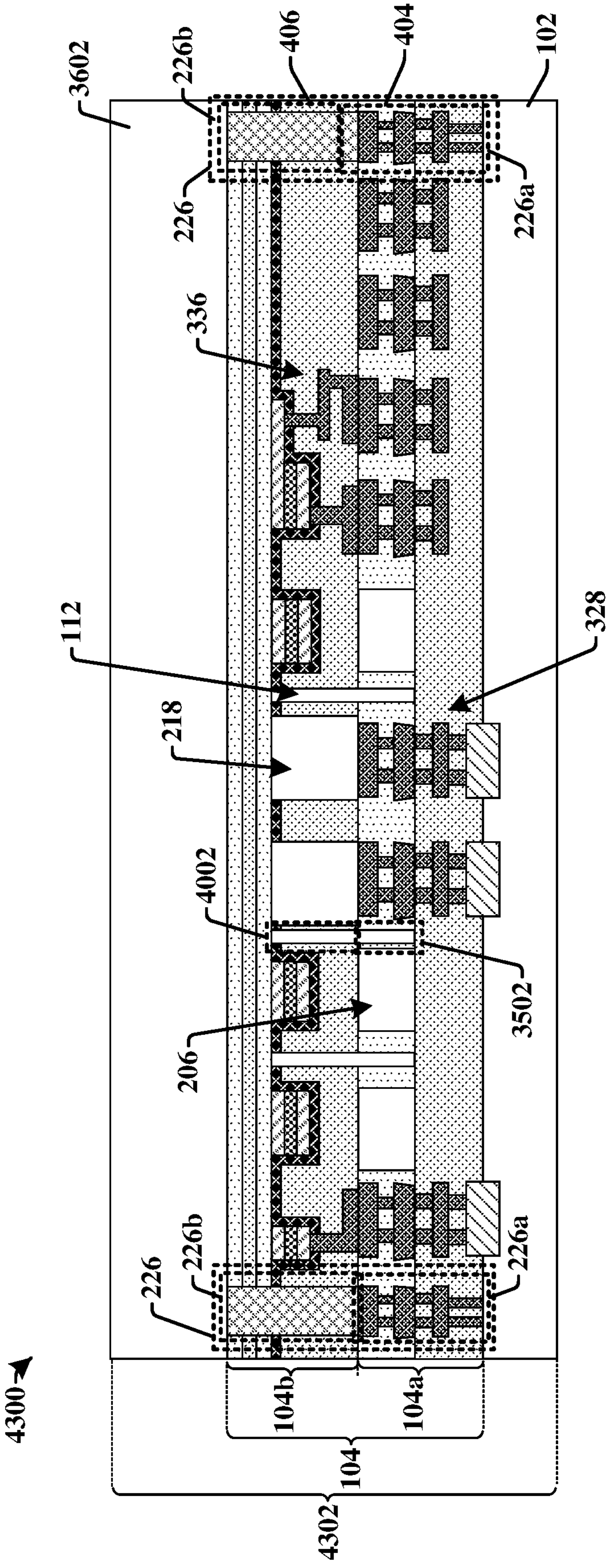

As shown in cross-sectional view 4300 of FIG. 43, the MEMS substrate 3602 is bonded to the substrate 102. In some embodiments, the bonding process may comprise a hybrid bonding process that bonds together the first dielectric stack 104*a* to the second dielectric stack 104*b* along one or more dielectric interfaces and that further couples the first plurality of interconnects 328 to the second plurality of interconnects 336 along one or more metal interfaces. The bonding process forms a dielectric stack 104 arranged between the substrate 102 and the MEMS substrate 3602. In some embodiments, prior to performing the bonding process, the MEMS substrate 3602 and the substrate 102 may be subjected to an alignment process, as shown in FIGS. 22A-22B, for example.

In the bonded substrate stack 4302 resulting from the bonding process, the first plurality of isolation cavities 3502 are brought together with the second plurality of isolation cavities 4002 to form a plurality of isolation chambers 112 that are laterally disposed between one or more PMUT cavities 206 and one or more CMUT cavities 218. Furthermore, the first seal ring structure 226*a* and the second seal ring structure 226*b* are brought together to form a seal ring region 226.

It will be appreciated that forming the MEMS substrate 3602 separate from the substrate 102 allows for processes to be performed on the substrate 102 and the MEMS at different temperatures. For example, in some embodiments, the one or more piezoelectric stacks 208 may be formed on the MEMS substrate 3602 using processes that are in a first temperature range, while the substrate 102 may be exposed to processes that are in a second temperature range that is less than the first temperature range. In some embodiments, the first temperature range may be between approximately 400° C. and approximately 700° C. In some embodiments, the second temperature range may be approximately 400° C.

Furthermore, it has been appreciated that the high temperatures used in a thermocompression bonding process may damage some devices within the bonded substrate stack 4302. Hybrid bonding is able to be performed at a lower temperature than thermocompression bonding, so as to allow for a wider range of devices to be implemented within the bonded substrate stack 4302. For example, the use of hybrid bonding may allow for the integration of ASIC CMOS devices into the bonded substrate stack 4302.

Figure 44:
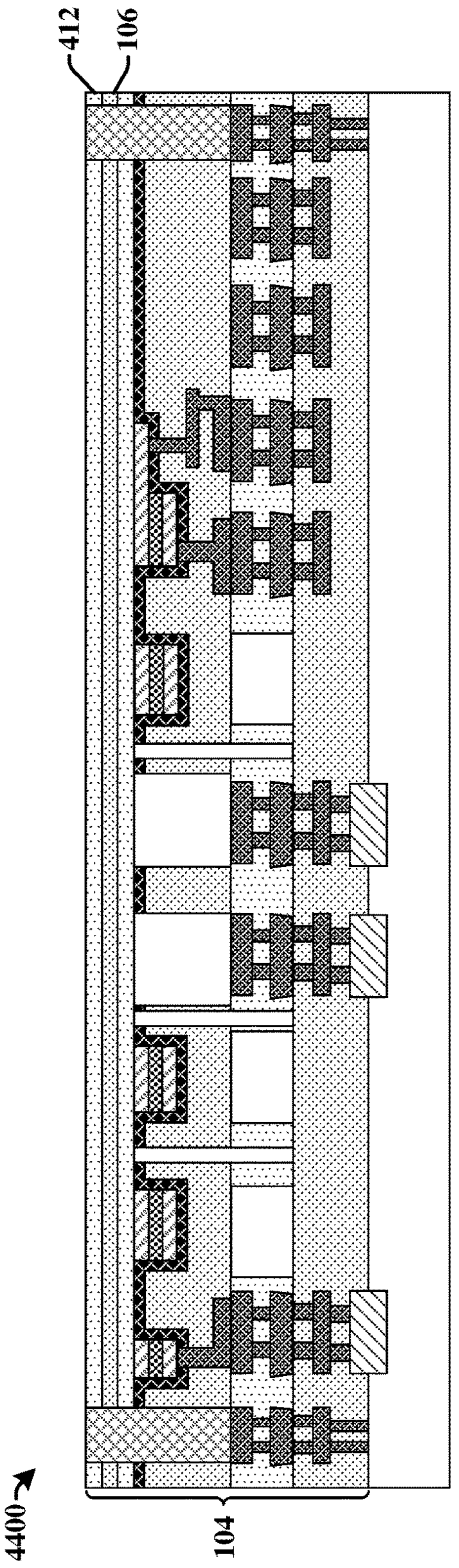

As shown in cross-sectional view 4400 of FIG. 44, the MEMS substrate (e.g., 3602 of FIG. 43) is thinned or removed. In various embodiments, the MEMS substrate may be thinned or removed by a wet etching process, a dry etching process, a mechanical grinding process, or the like. In some embodiments, removal of the MEMS substrate exposes the fifth dielectric layer 412.

Figure 45:
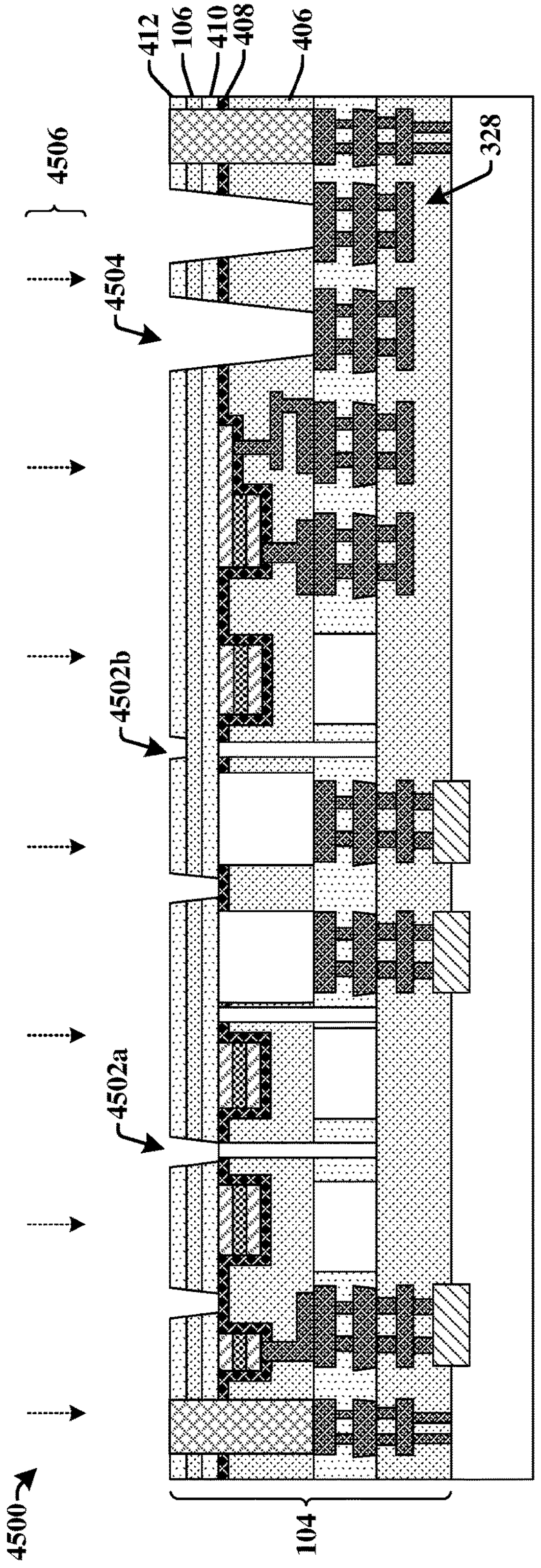

As shown in cross-sectional view 4500 of FIG. 45, a plurality of via openings 4502*a*-4502*b* are formed within the dielectric stack 104. In some embodiments, the plurality of via openings 4502*a*-4502*b* may be formed by selectively exposing the fifth dielectric layer 412, the flexible membrane 106, the fourth dielectric layer 410, the high-k dielectric layer 408, and the third dielectric layer 406 to a sixth etchant 4506 according to a sixth mask (not shown). In various embodiments, the sixth etchant 4506 may comprise a dry etchant (e.g., an ion beam etchant, a RIE etchant, or the like) or a wet etchant.

A bond opening 4504 may also be formed within the dielectric stack 104. The bond opening 4504 extends from the top of the fifth dielectric layer 412 to the first plurality of interconnects 328. In some embodiments, the bond opening 4504 may be formed by selectively exposing the fifth dielectric layer 412, the flexible membrane 106, the fourth dielectric layer 410, the high-k dielectric layer 408, and the third dielectric layer 406 to a seventh etchant (not shown) according to a seventh mask (not shown). In various embodiments, the seventh etchant may comprise a dry etchant (e.g., an ion beam etchant, a RIE etchant, or the like) or a wet etchant. In some embodiments, the plurality of via openings 4502*a*-4502*b* and/or the bond opening 4504 may be formed at a temperature that is in a range of between approximately 10° C. and approximately 200° C.

Figure 46:
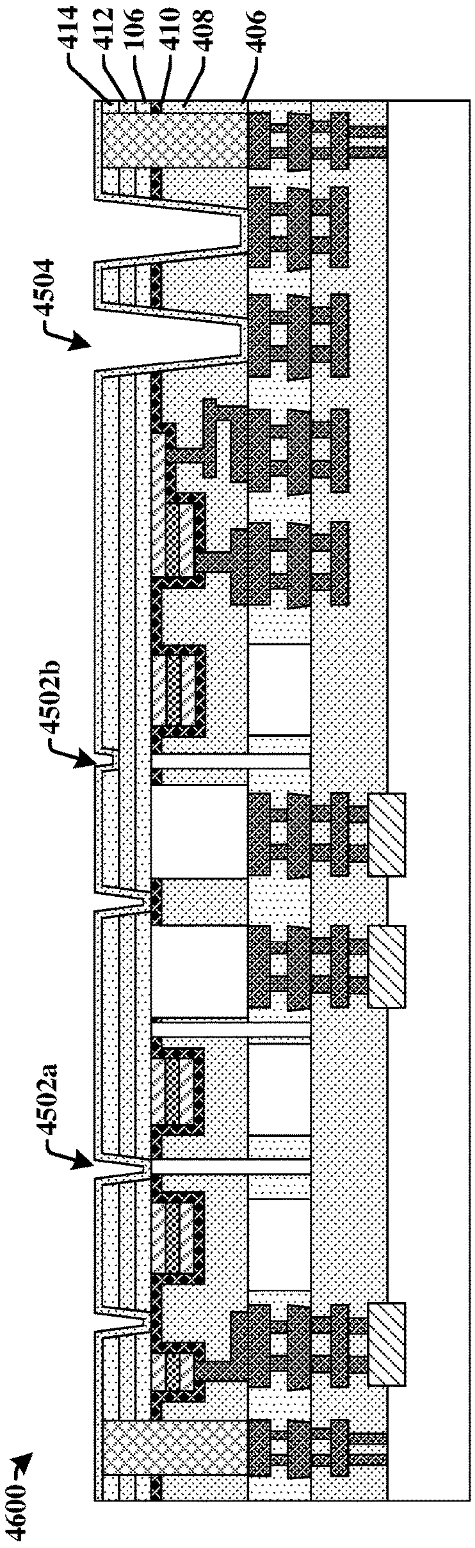

As shown in cross-sectional view 4600 of FIG. 46, a sixth dielectric layer 414 is formed over the fifth dielectric layer 412, within the plurality of via openings 4502*a*-4502*b*, and within the bond opening 4504. In various embodiments, the sixth dielectric layer 414 may comprise $SiO_2$, $Al_2O_3$, $Ta_2O_5$, $HfO_2$, $Si_3N_4$, $Y_2O_3$, $ZrO_2$, $TiO_2$, $La_2O_3$, or the like. In various embodiments, the sixth dielectric layer 414 may be formed by a deposition process (e.g., CVD, ALD, PVD, PE-CVD, etc.). In some embodiments, the sixth dielectric layer 414 may be formed to a thickness that is in a range of between approximately 1 nm and approximately 100 nm.

Figure 47:
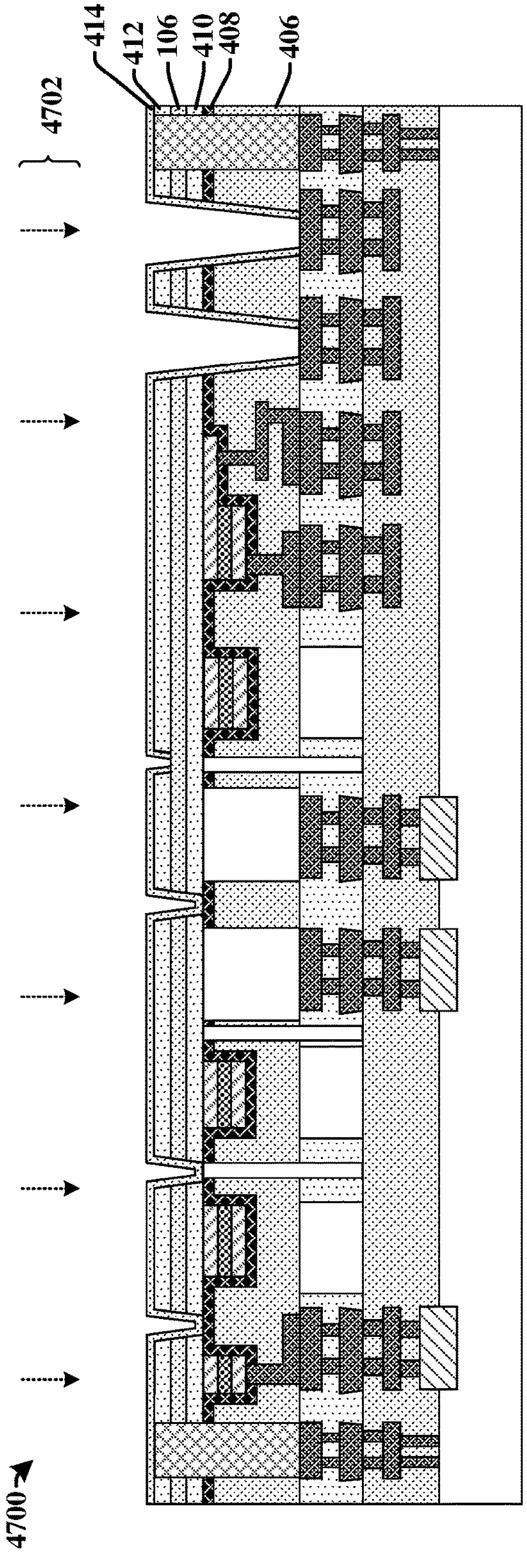

As shown in cross-sectional view 4700 of FIG. 47, the sixth dielectric layer 414 is patterned to remove parts of the sixth dielectric layer 414 and to expose upper surfaces of the first plurality of interconnects 328. The sixth dielectric layer 414 may also be patterned to remove parts of the sixth dielectric layer 414 and to expose upper surfaces of the flexible membrane 106. In some embodiments, the patterning process exposes the sixth dielectric layer 414 to an eighth etchant 4702. In various embodiments, the eighth etchant 4702 may comprise a dry etchant (e.g., an ion beam etchant, a RIE etchant, or the like) or a wet etchant.

Figure 48:
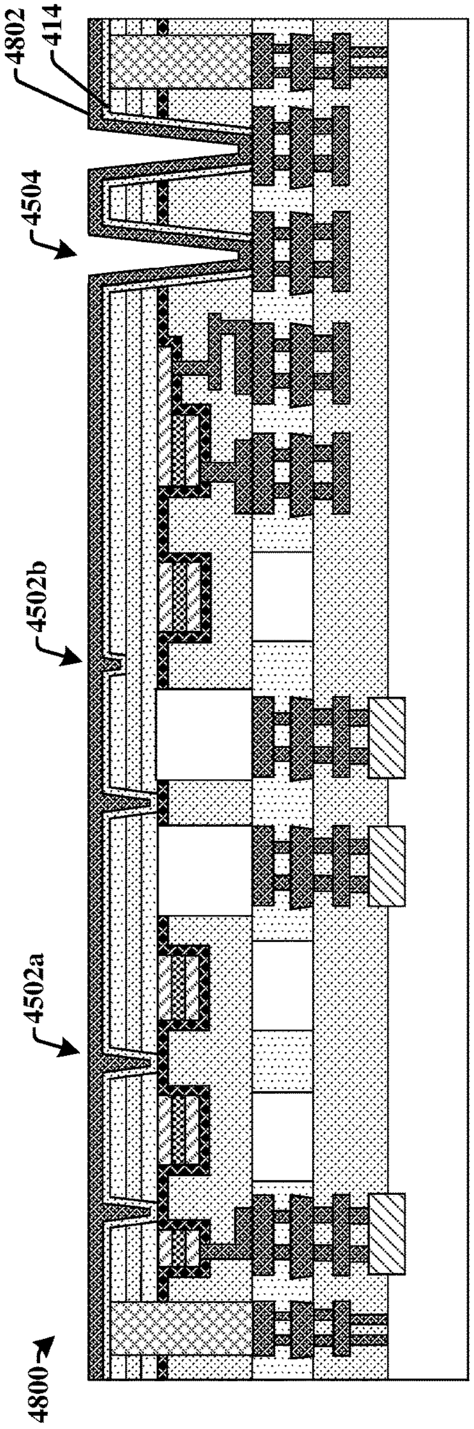

As shown in cross-sectional view 4800 of FIG. 48, a conductive material 4802 is formed over the seventh dielectric layer 320, within the plurality of via openings 4502*a*-4502*b*, and within the bond opening 4504. In some embodiments, the conductive material 4802 may comprise silver (Au), molybdenum (Mo), copper (Cu), aluminum (Al), tin (Sn), iron (Fe), nickel (Ni), lithium (Li), titanium (Ti), titanium nitride (TiN), aluminum copper (AlCu), or the like. In various embodiments, the conductive material 4802 may be formed using a deposition process and/or a plating process (e.g., electroplating, electro-less plating, etc.).

Figure 49:
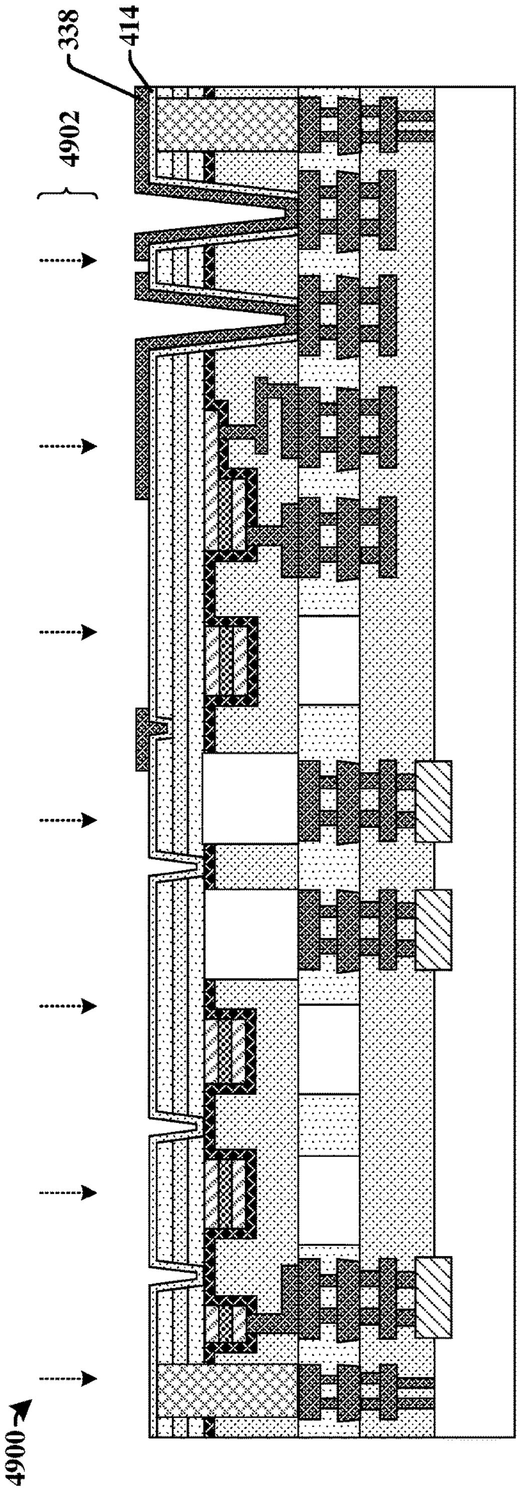

As shown in cross-sectional view 4900 of FIG. 49, the conductive material (e.g., 4802 of FIG. 48) is patterned to define a plurality of conductive layers 338. In some embodiments, the conductive material may be patterned by selectively exposing the conductive material to a ninth etchant 4902 according to an eighth mask (not shown). In various embodiments, the ninth etchant 4902 may comprise a dry etchant (e.g., an ion beam etchant, a RIE etchant, or the like) or a wet etchant. In some embodiments, the conductive material may be patterned at a temperature that is in a range of between approximately 10° C. and approximately 200° C.

Figure 50:
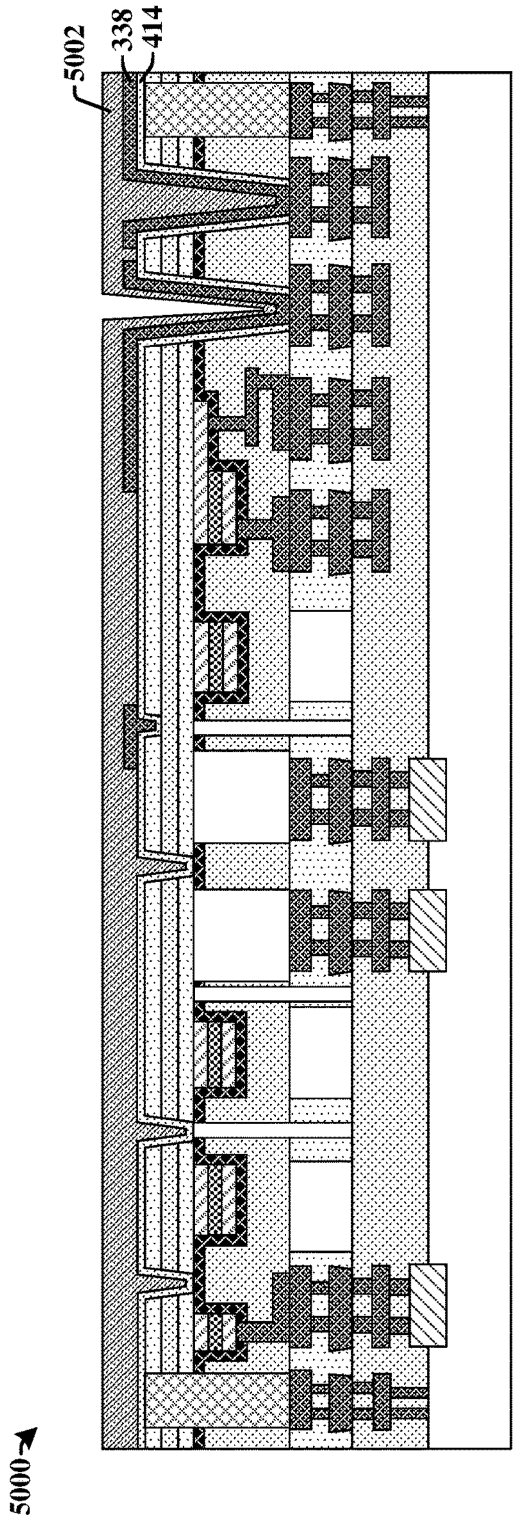

As shown in cross-sectional view 5000 of FIG. 50, a passivation layer 5002 is formed over the seventh dielectric layer 320 and the plurality of conductive layers 338. In some embodiments, the passivation layer 5002 may comprise $SiO_2$, $Al_2O_3$, $Ta_2O_5$, $HfO_2$, $Si_3N_4$, $Y_2O_3$, $ZrO_2$, $TiO_2$, $La_2O_3$, or the like. In various embodiments, the passivation layer 5002 may be formed by a deposition process (e.g., CVD, ALD, PVD, PE-CVD, etc.). In some embodiments, the passivation layer 5002 may be formed to a thickness that is in a range of between approximately 1 nm and approximately 100 nm.

Figure 51:
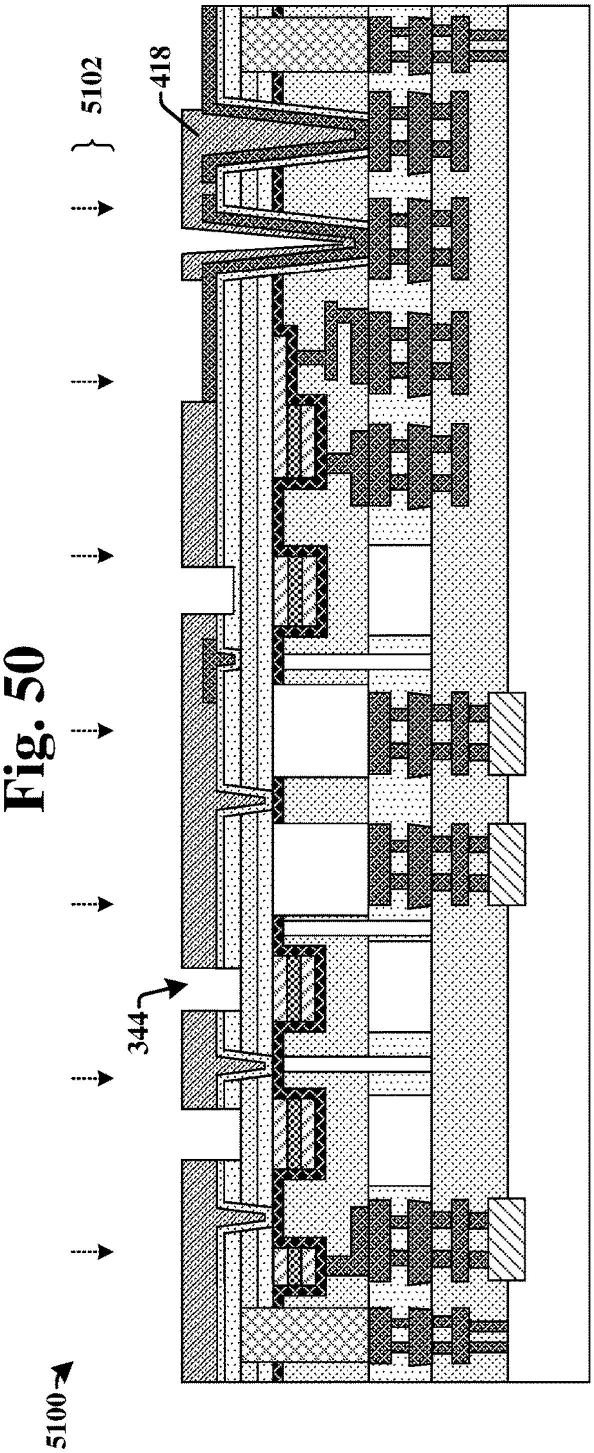

As shown in cross-sectional view 5100 of FIG. 51, the passivation layer 418 is selectively patterned to form PMUT openings 344 that expose the flexible membrane 106 over the one or more PMUT cavities 206. In some embodiments, the passivation layer 418 is selectively patterned to also form a bond pad region 340 overlying the plurality of conductive layers 338. In some embodiments, portions of the passivation layer 418 are retained for protecting the sections of the flexible membrane 106 over the one or more CMUT cavities 218 from being damaged. In some embodiments, the passivation layer 418 is selectively patterned by exposing the passivation layer to a tenth etchant 5102 according to a ninth mask (not shown). In various embodiments, the tenth etchant 5102 may comprise a dry etchant (e.g., an ion beam etchant, a RIE etchant, or the like) or a wet etchant.

Figure 52:
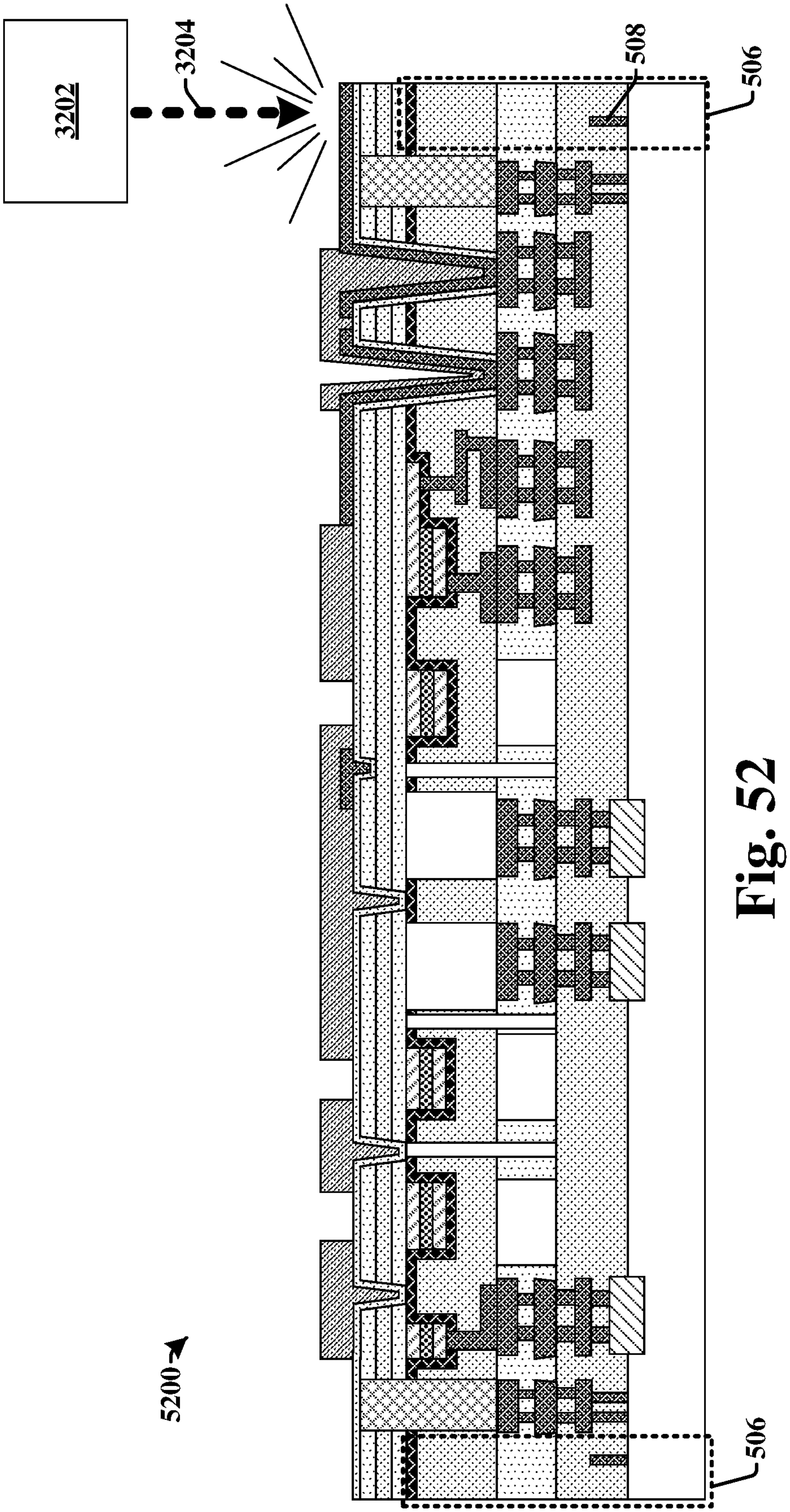

In some embodiments, shown in cross-sectional view 5200 of FIG. 52, the integrated chip structure may comprise a scribe line region 506. In such embodiments, the integrated chip structure may be diced (e.g., singulated) by removing the scribe line region 506. In some embodiments, the integrated chip structure may be diced using a laser stealth dicing process. To ensure that the laser stealth dicing process is able to properly dice the integrated chip structure, the scribe line region 506 may be formed to have a relatively low metal pattern density. For example, the scribe line region 506 may have a metal pattern density of less than approximately 10%, less than approximately 5%, approximately 0%, or other similar values. In some embodiments, one or more alignment marks 508 may be present within the scribe line region 506.

Although FIGS. 32-51 are illustrated without a scribe line region 506, it will be appreciated that the scribe line region 506 shown in FIG. 52 may also be present in FIGS. 32-51. In some embodiments, the one or more alignment marks 508 may be formed within the scribe line region 506 in FIG. 32 (e.g., concurrent to forming the seal ring interconnects 512).

Figure 53:
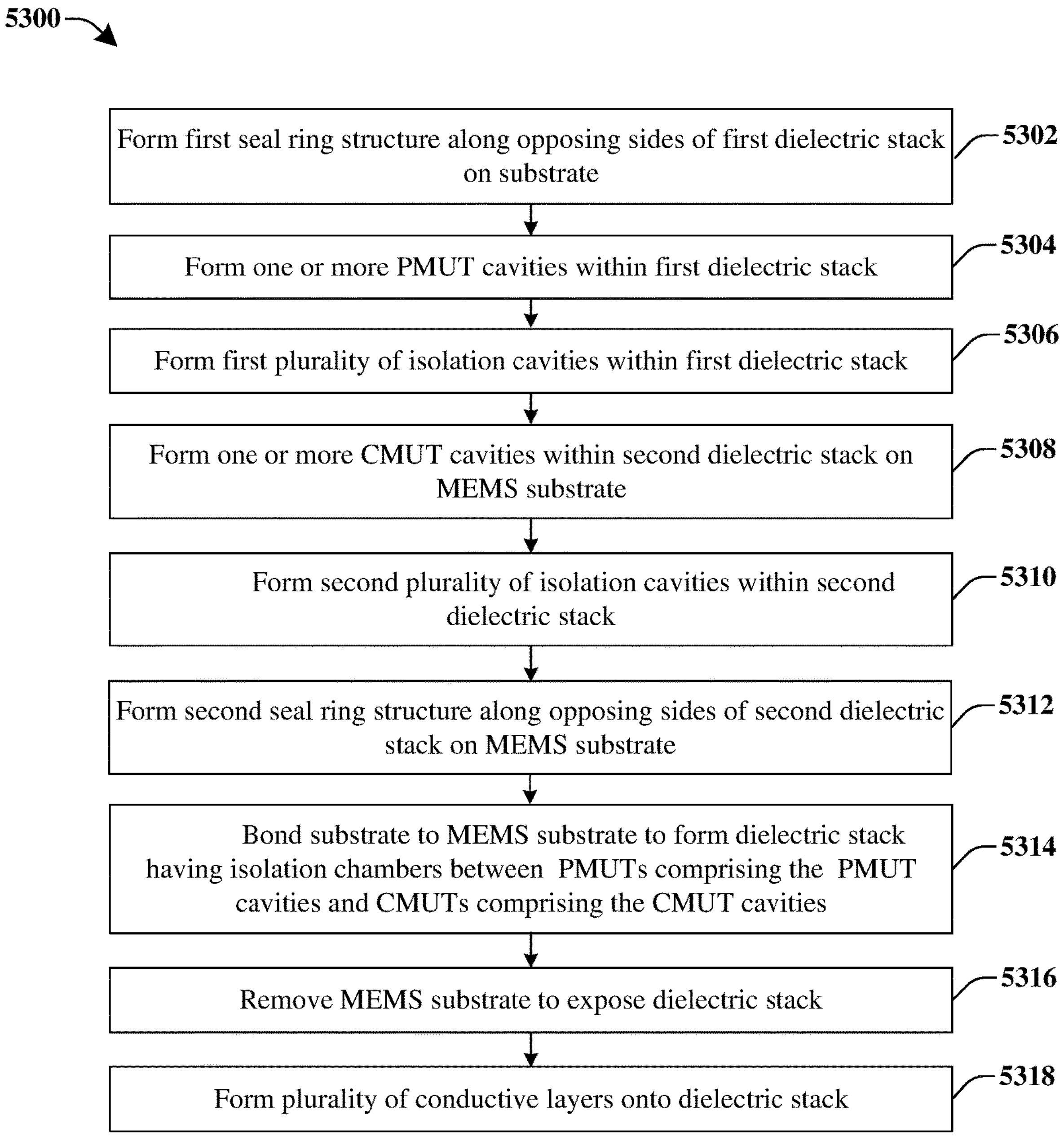
FIG. 53 illustrates a flow diagram of some embodiments of a method of forming an integrated chip structure comprising a CMUT and a PMUT.

FIG. 53 illustrates a flow diagram of some embodiments of a method 5300 of forming an integrated chip structure comprising a CMUT and a PMUT.

While method 5300 is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 5302, a first seal ring structure is formed along opposing sides of a first dielectric stack on a substrate. FIG. 11 illustrates a cross-sectional view 1100 of some embodiments corresponding to act 5302. FIG. 33 illustrates a cross-sectional view 3300 of some alternative embodiments corresponding to act 5302.

At act 5304, one or more PMUT cavities are formed within the first dielectric stack. FIG. 13 illustrates a cross-sectional view 1300 of some embodiments corresponding to act 5304. FIG. 34 illustrates a cross-sectional view 3400 of some alternative embodiments corresponding to act 5304.

At act 5306, a first plurality of isolation cavities are formed within the first dielectric stack. FIG. 14 illustrates a cross-sectional view 1400 of some embodiments corresponding to act 5306. FIG. 35 illustrates a cross-sectional view 3500 of some alternative embodiments corresponding to act 5306.

At act 5308, one or more CMUT cavities are formed within a second dielectric stack on a MEMS substrate. FIG. 18 illustrates a cross-sectional view 1800 of some embodiments corresponding to act 5308. FIG. 39 illustrates a cross-sectional view 3900 of some alternative embodiments corresponding to act 5308.

At act 5310, a second plurality of isolation cavities are formed within the second dielectric stack. FIG. 18 illustrates a cross-sectional view 1800 of some embodiments corresponding to act 5310. FIG. 40 illustrates a cross-sectional view 4000 of some alternative embodiments corresponding to act 5310.

At act 5312, a second seal ring structure is formed along opposing sides of a second dielectric stack on a MEMS substrate. FIGS. 19-20 illustrate cross-sectional views 1900-2000 of some embodiments corresponding to act 5312. FIGS. 41-42 illustrate cross-sectional views 4100-4200 of some embodiments corresponding to act 5312.

At act 5314, the substrate is bonded to the MEMS substrate to form dielectric stack having one or more isolation chambers between one or more PMUTs comprising the one or more PMUT cavities and one or more CMUTs comprising the one or more CMUT cavities. FIG. 21 illustrates a cross-sectional view 2100 of some embodiments corresponding to act 5314. FIG. 43 illustrates a cross-sectional view 4300 of some alternative embodiments corresponding to act 5314.

At act 5316, the MEMS substrate is removed to expose the dielectric stack. FIG. 23 illustrates a cross-sectional view 2300 of some embodiments corresponding to act 5316. FIG.

44 illustrates a cross-sectional view 4400 of some alternative embodiments corresponding to act 5316.

At act 5318, one or more conductive layers are formed on the dielectric stack. FIGS. 28-29 illustrate cross-sectional views 2800-2900 of some embodiments corresponding to act 5318. FIGS. 48-49 illustrates cross-sectional views 4800-4900 of some alternative embodiments corresponding to act 5318.

Accordingly, the present disclosure relates to an integrated chip structure having PMUTs and CMUTs that are separated from one another by one or more isolation chambers.

In some embodiments, the present disclosure relates to an integrated chip structure. The integrated chip structure includes a dielectric stack disposed on a substrate; one or more piezoelectric ultrasonic transducers (PMUTs) including a piezoelectric stack disposed within the dielectric stack over one or more PMUT cavities; one or more capacitive ultrasonic transducers (CMUTs) including electrodes disposed within the dielectric stack and separated by one or more CMUT cavities; and an isolation chamber arranged within the dielectric stack laterally between the one or more PMUTs and the one or more CMUTs, the isolation chamber vertically extending past at least a part of both the one or more PMUTs and the one or more CMUTs. In some embodiments, the integrated chip structure further includes a first plurality of interconnects disposed within the dielectric stack at or below a top of the one or more PMUT cavities; and a second plurality of interconnects disposed within the dielectric stack at or above a bottom of the one or more CMUT cavities, the first plurality of interconnects vertically contacting the second plurality of interconnects along a horizontally extending interface. In some embodiments, the integrated chip structure further includes an acoustic wave absorption material disposed within the isolation chamber. In some embodiments, the one or more PMUTs surround the one or more CMUTs along a first direction and along a second direction that is perpendicular to the first direction, the first direction and the second direction being parallel to an upper surface of the substrate facing the dielectric stack. In some embodiments, the integrated chip structure further includes a seal ring structure arranged along outermost edges of the dielectric stack.

In other embodiments, the present disclosure relates to an integrated chip structure. The integrated chip structure includes a dielectric stack having a plurality of dielectric layers disposed on a substrate, one or more first interior surfaces of the dielectric stack forming a PMUT cavity and one or more second interior surfaces of the dielectric stack forming a CMUT cavity; a flexible membrane arranged within the dielectric stack and having a conductive material; a piezoelectric ultrasonic transducer (PMUT) including a piezoelectric stack disposed within the dielectric stack between the PMUT cavity and the flexible membrane; a capacitive ultrasonic transducer (CMUT) including a bottom electrode and a top electrode disposed within the dielectric stack on vertically opposing ends of the CMUT cavity; and one or more third interior surfaces of the dielectric stack forming an isolation chamber arranged between the PMUT and the CMUT. In some embodiments, the isolation chamber has a height that is greater than or equal to a height of the PMUT cavity or a height of the CMUT cavity. In some embodiments, the PMUT cavity is vertically below the CMUT cavity; and the isolation chamber vertically extends past a top of the PMUT cavity and a bottom of the CMUT cavity. In some embodiments, the isolation chamber has a maximum width at a location that is vertically between a top and a bottom of the isolation chamber. In some embodiments, a horizontally extending line extends along a first horizontally extending surface of the dielectric stack that defines a top of the PMUT cavity and along a second horizontally extending surface of the dielectric stack that defines a bottom of the CMUT cavity. In some embodiments, the CMUT has a greater width than the PMUT. In some embodiments, the integrated chip structure further includes a seal ring structure having one or more seal ring interconnects arranged within the dielectric stack on opposing sides of the PMUT and the CMUT. In some embodiments, the seal ring structure further includes a passivation structure disposed over the one or more seal ring interconnects and that vertically extends through multiple ones of the plurality of dielectric layers of the dielectric stack. In some embodiments, the passivation structure extends through the flexible membrane.

In yet other embodiments, the present disclosure relates to a method of forming an integrated chip structure. The method includes forming one or more PMUT cavities within a first dielectric stack on a substrate; forming a first plurality of isolation cavities within the first dielectric stack; forming one or more CMUT cavities within a second dielectric stack on a MEMS substrate; forming a second plurality of isolation cavities within the second dielectric stack; and performing a bonding process that brings the first dielectric stack together with the second dielectric stack to form a dielectric stack between the substrate and the MEMS substrate, the bonding process also bringing together the first plurality of isolation cavities and the second plurality of isolation cavities to form a plurality of isolation chambers laterally between the one or more PMUT cavities and the one or more CMUT cavities. In some embodiments, the plurality of isolation chambers are also laterally between adjacent ones of the one or more PMUT cavities. In some embodiments, the method further includes filling one or more of the first plurality of isolation cavities and the second plurality of isolation cavities with an acoustic wave absorption material. In some embodiments, the plurality of isolation chambers respectively have a height that is greater than or equal to a height of the one or more PMUT cavities or the one or more CMUT cavities. In some embodiments, the one or more PMUT cavities are vertically below the one or more CMUT cavities; and the plurality of isolation chambers vertically extend past a top of the one or more PMUT cavities and a bottom of the one or more CMUT cavities. In some embodiments, the method further includes forming a first seal ring structure along opposing sides of the substrate; forming a second seal ring structure along opposing sides of the MEMS substrate; and bringing the first seal ring structure together with the second seal ring structure to form a seal ring structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated chip structure, comprising:

forming one or more PMUT cavities within a first dielectric stack on a substrate;

forming a first plurality of isolation cavities within the first dielectric stack;

forming one or more CMUT cavities within a second dielectric stack on a MEMS substrate;

forming a second plurality of isolation cavities within the second dielectric stack; and performing a bonding process that brings the first dielectric stack together with the second dielectric stack to form a dielectric stack between the substrate and the MEMS substrate, wherein the bonding process also brings together the first plurality of isolation cavities and the second plurality of isolation cavities to form a plurality of isolation chambers laterally between the one or more PMUT cavities and the one or more CMUT cavities.

2. The method of claim 1, wherein the plurality of isolation chambers are also laterally between adjacent ones of the one or more PMUT cavities.

3. The method of claim 1, further comprising:

filling one or more of the first plurality of isolation cavities with an acoustic wave absorption material.

4. The method of claim 1, wherein the plurality of isolation chambers respectively have a height that is greater than or equal to a height of the one or more PMUT cavities or the one or more CMUT cavities.

5. The method of claim 1, wherein the one or more PMUT cavities are vertically below the one or more CMUT cavities; and wherein the plurality of isolation chambers vertically extend past a top of the one or more PMUT cavities and a bottom of the one or more CMUT cavities.

6. The method of claim 1, further comprising:

forming a first seal ring structure along opposing sides of the substrate;

forming a second seal ring structure along opposing sides of the MEMS substrate; and bringing the first seal ring structure together with the second seal ring structure to form a seal ring structure.

7. A method of forming an integrated chip structure, comprising:

forming a plurality of interconnects within a first dielectric stack on a first substrate;

forming piezoelectric ultrasonic transducer (PMUT) cavity within the first dielectric stack;

forming a first isolation cavity within the first dielectric stack, the first isolation cavity laterally between the plurality of interconnects and the PMUT cavity;

forming a piezoelectric stack onto a second substrate;

forming a second dielectric stack on the piezoelectric stack and the second substrate;

forming a capacitive ultrasonic transducer (CMUT) cavity within the second dielectric stack;

forming a second isolation cavity within the second dielectric stack, the second isolation cavity laterally separating the CMUT cavity from the piezoelectric stack; and bonding the first dielectric stack to the second dielectric stack so that the PMUT cavity is vertically separated from the piezoelectric stack by the second dielectric stack, the CMUT cavity is vertically separated from the plurality of interconnects by the first dielectric stack, and the first isolation cavity and the second isolation cavity laterally separate the CMUT cavity from the PMUT cavity.

8. The method of claim 7, wherein the CMUT cavity vertically overlaps the PMUT cavity.

9. The method of claim 7, wherein the first isolation cavity and the second isolation cavity are brought together to collectively form an isolation chamber during bonding, the isolation chamber having a larger height than either of the CMUT cavity and the PMUT cavity.

10. The method of claim 9, wherein an acoustic wave absorption material is arranged within the isolation chamber.

11. The method of claim 7, further comprising:

forming a bottom electrode over the plurality of interconnects within the first dielectric stack; and forming a top electrode onto the second substrate prior to forming the piezoelectric stack, wherein the CMUT cavity is vertically between the top electrode and the bottom electrode after bonding.

12. The method of claim 11, wherein the top electrode is arranged within a flexible membrane.

13. The method of claim 11, wherein the CMUT cavity is vertically separated from the top electrode by a dielectric layer.

14. The method of claim 11, wherein the first isolation cavity is laterally separated from the bottom electrode by the first dielectric stack.

15. The method of claim 7, wherein the first isolation cavity extends into the first dielectric stack to a different depth than the PMUT cavity.

16. A method of forming an integrated chip structure, comprising:

forming a bottom electrode within a first dielectric structure on a first substrate;

forming a PMUT cavity within the first dielectric structure, the PMUT cavity being formed by one or more first interior surfaces of the first dielectric structure;

forming a flexible membrane comprising a conductive material on a second substrate;

forming a piezoelectric stack on the flexible membrane;

forming a second dielectric structure on the flexible membrane and the piezoelectric stack;

forming a CMUT cavity within the second dielectric structure, the CMUT cavity being formed by one or more second interior surfaces of the second dielectric structure; and affixing the first dielectric structure to the second dielectric structure so that the PMUT cavity is below the piezoelectric stack and the CMUT cavity is above the bottom electrode.

17. The method of claim 16, further comprising:

forming a first isolation cavity within the first dielectric structure, the first isolation cavity laterally separating the bottom electrode from the PMUT cavity; and forming a second isolation cavity within the second dielectric structure, the second isolation cavity laterally separating the CMUT cavity from the piezoelectric stack.

18. The method of claim 17, further comprising:

forming an acoustic wave absorption material within the first isolation cavity, wherein the acoustic wave absorption material has an upper surface exposed to an air gap after affixing the first dielectric structure to the second dielectric structure.

19. The method of claim 16, wherein the CMUT cavity has a greater vertical height than the PMUT cavity.

20. The method of claim 16, wherein the PMUT cavity is vertically below the CMUT cavity after affixing the first dielectric structure to the second dielectric structure.

* * * * *